(12) United States Patent
Ito et al.

(10) Patent No.: US 7,054,539 B2
(45) Date of Patent: May 30, 2006

(54) IMAGE PROCESSING METHOD AND APPARATUS

(75) Inventors: Masamichi Ito, Kanagawa (JP); Koji Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1136 days.

(21) Appl. No.: 09/779,532

(22) Filed: Feb. 9, 2001

(65) Prior Publication Data
US 2001/0012444 A1  Aug. 9, 2001

(30) Foreign Application Priority Data
Feb. 9, 2000 (JP) .............................. 2000/032258
Aug. 28, 2000 (JP) .............................. 2000/257957

(51) Int. Cl.
H04N 5/76 (2006.01)
H04N 5/781 (2006.01)

(52) U.S. Cl. .......................... 386/46; 386/111; 386/125

(58) Field of Classification Search ................ 386/4–8, 386/52, 55, 68–70, 45–46, 125–126, 111–112; 348/700–701; 358/908; 360/69, 72.1, 72.2–72.3, 360/73.1; H04N 5/781, 5/783
See application file for complete search history.

(56) References Cited

U.S. PATENT DOCUMENTS

| | | | | | |
|---|---|---|---|---|---|
| 5,172,111 A | * | 12/1992 | Olivo, Jr. | ..................... | 386/126 |
| 6,134,378 A | * | 10/2000 | Abe et al. | ..................... | 386/52 |
| 6,134,380 A | * | 10/2000 | Kushizaki | ..................... | 386/55 |
| 6,330,603 B1 | * | 12/2001 | Seki et al. | ................... | 709/226 |
| 6,377,309 B1 | * | 4/2002 | Ito et al. | ...................... | 348/554 |
| 6,744,968 B1 | * | 6/2004 | Imai et al. | ..................... | 386/52 |
| 2004/0264947 A1 | * | 12/2004 | Okada et al. | ............... | 386/125 |

* cited by examiner

*Primary Examiner*—Thai Tran
(74) *Attorney, Agent, or Firm*—Fitzpatrick, Cella, Harper & Scinto

(57) ABSTRACT

An image processing apparatus for reproducing a recorded digital data stream can detect a time information or emergency news object contained in the recorded digital data stream, and inhibit display of the time information or emergency news which is insignificant in reproducing the recorded image. Alternatively, the image processing apparatus displays the object by an icon or the like. Alternatively, the image processing apparatus generates time information by a character generator on the basis of measured time information, replaces time information included in the recorded digital data by the time information generated by the character generator, and reproduces and displays the replaced time information.

35 Claims, 42 Drawing Sheets

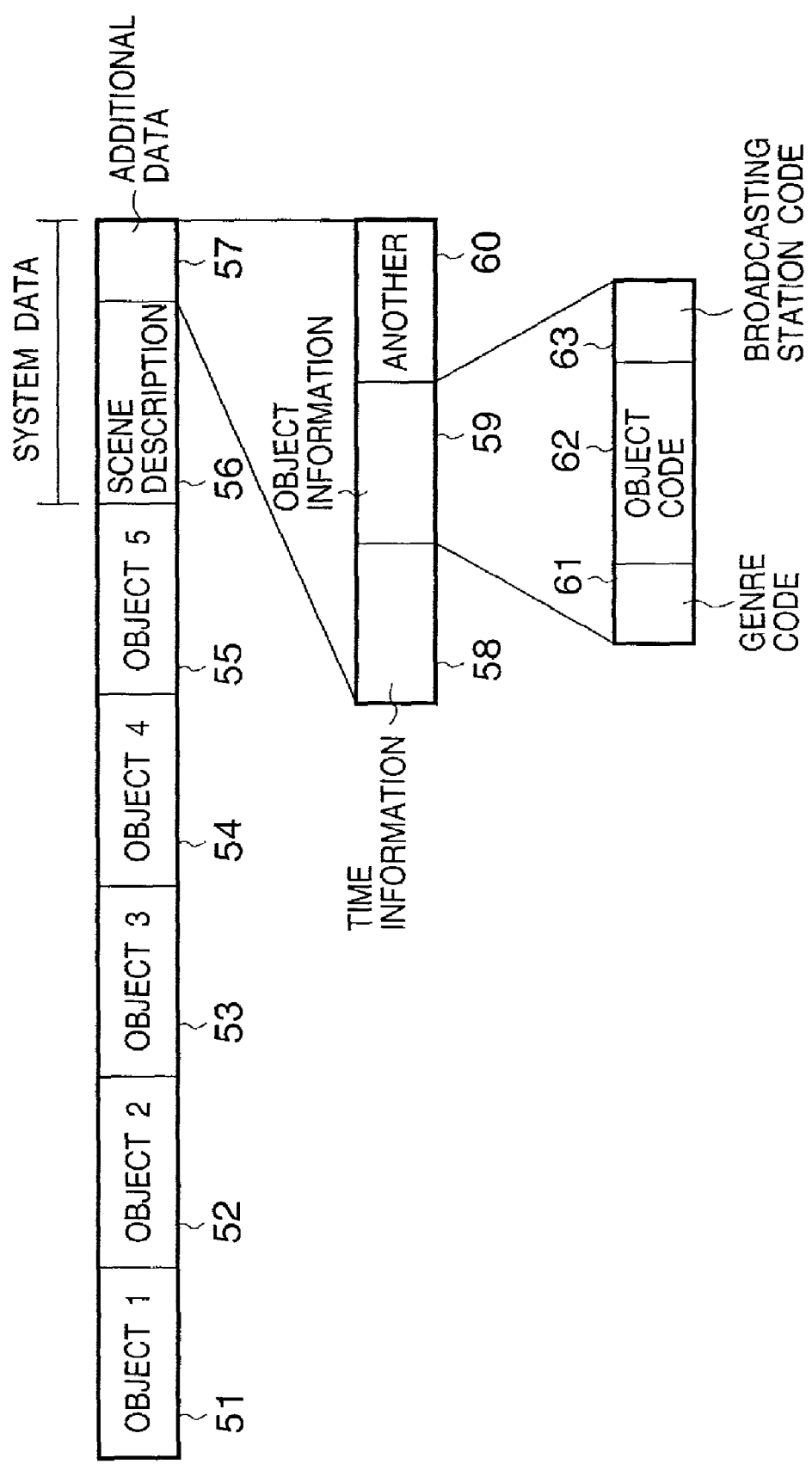

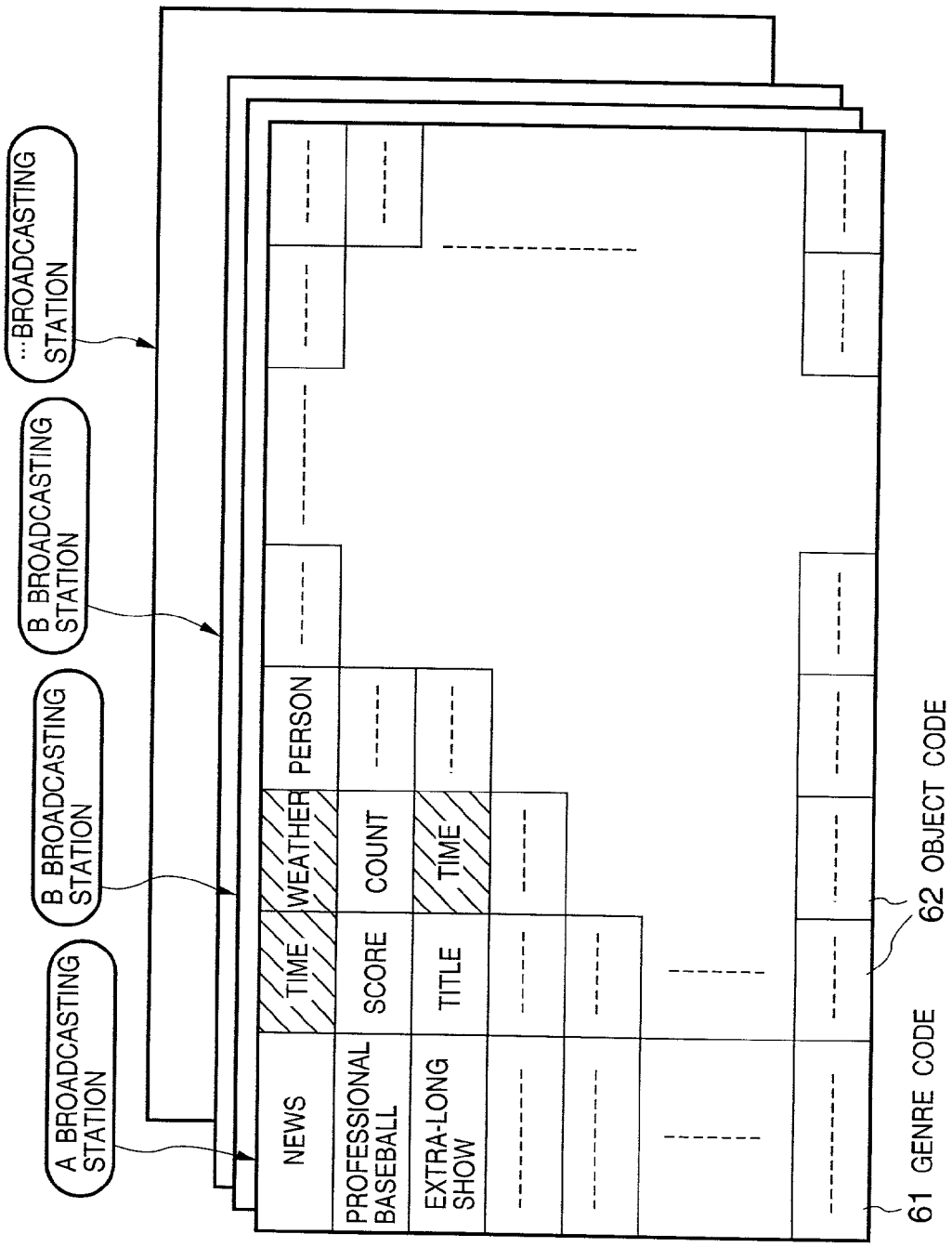

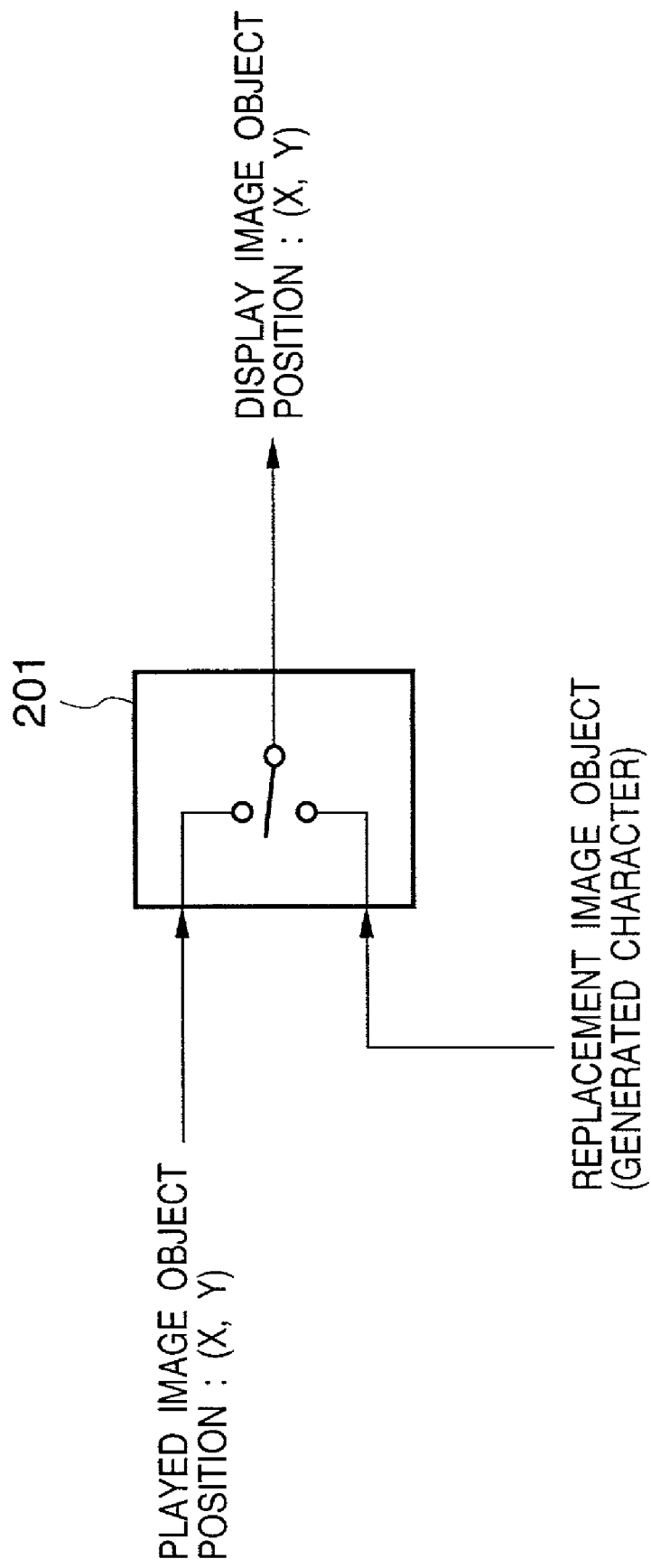

ON-AIR IMAGE
(RECORDED IMAGE)

PLAYBACK IMAGE

F I G. 20
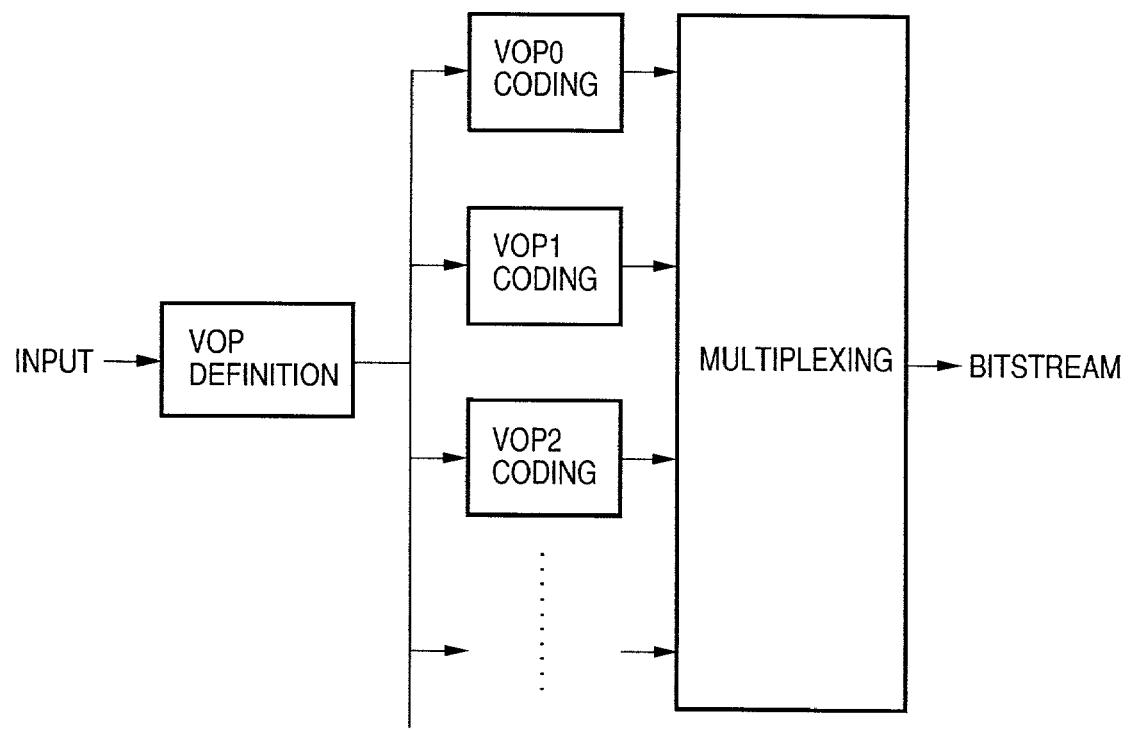

| | |
|---|---|
| PERSPECTIVE TRANSFORMATION | $x' = (ax + by + c)/(gx + hy + 1)$<br>$y' = (dx + ey + f)/(gx + hy + 1)$ |
| AFFINE TRANSFORMATION | $x' = ax + by + c$<br>$y' = dx + ey + f$ |
| ISOTROPIC ENLARGEMENT (a)/<br>ROTATION($\theta$)/MOVEMENT(c, f) | $x' = a\cos\theta\, x + a\sin\theta\, y + c$<br>$y' = -a\sin\theta\, x + a\cos\theta\, y + f$ |
| TRANSLATION | $x' = x + c$<br>$y' = x + f$ |

FIG. 28

| CODING SCHEME | | BIT RATE kbit/S |
|---|---|---|
| PARAMETRIC CODING | IL | 6-16 |
| | HVXC | 2-6 |
| CELP CODING | WB-CELP | 14-24 |
| | NB-CELP | 4-12 |
| TIME/FREQUENCY CONVERSION CODING (T/F CONVERSION) | COMPLIANCE WITH AAC | 24-64 |
| | TwinVQ | 6-40 |
| SNHC | SA CODING (TONE SYNTHESIS) | — |
| | TTS CODING (TONE SYNTHESIS) | — |

CELP : Code Excited Linear Prediction
SNHC : Synthetic Natural Hybrid Coding

VS : Video Session
VO : Video Object
VOL : Video Object Layer
GOV : Group Of Video Object Plane
VOP : Video Object Plane

ONE-WAY DECODING BY NORMAL VLC

INSERTION OF RM(RESYNC MARKER)

INSERTION OF MM(MOTION MARKER)<DATA PARTITIONING>

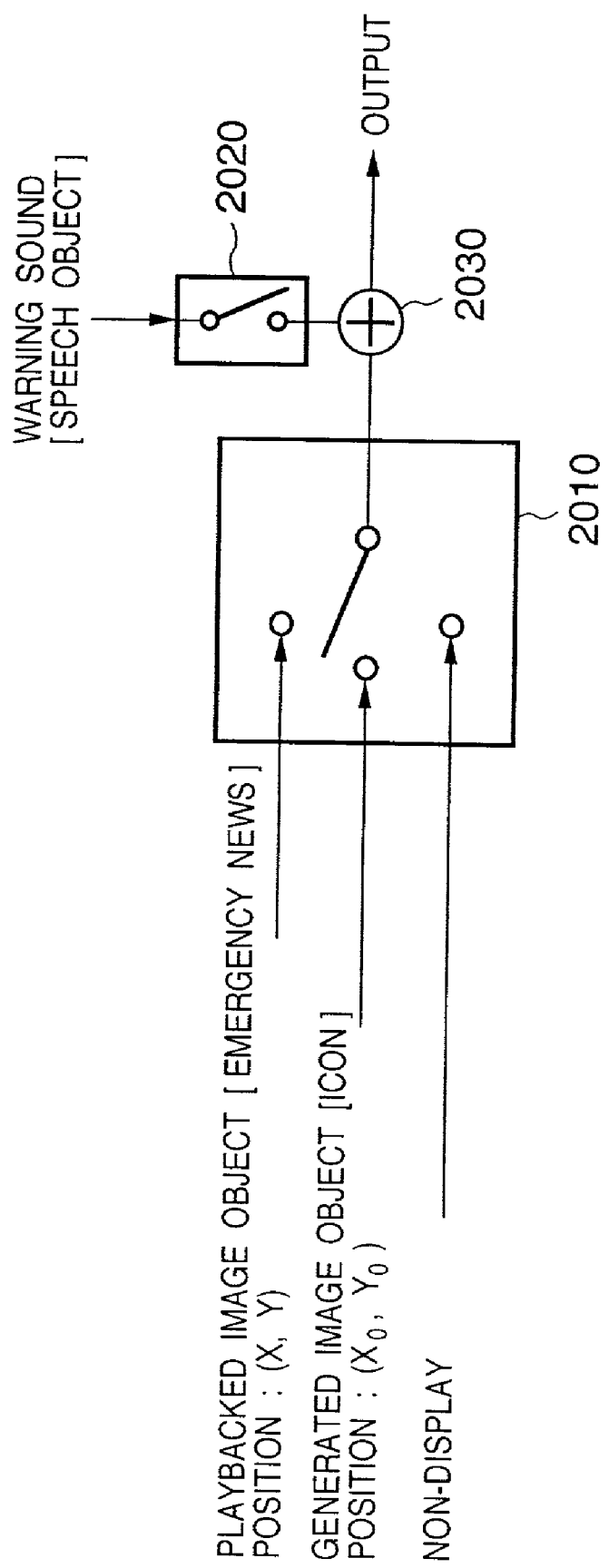

ON-AIR IMAGE (RECORDED IMAGE)

PLAYBACK IMAGE
PLYABACK PATTERN ①
"EMERGENCY NEWS" (IMAGE OBJECT)
IS DISPLAYED AS ICON (IMAGE OBJECT)

PLAYBACK IMAGE
EMERGENCY NEWS DISPLAY INSTRUCTION
(FOR EXAMPLE, ICON IS CLICKED)

PLAYBACK IMAGE
PLYABACK PATTERN ②
"EMERGENCY NEWS" OF ORIFINAL IS DISPLAYED.
RECORDING TIME INFORMATION CAN ALSO
BE ADDITIONALLY DISPLAYED

ON-AIR IMAGE (RECORDED IMAGE)

PLAYBACK PATTERN ③ PLAYBACK IMAGE
SOUND IS OUTPUT AT PORTION WHERE
DISPLAY FORM WAS CHANGED
PLAYBACK PATTERN ①
"EMERGENCY NEWS" (IMAGE OBJECT)
IS DISPLAYED AS ICON (IMAGE OBJECT)

PLAYBACK PATTERN ② PLAYBACK IMAGE
OBJECT IS NOT DISPLAYED
(ICON IS NOT DISPLAYED)

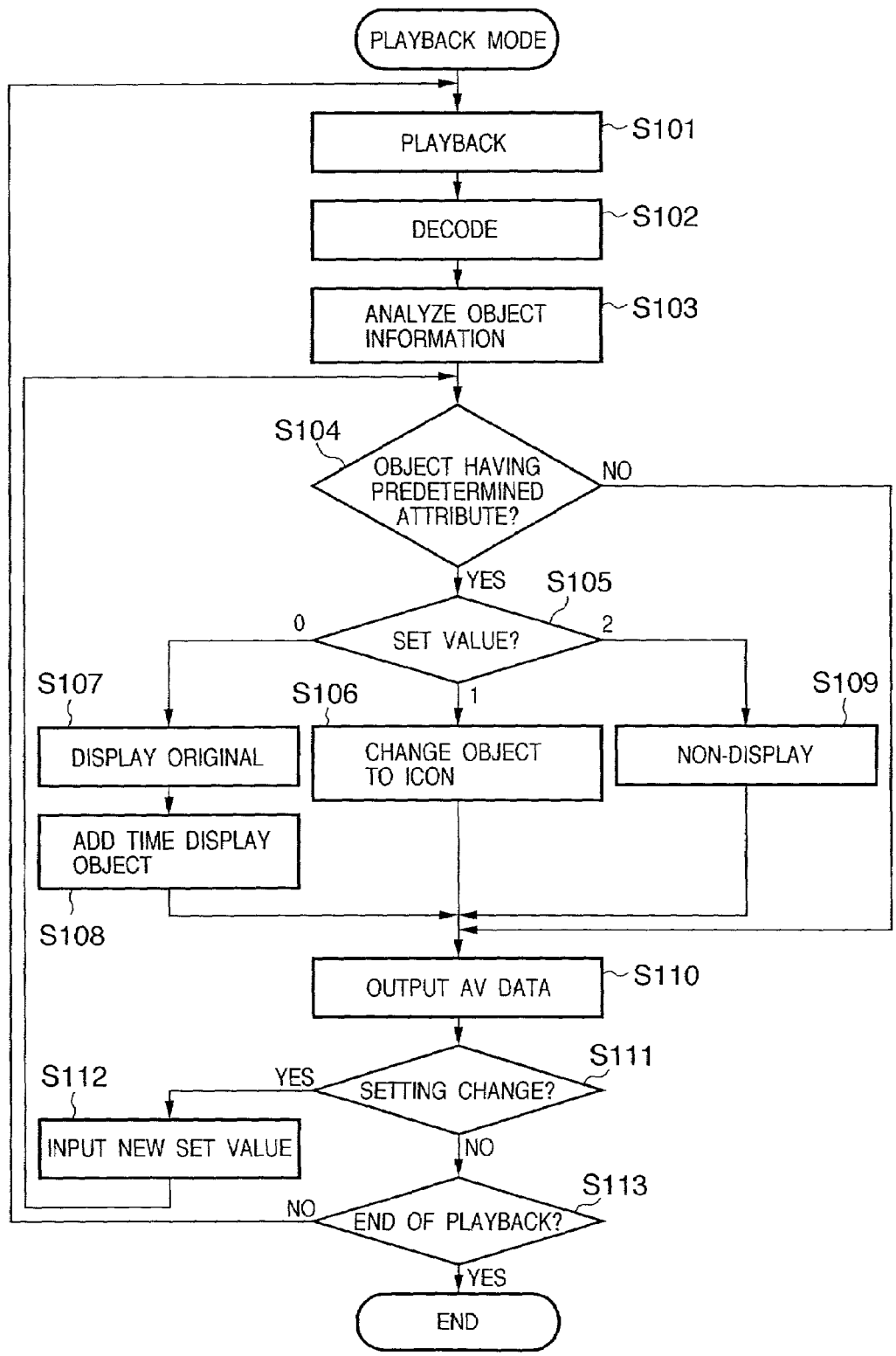

IMAGE PROCESSING METHOD AND APPARATUS

FIELD OF THE INVENTION

The present invention relates to an image processing method and apparatus suitable in recording, reproducing, and displaying a digital television program, and is applicable to a recording/playback device for receiving and recording a digital television program, and a television receiver, television display device, or the like having such a recording function.

BACKGROUND OF THE INVENTION

In recent years, digital television broadcasting using satellites or cable broadcasting is becoming popular. With realization of this digital broadcasting, expectations rise for further new development including improvement in broadcast image and audio qualities, increases in the number of types of programs and the information amount using a compression technique, provision of new services such as an interactive service, evolution of the reception form.

FIG. 17 is a block diagram showing the arrangement of a conventional digital broadcasting reception apparatus using satellite broadcasting.

In this reception apparatus, information transmitted by satellite broadcasting is received by an antenna 1, and the received television information is tuned and demodulated by a tuner 2 in a reception device 8. Then, the television information is subjected to error correction processing (not shown), and if necessary, to charging correspondence, descrambling processing, and the like. Various data multiplexed as the TV information are demultiplexed into individual data by a multiplexed-signal demultiplexing circuit 3. The demultiplexed data include image information, audio information, and other additional data. These demultiplexed data are decoded by a decoding circuit 4. Of the decoded data, the image information and audio information are converted into analog signals by a D/A conversion circuit 5. The image and audio are respectively displayed and output by a TV receiver 6 serving as an externally connected display device. Note that the additional data concerns various functions in order to function as program sub-data.

A satellite TV program is recorded and played back by a recording/playback device (DVD/VTR) 7. Examples of the recording/playback device 7 are a recordable/playbackable DVD (Digital Video Disk drive) and digital VTR. The reception device 8 and recording/playback device 7 are connected by a data bus and the like. The recording scheme in the recording/playback device 7 is a digital recording scheme which performs bitstream recording. Note that bitstream recording is not limited to the use of the DVD or digital VTR (e.g., D-VHS type VTR), but is also supported by a DVC which is another consumer digital recording scheme. For example, even a digital recording device using various disk media can record a digital television program by format transformation or the like, as needed.

However, as a general method of displaying a television program on a home television, an image transmitted from a broadcasting station is directly displayed in conventional ground wave broadcasting and even the above-described digital television broadcasting. Similarly, in playing back a television program recorded by a VTR, the recorded data is directly played back.

In other words, it is very difficult for the conventional technique to more effectively change the display form by the user in accordance with the situation in display of a television program, playback/display of a VTR, or the like. This function is an effective display method in the future during the course of increasing the numbers of channels and programs in the development of digital television broadcasting, and is considered to be one of indispensables in terms of addition of new functions. This function, however, has not been realized yet.

For example, as a display subject, a telop display for special news such as "earthquake news information", which is important upon recording, is often insignificant in playing back the recorded television information by the recording/playback device 7, but the recorded information is displayed without any change.

SUMMARY OF THE INVENTION

The present invention has been made in consideration of the conventional situation, and has as its object to provide an image processing method and apparatus capable of improving the visual effect for the user, and improving a user interface.

It is another object of the present invention to provide an image processing method and apparatus capable of determining an object having an attribute insignificant in reproducing, and controlling reproducing of the object.

It is still another object of the present invention to provide an image processing method and apparatus capable of displaying a predetermined picture after changing the display form of the predetermined picture instead of displaying them as they are in reproducing recorded pictures.

It is still another object of the present invention to provide an image processing method and apparatus capable of not displaying an image which was significant upon recording a picture but is insignificant in reproducing it, or capable of changing the display form in display, as needed.

In order to attain the above described objects, an image processing apparatus of the present invention comprises as follows.

An image processing apparatus for reproducing a recorded digital data stream, comprises: determination means for determining whether an object having a predetermined attribute exists in the recorded digital data stream; and reproducing means for changing a reproducing form of the object and reproducing the object when the determination means determines that the object having the predetermined attribute exists.

An image processing apparatus of the present invention, for reproducing a recorded digital data stream, comprises: determination means for determining whether an object having a predetermined attribute exists in the recorded digital data stream; designation means for designating a reproducing form of the object having the predetermined attribute from a plurality of reproducing forms; and reproducing control means for reproducing an image corresponding to the object having the predetermined attribute in the reproducing form designated by the designation means when the determination means determines that the object having the predetermined attribute exists.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view for explaining the bitstream structure of MPEG4 data;

FIG. 7 is a conceptual view for explaining the arrangement of object information contained in the bitstream of MPEG4 data;

FIG. 8 is a view for explaining display switching between a normal image and a replaced image;

FIG. 20 is a block diagram for explaining a VOP processing circuit block on the coding side;

FIGS. 23A and 23B are views for explaining information constituting VOP, in which FIG. 23A shows an information structure in coding in units of objects, and FIG. 23B shows an information structure in coding in units of frames;

FIGS. 24A and 24B are views for explaining scalability in hierarchical coding, in which FIG. 24A shows temporal scalability, and FIG. 24B shows spatial scalability;

FIG. 28 is a table showing the type of MPEG4 audio coding scheme;

FIG. 36 is a view for explaining a change of the playback form in an object controller in FIG. 35;

FIG. 39 is a flow chart for explaining a playback processing sequence according to the third embodiment of the present invention;

DETAILED DESCRIPTION OF THE PREFERRED EMBODIMENTS

Figure 1:
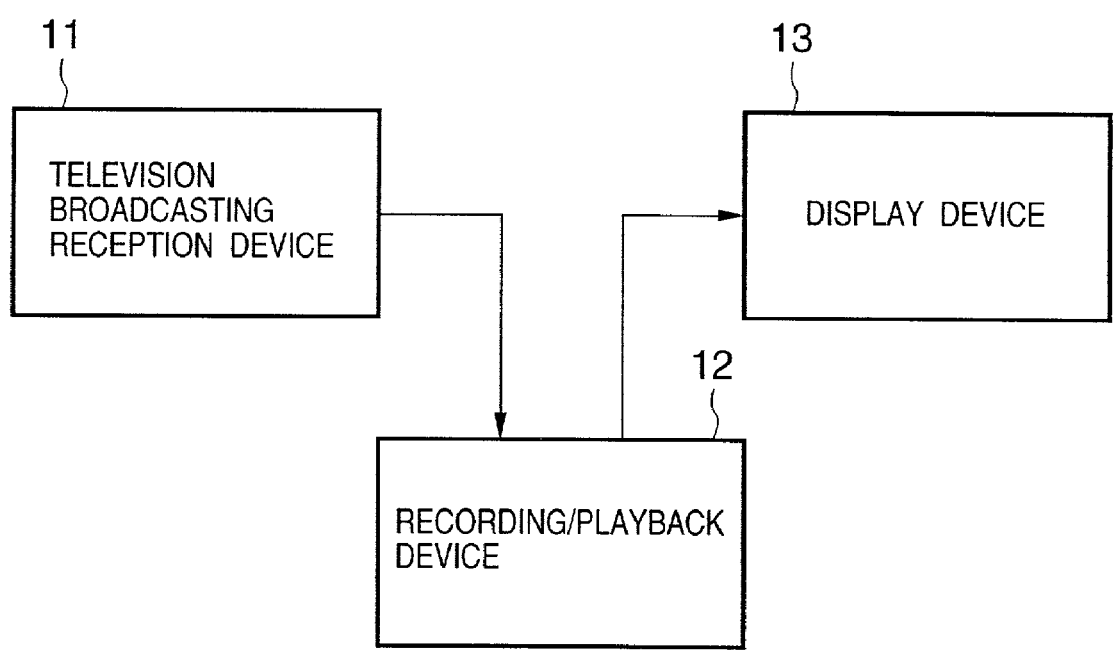
FIG. 1 is a block diagram showing the configuration of a display system according to an embodiment of the present invention.

To solve conventional problems, embodiments of the present invention propose new functions as an effective playback(reproducing)/display method for a digital television broadcasting reception/display method and the playback(reproducing)/display method of a recording/playback (reproducing) device of recording and playing back (reproducing) television information. The new functions are realized by constituting a broadcasting system using MPEG4 which is being standardized recently, in addition to MPEG2 adopted as a conventional digital television broadcasting coding scheme.

Details of MPEG4 will be described later. The use of the concept of an object, which is a characteristic feature of MPEG4 coding, enables output control and display control in units of objects in an image. A device for recording/playing back or displaying an MPEG4 television program can display image data having predetermined object attribute data by changing its display form from the that of the original.

For example, when predetermined object information is a real-time image object (e.g., an object such as time display or weather forecast which is useful only when the image was broadcast), control can be done not to display the real-time image object in the recorded image without playing back as it is and displaying the recorded image in the display form of the original recorded in the past in playing back television information by a recording/playback device, and control can be done to change, e.g., time display in correspondence with the current time and display the changed time (replacement processing).

The object includes the background or speaker of an image, a CG image, and the speech of a speaker. The MPEG4 coding scheme is to code/decode an image in units of objects, combine objects, and express one scene.

As an example of the display control function according to the embodiment, the display form of an object formed from predetermined object information is changed between recording (original image) and playback on the basis of attribute information (object information) defined for each object in a device of recording and playing back MPEG4 information or a device of displaying played-back information.

By realizing the embodiment, display of real-time information such as time information in broadcasting can be easily changed in correspondence with the current time. This is effective in adding a new function to recording/playback of a television program.

A preferred embodiment of the present invention will be described in detail below with reference to the accompanying drawings.

In the embodiment, an image signal coded by the MPEG4 coding scheme is received, recorded, and played back. The MPEG4 technique will be explained in detail for respective fields.

<Overall Arrangement of Standard>

The MPEG4 standard is roughly made up of four items, three items of which are similar to those of MPEG2 and are a visual part, audio part, and system part.

(1) Visual Part

An object coding scheme of processing a natural image, synthesized image, moving image, and still image is standardized.

This object coding scheme includes a coding scheme, sync playback function, and hierarchical coding suitable for correction and repair of a transmission line error. In terms of expression, "video" means a natural image, and "visual" includes up to a synthesized image.

(2) Audio Part

An object coding scheme of processing a natural sound, synthesized sound, sound effect, and the like is standardized. In the video and audio parts, a plurality of coding schemes are defined, and a compression scheme suitable for the feature of each object is appropriately selected to increase the coding efficiency.

(3) System Part

Multiplexing processing for coded picture and audio objects, and demultiplexing processing are defined. A buffer memory, time axis control, and a readjustment function are also included in this part.

Picture and audio objects coded in parts (1) and (2) are integrated into a multiplexed stream in the system part together with scene building information which describes the position, appearance time, and disappearance time of an object in a scene.

As decoding processing for a coded signal, each object is demultiplexed/decoded from a received bitstream, and a scene is reconstructed based on scene building information.

<Object Coding>

MPEG2 processes a frame or field as a unit. To the contrary, MPEG4 processes picture data and audio data as objects in order to realize reuse and edit of contents.

Figure 18:
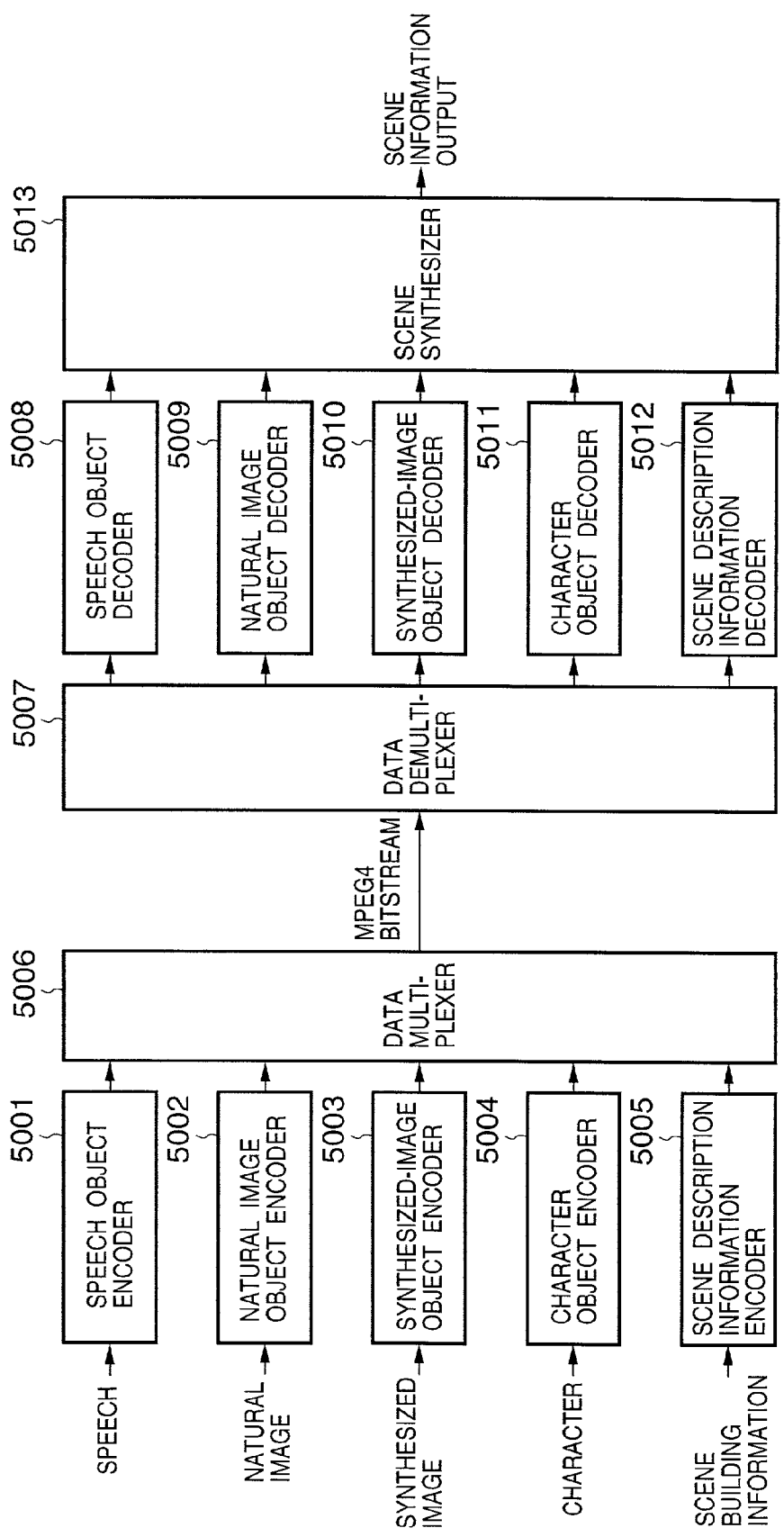
FIG. 18 is a block diagram for explaining an MPEG4 coding/decoding processing flow.

The types of objects are as follows.
Speech
Natural Image (Background Image: Two-dimensional Fixed Image)
Synthesized Image (Principal Object Image: No Background)
Character Information FIG. 18 is a block diagram showing a system configuration when these objects are simultaneously input and coded.

The objects are respectively coded by a speech object encoder 5001, natural image object encoder 5002, synthesized-image object encoder 5003, and character object encoder 5004. At the same time, the relationship of these objects in the scene is coded as scene building information by a scene description information encoder 5005, and coded into an MPEG4 bitstream by a data multiplexer 5006 together with the pieces of coded object information.

On the coding side, a combination of visual and audio objects is defined to express one scene (frame). Visual objects can constitute a scene as a combination of a natural image and a synthesized image such as a computer graphic.

With this arrangement, an object image and speech can be played back using, e.g., a text to speech synthesis function in synchronism with each other. In addition, an MPEG4 bitstream can be transmitted/received or recorded/played back.

Decoding processing of a coded bitstream is reverse to coding processing. That is, a data demultiplexer 5007 demultiplexes and distributes an MPEG4 bitstream in units of objects. Respective objects such as a speech, natural image, synthesized image, and character are decoded into object data by corresponding decoders 5008 to 5011. Scene description information is also simultaneously decoded by a scene description decoder 5012. A scene synthesizer 5013 synthesizes again an original scene using these pieces of decoded information.

On the decoding side, the positions of visual objects or the order of audio objects in a scene can be changed. The object positions can be changed by drag operation. The language or the like can be changed by changing an audio object by the user.

To synthesize a scene by freely combining a plurality of objects, the following four items are prescribed.

(a) Object Coding

A visual object, audio object, and AV (Audio Visual) object as a combination of them are coded.

(b) Scene Synthesis

A language as a modification of VRML (Virtual Realty Modeling Language) is used to define scene building information and a synthesis scheme for constituting visual, audio, and AV objects into a desired scene.

(c) Multiplexing and Synchronization

For example, the form of a stream (elementary stream) obtained by multiplexing and synchronizing objects is determined.

This stream can be supplied to a network, and the QOS (Quality Of Service) in storing the stream in a recording device can also be set. QOS parameters are transmission path conditions such as a maximum transmission rate, error rate, and transmission scheme, the decoding ability, and the like.

(d) User Operation (Interaction)

A scheme of synthesizing visual and audio objects on the user terminal side is defined.

An MPEG4 user terminal demultiplexes data transmitted from a network or recording device into elementary streams, which are decoded in units of objects. A scene is reconstructed from a plurality of coded data on the basis of simultaneously transmitted scene building information.

Figure 19:
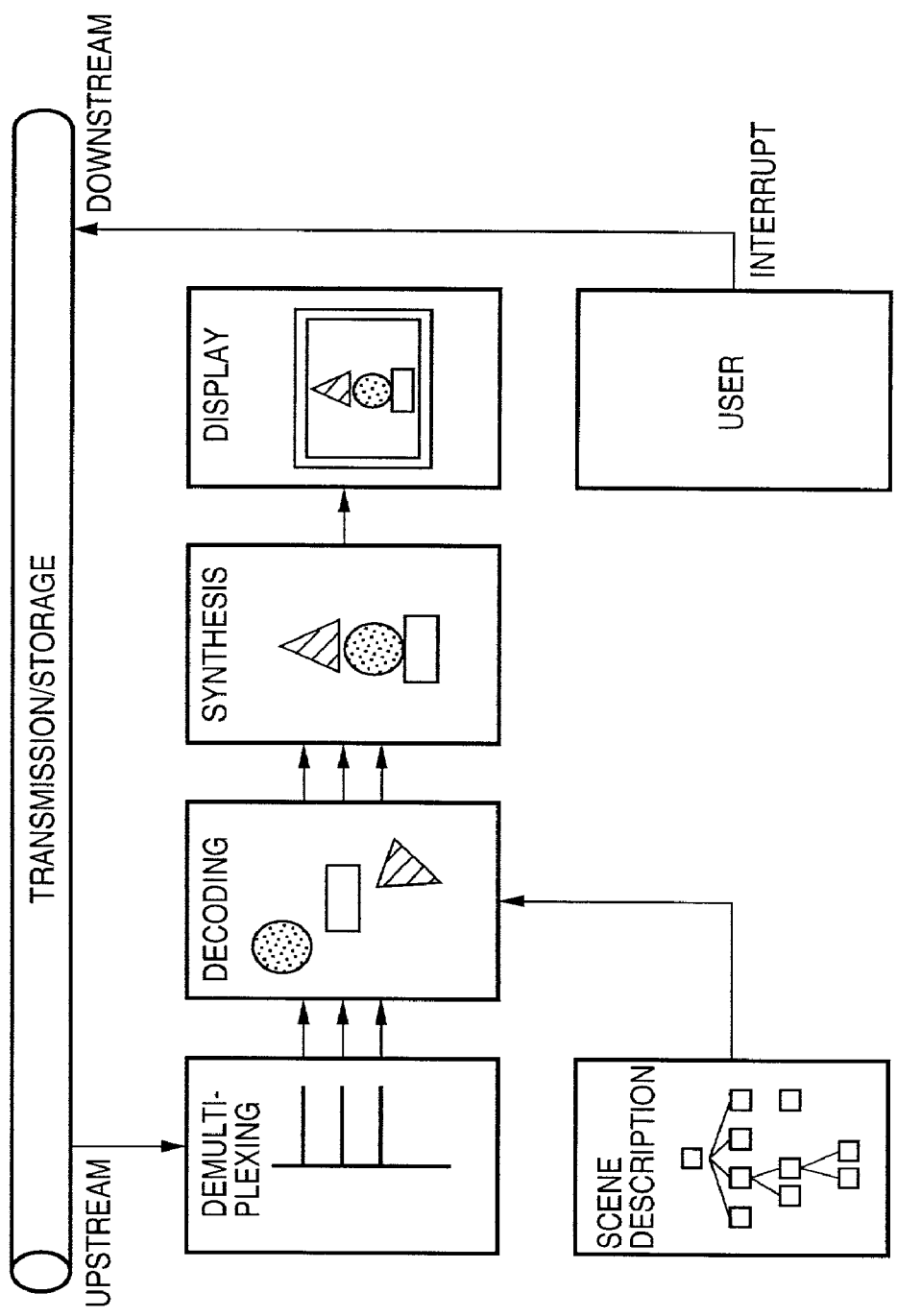
FIG. 19 is a block diagram showing an arrangement considering user operation (edit) in an MPEG4 system.
Figure 21:
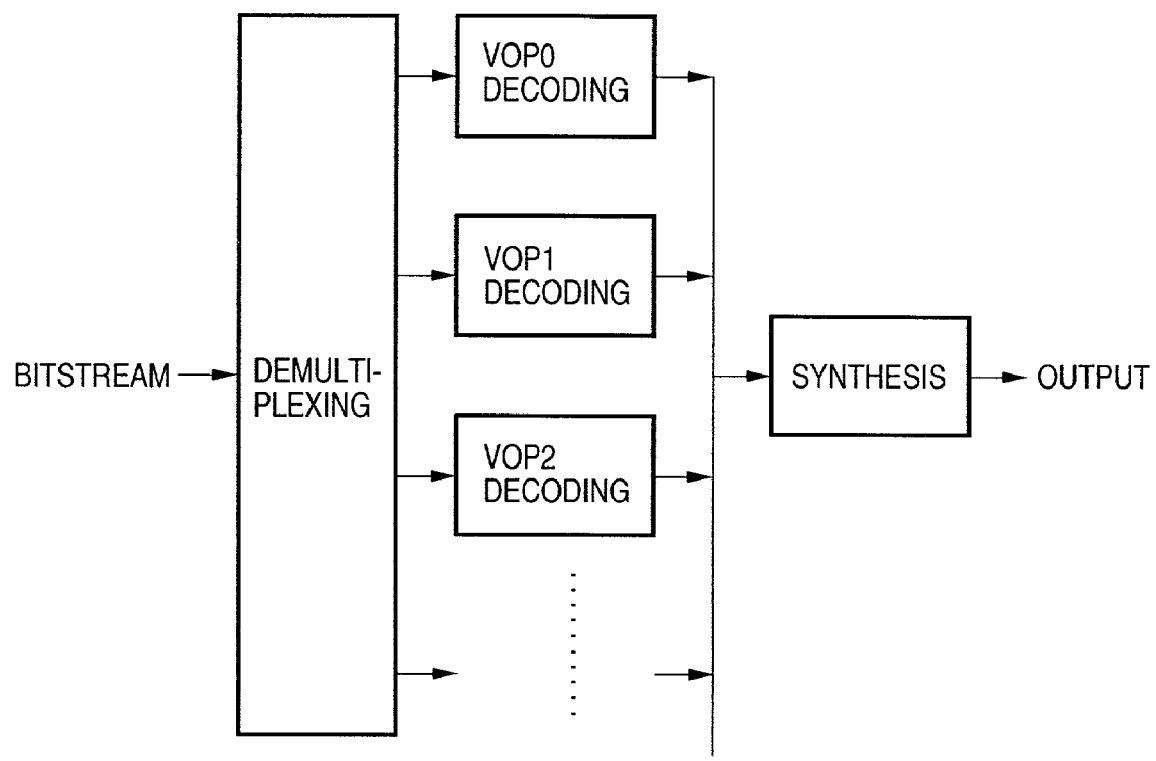
FIG. 21 is a block diagram for explaining a VOP processing circuit block on the decoding side.

FIG. 19 shows a system configuration which considers user operation (edit). FIG. 20 is a block diagram showing a VOP processing circuit concerning a video object on the coding side, and FIG. 21 is a block diagram showing the decoding side.

VOP (Video Object Plane)

In coding an MPEG4 image, target picture objects are coded separately for the shape and texture. The picture data unit is called VOP.

Figure 22:
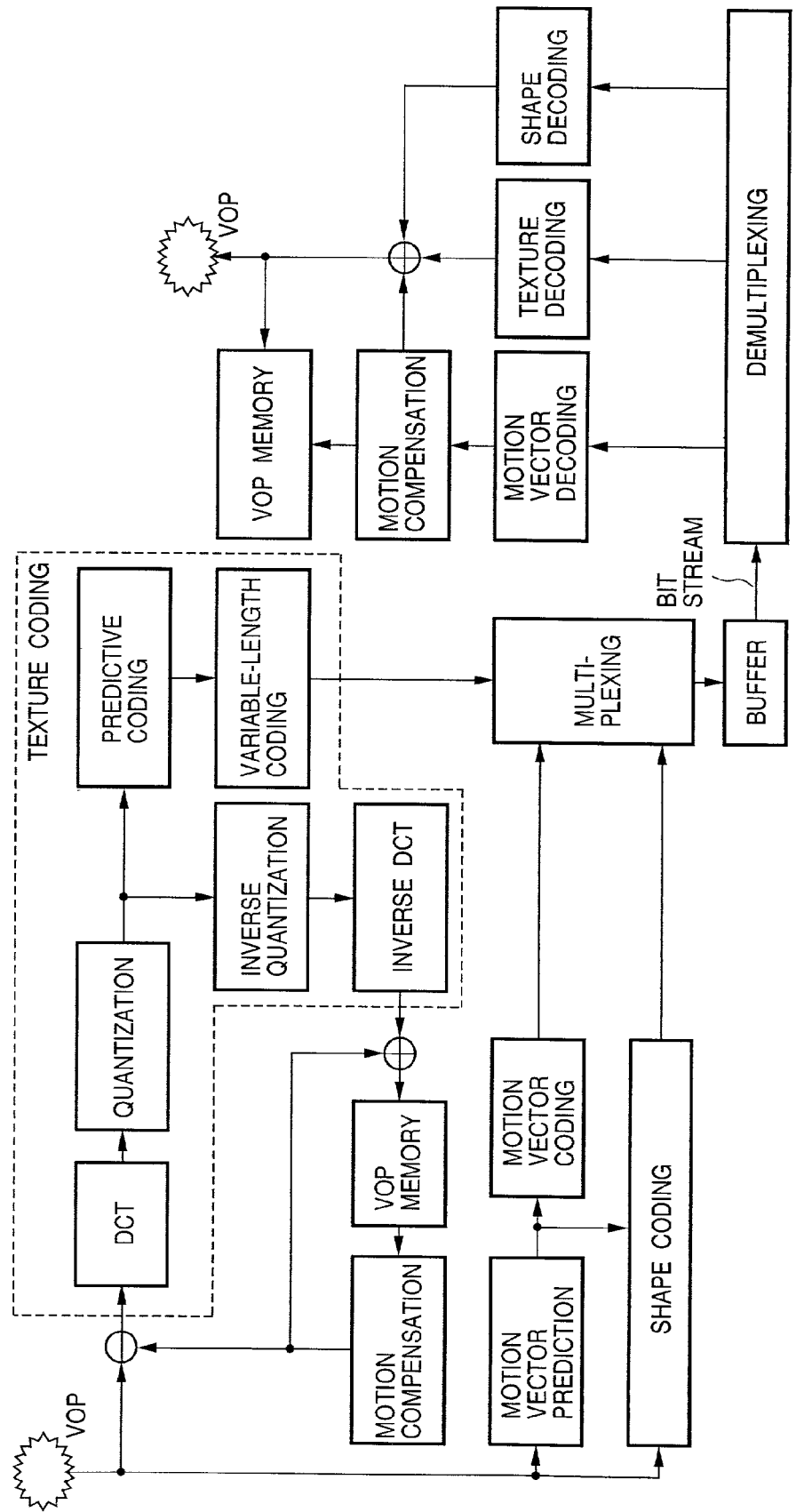
FIG. 22 is a block diagram showing the overall arrangement of VOP coding and decoding.

FIG. 22 is a block diagram showing the overall VOP coding/decoding arrangement. For example, when an image is made up of two, person and background objects, each frame is divided into two VOPs, which are coded.

Figure 23A:
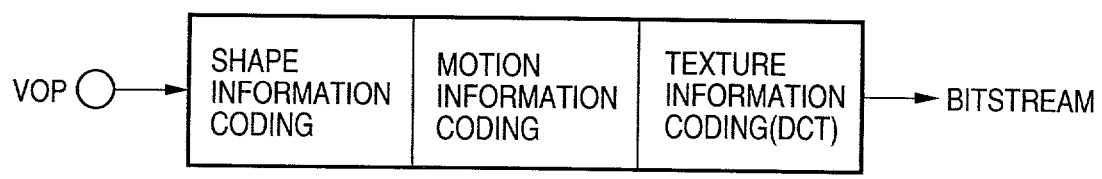

As shown in FIG. 23A, information constituting each VOP is object shape information, motion information, or texture information. The decoder separates a bitstream into VOPs, individually decodes them, and synthesizes them to display an image.

Figure 23B:
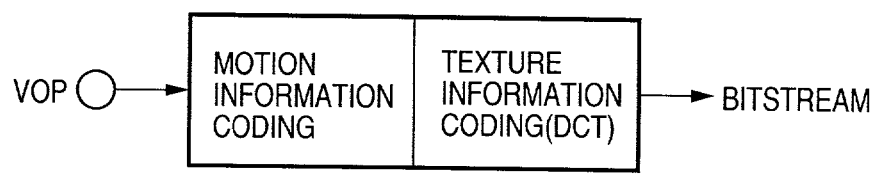

With the use of the VOP structure, when an image to be processed is made up of a plurality of picture objects, the image can be divided into a plurality of VOPs to individually code/decode them. If the number of VOPs is "1", and the object shape is rectangular, conventional coding in units of frames is performed, as shown in FIG. 23B.

The VOP employs three prediction schemes, i.e., intra-coding (I-VOP), predictive coding (P-VOP), and bidirectionally predictive coding (B-VOP). The prediction unit in the prediction scheme is a macroblock of 16×16 pixels.

A bidirectional prediction VOP (B-VOP) is a VOP which is bidirectionally predicted from past and future VOPs, similar to a B picture of MPEG1 or MPEG2. Four modes, direct coding, forward coding, backward coding, and bidirectional coding can be selected in units of macroblocks.

Bidirectional predictive coding can switch the mode in units of MBs or blocks, and bidirectional prediction is done by scaling of the motion vector of a P-VOP.

<Shape Coding>

To process an image in units of objects, the object shape must have already been known in coding and decoding. To express an object such as glass through which another object is seen, information representing the transparency of the object is required. The object shape and object transparency information are called shape information. Coding of the shape information is called shape coding.

<Size Transformation Processing>

Binary shape coding is a method of coding the inner or outer boundary of an object for each pixel. As the number of pixels to be coded is smaller, the coding amount is smaller. However, if the macroblock size to be coded is decreased, a coded original shape is degraded and transmitted to the receiving side. To prevent this, the degree of degradation of original information by size transformation is measured, and a smaller size is selected as far as a size transformation error is a predetermined threshold or less. Examples of the size transformation ratio are three, one-to-one ratio, 1/2 aspect ratio, and 1/4 aspect ratio.

Shape information of each VOP is given as an 8-bit value $\alpha$, and defined as follows.

$\alpha=0$: outside of a corresponding VOP $\alpha=1$ to 254: displayed in a semitransparent state with another VOP $\alpha=255$: display region of only a corresponding VOP Binary shape coding is executed when the value $\alpha$ takes only "0" or "255", and the shape is expressed by only the inside and outside of a corresponding VOP. Multivalued shape coding is executed when the value $\alpha$ can take all the values "0" to "255". This coding can express a semitransparent state in which a plurality of VOPs overlap each other.

Similar to texture coding, motion compensation prediction is performed at a precision of one pixel in units of blocks each made up of 16×16 pixels. When the entire object is subjected to intra-coding, shape information is not predicted. The motion vector uses the difference of a motion vector predicted from an adjacent block. The difference value of the obtained motion vector is coded and then multiplexed into a bitstream. In MPEG4, shape information in units of motion compensation-predicted blocks is coded into a binary shape.

<Feathering>

Feathering (smoothing of the boundary shape) is used when the boundary is smoothly changed from an opaque portion to a transparent portion even in a binary shape. Feathering includes a linear feathering mode in which a boundary value is linearly interpolated, and a feathering filter mode using a filter. A constantly opaque multivalued shape has a constant $\alpha$ mode, and can be combined with feathering.

<Texture Coding>

The luminance component and color difference components of an object are coded, and processed in the order of DCT, quantization, predictive coding, and variable length coding in units of fields/frames.

DCT uses a block of 8×8 pixels as a processing unit. When an object boundary is within a block, pixels outside the object are compensated by the average value of the object. Processing with a 4-tap two-dimensional filter prevents generation of a high pseudo peak in a DCT transformation coefficient.

Quantization adopts a quantization unit based on the ITU-T recommendation H.263 or an MPEG2 quantization unit. The use of the MPEG2 quantization unit enables nonlinear quantization of a DC component and frequency weighting of an AC component.

The intra-coding coefficient after quantization is predictive-coded between blocks before variable length coding to delete a redundant component. Particularly in MPEG4, both DC and AC components are predictive-coded.

In AC/DC predictive coding in texture coding, the differences (gradients) of corresponding quantization coefficients between adjacent blocks are checked, and a smaller coefficient is used for prediction. In coding a DC coefficient x, c is used for prediction for $|a-b|<|b-c|$, or a is used for $|a-b|\geq|b-c|$.

In predicting an AC coefficient x, a prediction value is selected similarly to the DC coefficient, and normalized by the quantization scale value (QP) of each block.

In predictive coding of a DC component, the difference (vertical gradient) between the DC components of vertically adjacent blocks and the difference (horizontal gradient)

between the DC components of horizontally adjacent blocks are checked between adjacent blocks, and the difference between the DC components of blocks in a direction in which the gradient decreases is coded as a prediction error.

In predictive coding of an AC component, a corresponding coefficient value of an adjacent block is used in accordance with predictive coding of a DC component. The quantization parameter value may change between blocks, so that the difference is calculated upon normalization (quantization step scaling). The presence/absence of prediction can be selected in units of macroblocks.

The AC component undergoes three-dimensional (Last, Run, Level) variable length coding after zigzag scan. In this case, Last is a 1-bit value other than "0" that represents the end of the coefficient, Run is a "0" successive length, and Level is a non-zero coefficient value.

Variable length coding of an intra-coded DC component uses either a DC component variable length coding table or an AC component variable length table.

<Motion Compensation>

MPEG4 can code a VOP (Video Object Plane) having an arbitrary shape. The VOP has intra-coding (I-VOP), predictive coding (P-VOP), and bidirectionally predictive coding (B-VOP) depending on the type of prediction. The prediction unit is a macroblock of 16 lines×16 pixels or 8 lines×8 pixels. For this reason, a given macroblock exists across the boundary of a VOP. To increase the prediction efficiency of the VOP boundary, padding (compensation) and polygon matching (matching of only an object) are performed for a macroblock on the boundary.

<Wavelet Coding>

Wavelet transformation is a transformation scheme in which a plurality of functions obtained by enlarging/reducing/translating one solitary wave function are used as a transformation basis. A still image coding mode (texture coding mode) using wavelet transformation is suitable as a high-quality coding scheme having various spatial resolutions ranging from high to low resolutions especially when synthesizing CG and natural images.

As the effects of wavelet coding, an image can be coded at once without any block division, thus no block distortion is generated even at a low bit rate, and mosquito noise can be decreased. In this manner, wide scalability from a low-resolution, low-quality image to a high-resolution, high-quality image, processing complexity, and tradeoff of the coding efficiency can be selected in accordance with an application in the MPEG4 still image coding mode.

<Hierarchical Coding (Scalability)>

Figure 24A:
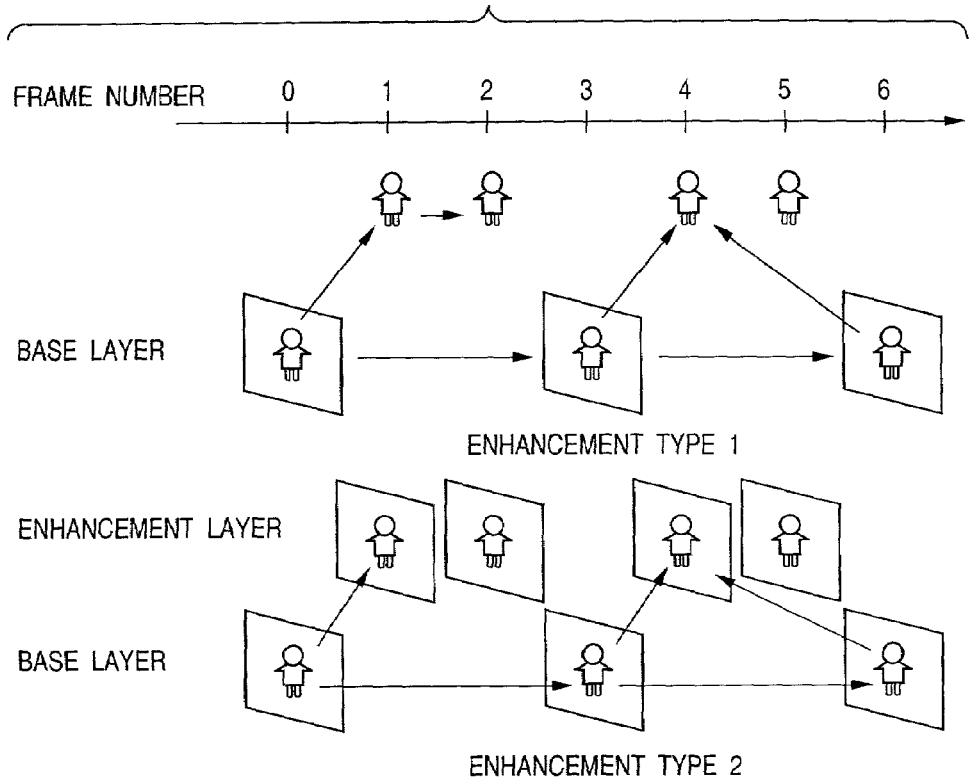
Figure 24B:
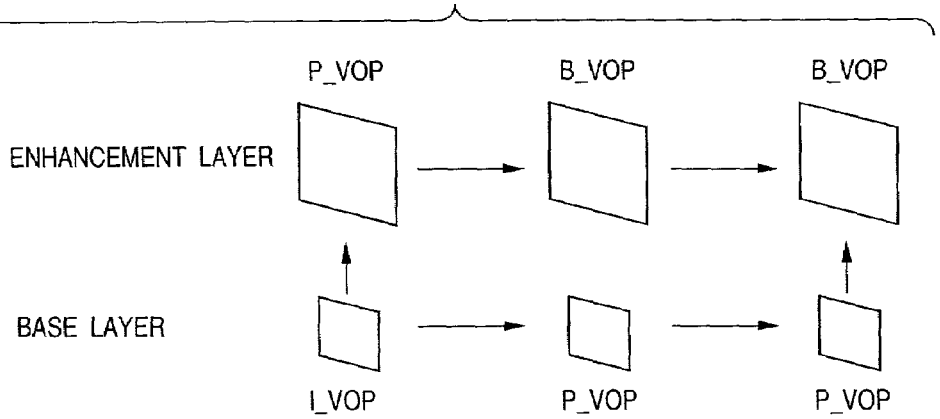

To realize scalability, a syntax hierarchical structure as shown in FIGS. 24A and 24B is formed.

Hierarchical coding is realized by using, e.g., a base layer as a lower layer and an enhancement layer as a higher layer, and coding "difference information" of improving the image quality of the base layer by the enhancement layer.

In spatial scalability, the base layer represents a low-resolution moving image, and (base layer+enhancement layer) represents a high-resolution moving image.

Hierarchical coding not only hierarchically improves the quality of an entire image, but also improves the quality of only an object region in the image. For example, for temporal scalability, the base layer is obtained by encoding an entire image at a low frame rate, and the enhancement layer is obtained by encoding data for increasing the frame rate of a specific object within the image.

[Temporal Scalability: FIG. 24A]

The temporal scalability hierarchically sets the frame rate, and the frame rate of the object of an enhancement layer can be increased. The presence/absence of the hierarchy can be set in units of objects. There are two types of enhancement layers: Type 1 is formed from part of the object of a base layer, and Type 2 is formed from the same object as that of a base layer.

[Spatial Scalability: FIG. 24B]

Spatial scalability hierarchically sets the spatial resolution. The base layer can be down-sampled to an arbitrary size. The base layer is used for prediction of an enhancement layer.

<Sprite Coding>

A sprite is a planar object which can be entirely expressed by uniform movement, rotation, deformation, or the like, such as a background in an image in the three-dimensional space. A method of coding a planar object is called sprite coding.

Sprite coding processes are classified into four, static, dynamic, online, and offline types. More specifically, object data is sent to a decoder in advance, and only a global motion coefficient is transmitted in real time. Sprites include a static sprite obtained by direct transformation of a template, a dynamic sprite obtained by predictive coding from a temporally preceding sprite, an offline sprite which is encoded by intra-coding (I-VOP) in advance and transmitted to the decoder side, and an online sprite simultaneously created by an encoder and decoder during coding.

Techniques examined for sprite coding are schemes (tools) such as static sprite coding, dynamic sprite coding, and global motion compensation.

[Static Sprite Coding]

Figures 25A, 25B:
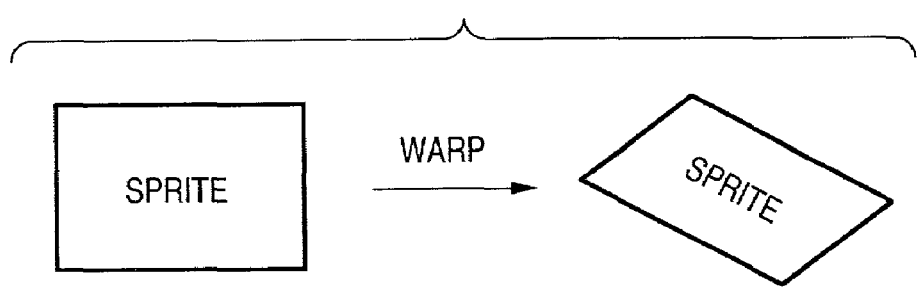
FIGS. 25A and 25B are views for explaining warp which expresses viewpoint movement in a three-dimensional space, such as image movement, rotation, enlargement, or deformation.

In static sprite coding, the background (sprite) of an entire video clip is coded in advance, and part of the background is geometrically transformed to express an image. The image of the cut part can be variously deformed, e.g., translated, enlarged, reduced, and rotated. As shown in FIG. 25B, expressing viewpoint movement in the three-dimensional space, such as image movement, rotation, enlargement, and deformation, is called warp.

FIG. 25A shows the types of warp. The types of warp include perspective transformation, affine transformation, isotropic enlargement (a)/rotation (θ)/movement (c,f), and translation. These methods are given by equations in FIG. 25A, and respective coefficients can represent movement, rotation, enlargement, deformation, and the like. A sprite is generated in an offline state before the start of coding.

In this way, static sprite coding is realized by cutting a partial region of a background image, and warping and expressing the region.

Figure 26:
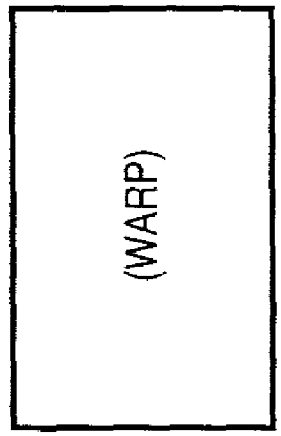
FIG. 26 is a view showing an example of a sprite image.

FIG. 26 is a view showing an example of a sprite image. A surrounded partial region in the entire background image is warped. More specifically, this background includes a background image such as an auditorium in a tennis match, and the warped portion includes an image with a motion part such as a player. In static sprite coding, only a geometric transformation parameter is coded without coding any prediction error.

[Dynamic Sprite Coding]

A sprite is generated before coding in the static sprite coding scheme, while a sprite can be updated in an online state during coding in the dynamic sprite coding scheme. The dynamic sprite coding is different from static sprite coding in that a prediction error is coded.

[Global Motion Compensation (GMC)]

Global motion compensation is a technique of expressing the motion of an entire object by one motion vector and compensating for the motion without dividing the motion into blocks. This technique is suitable for motion compensation of a rigid body or the like. Global motion compensation is the same as static sprite coding in that a reference image is an immediately preceding decoded image instead of a sprite, and that a prediction error is coded. However, global motion compensation is different from static sprite coding and dynamic sprite coding in that neither a memory for storing a sprite nor shape information are required. This is effective for the motion of an entire frame, an image including a zoomed image, and the like.

<Scene Structure Description Information>

Objects are synthesized based on scene building information. In MPEG4, building information for synthesizing objects into a scene is transmitted. Upon reception of individually coded objects, they can be synthesized into a scene intended by the transmitting side by using scene building information.

This scene building information contains the display time and display position of an object. The display time and display position are described as tree-like node information. Each node has relative time information and relative space coordinate position information on the time axis with respect to the parent node.

As a language for describing the scene building information, there are BIFS (BInary Format for Scenes) as a modification of VRML, and AAVS (Adaptive Audio-Visual Session Format) using Java. BIFS describes MPEG4 scene building information by binary information. AAVS is based on Java, has a high degree of freedom, and compensates for BIFS.

Figure 27:
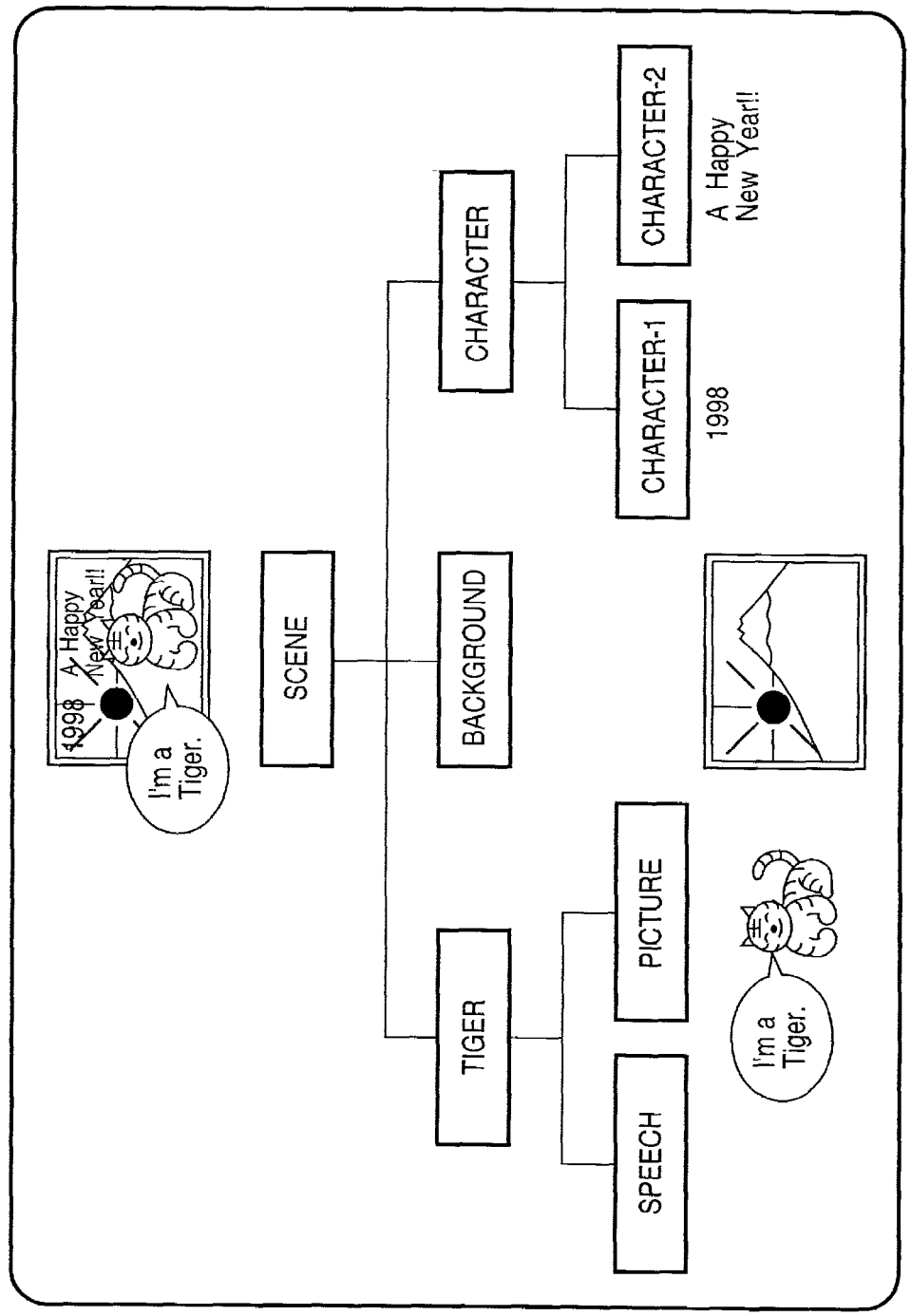
FIG. 27 is a view for explaining an arrangement of scene description information.

FIG. 27 shows a structure of scene description information.

<Scene Description>

A scene is described by BIFS (BInary Format for Scenes). In this case, a scene graph and node as a concept common to VRML and BIFS will be mainly explained. The node designates grouping of lower nodes having attributes such as a light source, shape, material, color, and coordinates, and subjected to coordinate transformation. The object-oriented concept is adopted, and the layout and viewing of objects in the three-dimensional space are determined by tracing a tree called a scene graph from the top node and inheriting the attributes of higher nodes. If a leaf node is synchronously assigned a media object, e.g., MPEG4 video bitstream, a moving image can be synthesized with other graphics in the three-dimensional space and output.

The difference from VRML is as follows.

The MPEG4 system supports by BIFS:

1. Two-dimensional overlap relationship description of MPEG4 video VOP coding, and MPEG4 audio synthetic description 2. Synchronous processing of successive media streams 3. Expression of dynamic behavior of an object (e.g., sprite)

4. Standardization of the transmission form (binary)

5. Dynamic change of scene description during a session

Nearly all the VRML nodes are supported by BIFS except that Extrusion, Script, Proto, Extem Proto, and the like among VRML nodes are not supported.

Special MPEG4 nodes newly added by BIFS are as follows.

1. Node for 2D/3D synthesis
2. Node for 2D graphics and text
3. Animation node
4. Audio node It should be noted that VRML does not support 2D synthesis except for a special node such as a background, while BIFS expands description so as to process a text, graphic overlay, and MPEG4 video VOP coding in units of pixels.

At the animation node, a special node for an MPEG4 CG image such as a 3D mesh face is defined. A message (BIFS Update) capable of dynamically performing replacement, delete, addition, and attribute change of a node in a scene graph allows displaying a new moving image and adding a button on a frame during a session. BIFS can be realized by replacing a VRML reserved word, node identifier, and attribute value by almost one-to-one binary data.

<MPEG4 Audio>

FIG. 28 is a table showing the type of MPEG4 audio coding scheme.

Audio & audio coding includes parametric coding, CELP coding, and time/frequency conversion coding. Further, an SNHC audio function is also adopted, and this coding also includes SA (Structured Audio) coding and TTS (Text To Speech) coding. SA is a structural description language for synthesized speech including MIDI. TTS is a protocol for transmitting intonation or phonemic information to an external text to speech synthesizer.

Figure 29:
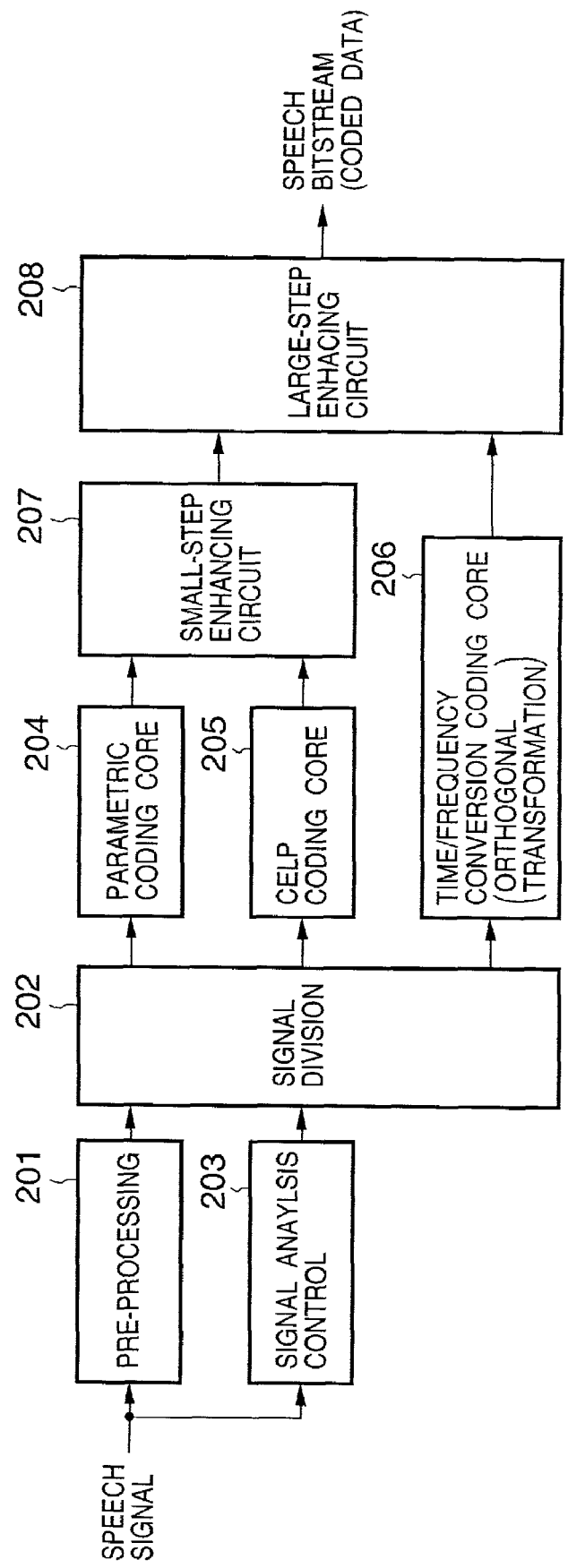
FIG. 29 is a block diagram for explaining an audio signal coding scheme.

FIG. 29 is a block diagram showing the arrangement of an audio coding scheme.

In FIG. 29, an input speech signal is pre-processed (201), and divided in signal division 202 in accordance with the band so as to properly use three encoders, i.e., parametric encoder, CELP encoder, and time/frequency encoder. The divided signals are respectively input to appropriate encoders. In signal analysis control 203, the input speech signal is analyzed to generate control information or the like for classification to the respective encoders in accordance with the signal. Subsequently, a parametric coding core 204, CELP coding core 205, and time/frequency conversion coding core 206 as different encoders execute coding processing based on respective coding schemes. The three coding schemes will be explained later. Of the coded audio data, outputs from the parametric coding core 204 and CELP coding core 205 are input to a small-step enhancing circuit 207. Outputs from the time/frequency conversion coding core 206 and small-step enhancing circuit 207 are input to a large-step enhancing circuit 208. The small- and large-step enhancing circuits 207 and 208 are tools for decreasing distortion generated in coding processing of each coding core. Audio data output from the large-step enhancing circuit 208 is a coded speech bitstream.

The arrangement of the audio coding scheme in FIG. 29 has been made.

The respective coding schemes will be explained with reference to FIG. 28.

<Parametric Coding>

Speech and tone signals are expressed as parameters such as the frequency, amplitude, and pitch, and coded. Parametric coding includes HVXC (Harmonic Vector Excitation Coding) coding for a speech signal, and IL (Individual Line) coding for a tone signal.

<HVXC Coding>

HVXC coding mainly targets on speech coding at 2 kbits/sec to 4 kbits/sec. Speech signals are classified into voiced and unvoiced sounds. For a voiced sound, the harmonic structure of the residual signal of an LPC (Linear Prediction Coefficient) is vector-quantized. For an unvoiced sound, a prediction residue directly undergoes vector excitation coding.

<IL Coding>

IL coding targets on tone coding at 6 kbits/sec to 16 kbits/sec. A signal is modeled by a line spectrum, and coded.

<CELP (Code Excited Linear Prediction) Coding>

CELP coding is a scheme of coding an input speech signal by dividing it into spectral envelope information and sound source information (prediction error). Spectral envelope information is represented by a linear prediction coefficient calculated by linear prediction analysis from an input speech signal.

MPEG4 CELP coding includes narrow-band CELP having a bandwidth of 4 kHz, and wide-band CELP having a bandwidth of 8 kHz. NB (Narrow Band) CELP can select a bit rate between 3.85 kbits/sec and 12.2 kbits/sec, and WB (Wide Band) CELP can select a bit rate between 13.7 kbits/sec and 24 kbits/sec.

<T/F (Time/Frequency) Conversion Coding>

T/F conversion coding is a coding scheme for high speech quality. This coding includes a scheme complying with AAC (Advanced Audio Coding), and TwinVQ (Transform-domain Weighted Interleave Vector Quantization).

An auditory psychological model is assembled in the T/F conversion coding arrangement, and subjected to adaptive quantization using an auditory masking effect.

<AAC-Compliant Scheme>

An audio signal is converted into a frequency by DCT or the like, and subjected to adaptive quantization using an auditory masking effect. The adaptive bit rate ranges from 24 kbits/sec to 64 kbits/sec.

<TwinVQ Scheme>

The MDCT coefficient of an audio signal is flattened using a spectral envelope obtained by performing linear prediction analysis for the audio signal. After interleaving, vector quantization is executed using two code lengths. The adaptive bit rate ranges from 6 kbits/sec to 40 kbits/sec.

<System Configuration>

Figure 30:
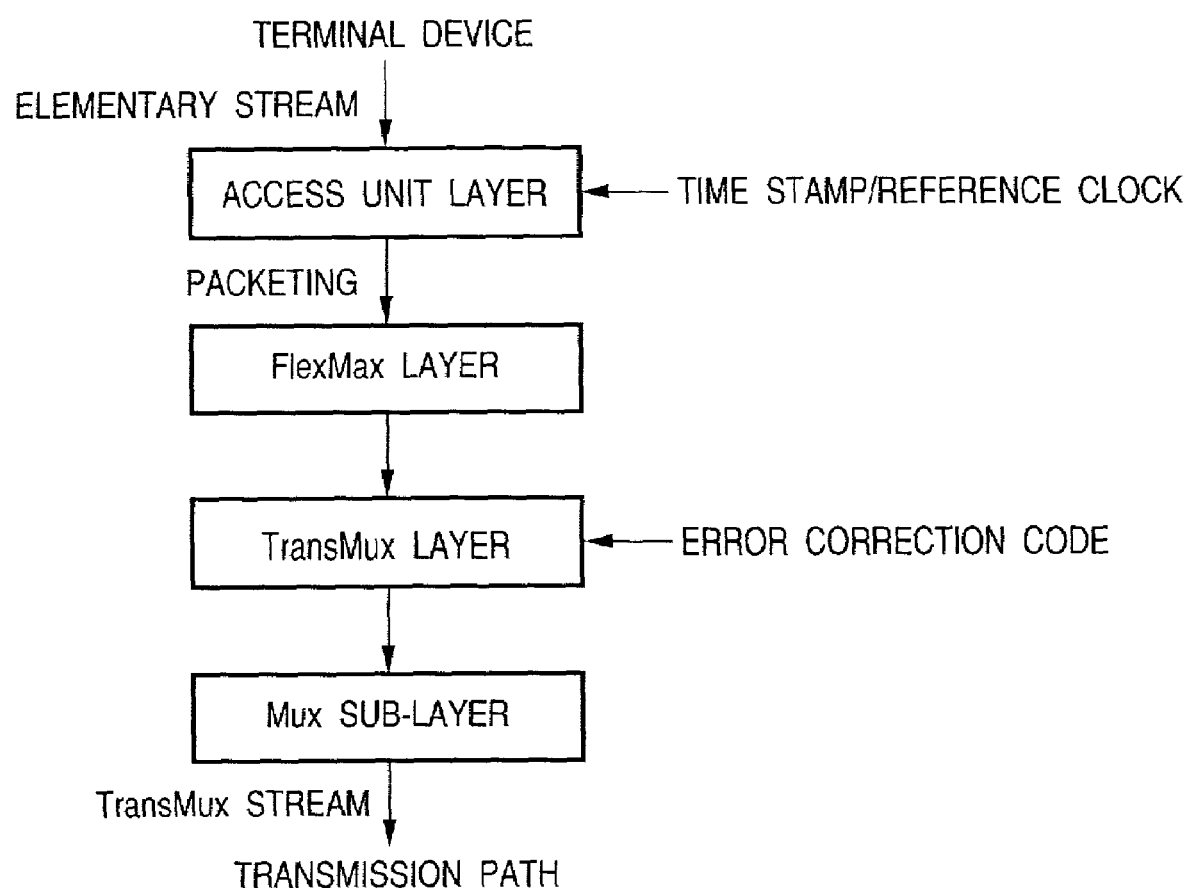
FIG. 30 is a view for explaining generation of a coded bitstream in MPEG4.

In the MPEG4 system part, multiplexing, demultiplexing, and composition are defined, which will be described with reference to FIG. 30.

In multiplexing, each elementary stream such as an object as an output from a picture or audio encoder, or each scene building information which describes the time-space arrangement is packeted by an access unit layer. The access unit layer adds as a header a time stamp and reference clock for establishing synchronization for each access unit. A packeted stream is multiplexed by a FlexMux layer in the display or error robust unit, and sent to a TransMux layer.

In the TransMux layer, a protection sub-layer adds an error correction code in accordance with the necessity of error robustness. At last, a Mux sub-layer transmits the resultant stream as one TransMux stream to a transmission path. The TransMux layer is not defined in MPEG4, and can utilize UDP/IP (User Datagram Protocol/Internet Protocol) as an Internet protocol, or an existing network protocol such as MPEG2 TS (Transport Stream), ATM (Asynchronous Transfer Mode) AAL2 (ATM Adaptation Layer 2), a video phone multiplexing scheme (ITU-T recommendation H.223) using a telephone circuit, or digital audio broadcasting.

The access unit layer and FlexMux layer can be bypassed to decrease the overhead of the system layer and easily embed a conventional transport stream.

On the decoding side, a buffer (DB: Decoding Buffer) is disposed on the output stage of demultiplexing in order to synchronize objects, and absorbs the difference in arrival time or decoding time between objects. Before composition, a buffer (CB: Composition Buffer) is arranged to adjust the display time.

<Basic Structure of Video Stream>

Figure 31:
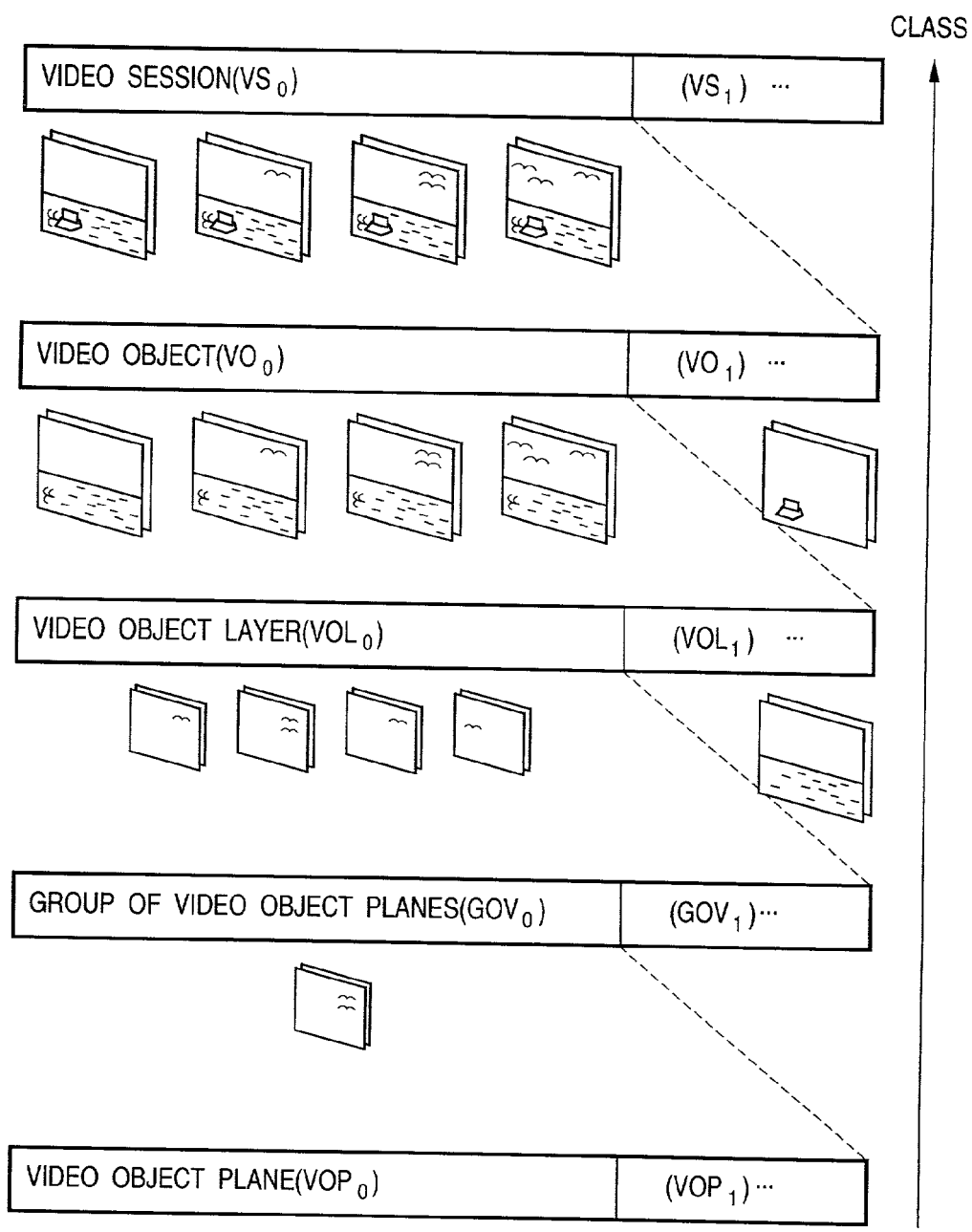
FIG. 31 is a view for explaining an MPEG4 layer structure.

FIG. 31 shows a layer structure.

Each layer is called a class, and each class has a header. The header contains various kinds of coding information in addition to the start code, end code, ID, shape, and size.

[Video Stream]

A video stream is made up of a plurality of sessions. The session is a closed sequence.

[VS] (Video Session) is made up of a plurality of objects.

[VO] (Video Object)

[VOL] (Video Object Layer) is an object unit sequence including a plurality of layers.

[GOV] (Group Of Video object plane) is made up of a plurality of planes.

The plane (object for each frame) has an error robust bitstream structure.

In MPEG4, the coding scheme itself has transmission error robustness so as to cope with mobile communication (radio communication). In the conventional standard scheme, however, error correction is mainly done on the system side. In a PHS network or the like, the error rate is very high, and errors which cannot be completely corrected on the system side may leak to a video coded portion.

Considering this, MPEG4 assumes various error patterns which cannot be completely corrected on the system side, and realizes an error robust coding scheme which suppresses propagation of an error as much as possible even in this environment.

A detailed error robust method for image coding, and a bitstream structure therefor will be explained.

Figure 32A:
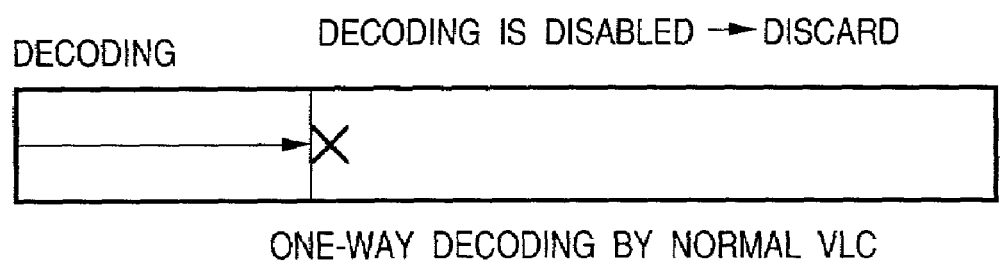
FIGS. 32A and 32B are views for explaining bidirectionally decodable variable-length coding.
Figure 32B:
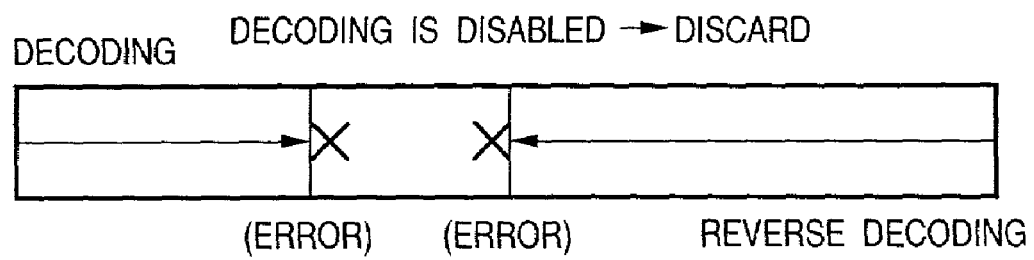

(1) RVLC (Reversible VLC) and Two-Way Decoding (FIGS. 32A, 32B)

FIG. 32A is a view for explaining one-way decoding by normal VLC. If mixing of an error is confirmed during decoding, decoding processing is suspended at that time.

FIG. 32B is a view for explaining two-way decoding processing. If mixing of an error is confirmed during decoding, decoding processing is suspended, and the next sync signal is detected. Upon detecting this sync signal, the bitstream is decoded in an opposite direction from the suspended portion. Thus, the number of decoding start points increases without any new additional information, and the information amount decodable upon generation of an error can be increased, compared to a conventional scheme. A variable length code decodable in both forward and backward directions can realize "two-way decoding".

Figure 33A:
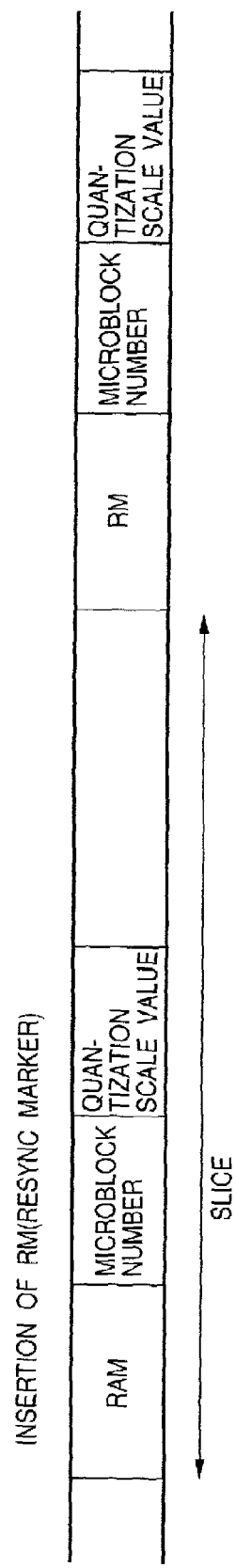
FIGS. 33A and 33B are views for explaining enhancement of error robustness in MPEG4.

(2) Transmission of Important Information a Plurality of Number of Times (FIG. 33A)

An arrangement capable of transmitting important information a plurality of number of times can be adopted to enhance error robustness. For example, displaying each VOP at a correct timing requires a time stamp, and this information is contained in the first video packet. Even if this video packet is lost due to an error, the structure enables resuming decoding processing from the next video packet. However, this video packet does not have any time stamp, so the display timing cannot be attained. To prevent this, MPEG4 adopts a structure capable of setting an HEC (Header Extension Code) flag in each video packet and adding important information such as a time stamp. After the HEC flag, a time stamp and VOP coding mode type can be added.

If step-out of packets occurs, decoding starts from the next sync recovery marker (RM). In each video packet, necessary information (first MB number contained in the packet and a quantization step size for the MB) is set immediately after RM. After this information, an HEC flag is inserted. For HEC=1, TR and VCT are added immediately after HEC. With the pieces of HEC information, even if the start video packet fails in decoding and is discarded, a video packet having HEC=1 and subsequent video packets can be correctly decoded and displayed. Whether HEC is set to "1" can be freely set on the decoding side.

Figure 33B:
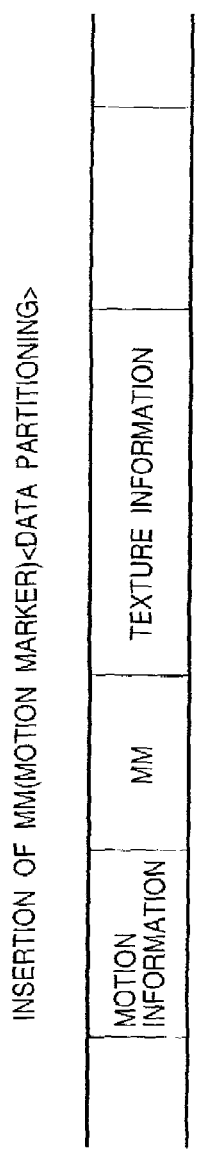

(3) Data Partitioning (FIG. 33B)

On the encoder side, a bitstream is constituted by repeating coding processing in unit of MBs. If an error is mixed in the bitstream, subsequent MB data cannot be decoded.

Assume that a plurality of pieces of MB information are classified into several groups, and pieces of MB information in the respective groups are arranged in a bitstream. In this case, marker information is assembled at the boundary of each group. Even if an error is mixed in the bitstream, and subsequent data fail in decoding, synchronization is established at the marker at the end of the group, and data of the next group can be correctly decoded.

A data partitioning method of grouping video packets into motion vectors and texture information (DCT coefficients or the like) on the basis of this concept is employed. A motion marker is set at the boundary between the groups. Since a DCT coefficient after MM can be correctly decoded even if an error is mixed in motion vector information, MB data corresponding to a motion vector before mixture of the error can be accurately reconstructed together with the DCT coefficient. Even when an error is mixed in a texture portion, an image accurate to a certain degree can be interpolated and reconstructed (concealment) using motion vector information and preceding decoded frame information as far as the motion vector is accurately decoded.

(4) Variable Length Interval Sync Scheme

A sync recovery method using a variable length packet will be explained. MBs with a sync signal at the start are called a "video packet", and the number of MBs contained in the video packet can be freely set on the encoding side. When an error is mixed in a bitstream using a VLC (Variable Length Code), subsequent codes cannot be synchronized and decoded. Even in this case, subsequent information can be correctly decoded by detecting the next sync recovery marker.

<Byte Alignment>

A bitstream-adopts a byte alignment structure so as to match a system in which information is multiplexed by an integer multiple of bytes. To attain byte alignment, stuff bits are inserted at the end of each video packet. These stuff bits are also used as an error check code in the video packet.

The stuff bits are formed from a code made up of "1"s except for the first bit "0", such as "01111". If up to the last MB in the video packet is correctly decoded, the next code is necessarily "0", and "1"s smaller in number by one bit than the stuff bit length must be successive. Hence, when a pattern which does not obey this rule is detected, previous decoding has not correctly been done, and mixture of an error in the bitstream can be detected.

The MPEG4 technique has been described. This is described in "Outline of International Standard MPEG4 Was Determined", Nikkei Electronics Vol. 1997.9.22, pp. 147–168, "Full View of MPEG4 Is Coming Into Sight", Text of the Institute of Image Information and Television Engineers, 1997.10.2, and "Recent Standardization Trends and Image Compression Technique of MPEG4", Japanese Industry Engineering Center, 1997.2.3 Seminar Material.

[First Embodiment]

An MPEG4 system according to the first embodiment of the present invention will be described.

FIG. 1 is a block diagram showing the schematic arrangement of a reception/playback system according to the first embodiment. The reception/playback system can receive a program such as a television program to display it on a display device. Further, the reception/playback system can output a picture or audio played back by a recording/playback device such as a video recorder to a display device 13 to display or output the image or audio.

In FIG. 1, reference numeral 11 denotes a television broadcasting reception device (TV receiver) for receiving an MPEG4 coding type digital television program; and 12, a recording/playback device which records and plays back a picture, audio, or the like, and corresponds to, e.g., a player for recording received television information on a recording medium such as a video tape or DVD, or playing back a picture, audio, or the like recorded on a recording medium. The display device 13 receives picture and audio signals, and outputs them. The television broadcasting reception device 11 is a reception tuner device such as an STB (Set-Top Box), and the recording/playback device 12 is a home server, digital VTR, or the like using a DVD, HD (Hard Disk), or the like. The representative product form of the display device 13 is a TV (television), display, or the like. Television broadcasting data received by the television broadcasting reception device 11 is displayed on the display device 13. A picture or audio recorded by the recording/playback device 12 and played back is displayed on the display device 13. This is the basic operation.

Figure 2:
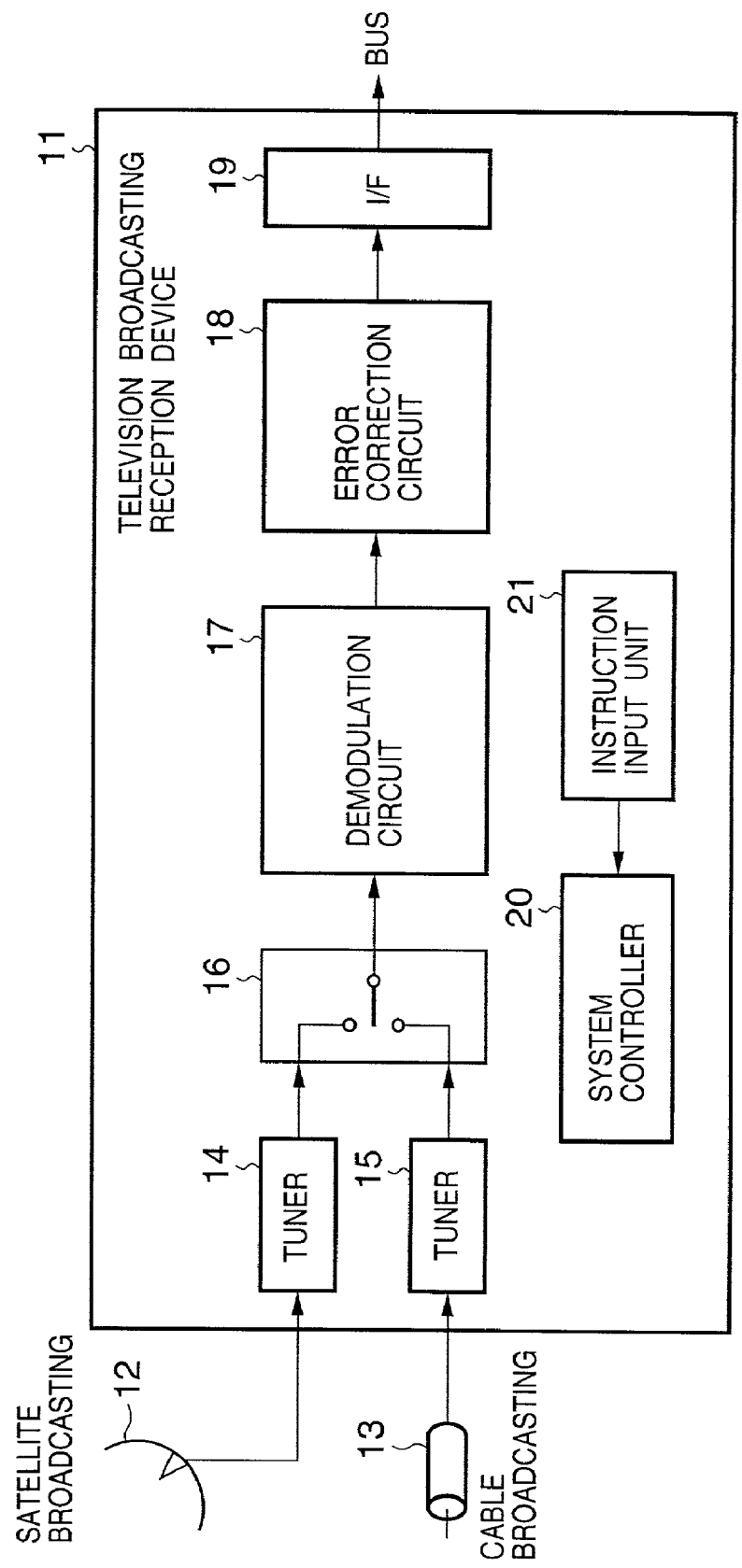
FIG. 2 is a block diagram showing the arrangement of a digital television broadcasting reception device according to the first embodiment of the present invention.

FIG. 2 is a block diagram showing the arrangement of the television broadcasting reception device 11 according to the first embodiment.

Digital television broadcasting data received by a satellite antenna 12 or by a cable television broadcasting terminal via a cable 13 is tuned by a tuner 14 or 15, and adjusted for reception. One of television data received from satellite television broadcasting and cable television broadcasting is selected by a data selector 16, demodulated by a demodulation circuit 17, and subjected to error correction processing by an error correction circuit 18.

An I/F (interface) 19 is a communication means for transmitting/receiving television broadcasting data, necessary command data, and the like to/from an external device. The I/F 19 is a representative digital communication interface. For example, the I/F 19 employs an IEEE 1394 serial bus, and comprises a data transmission/reception processing circuit necessary for data communication, a connector for connecting a cable (bus), and the like. A system controller 20 controls the respective units of the television broadcasting reception device 11. Various user operation instructions and the like are input from an instruction input unit 21 having an input means such as a switch. The television broadcasting reception device 11 in FIG. 2 has been described.

Figure 3:
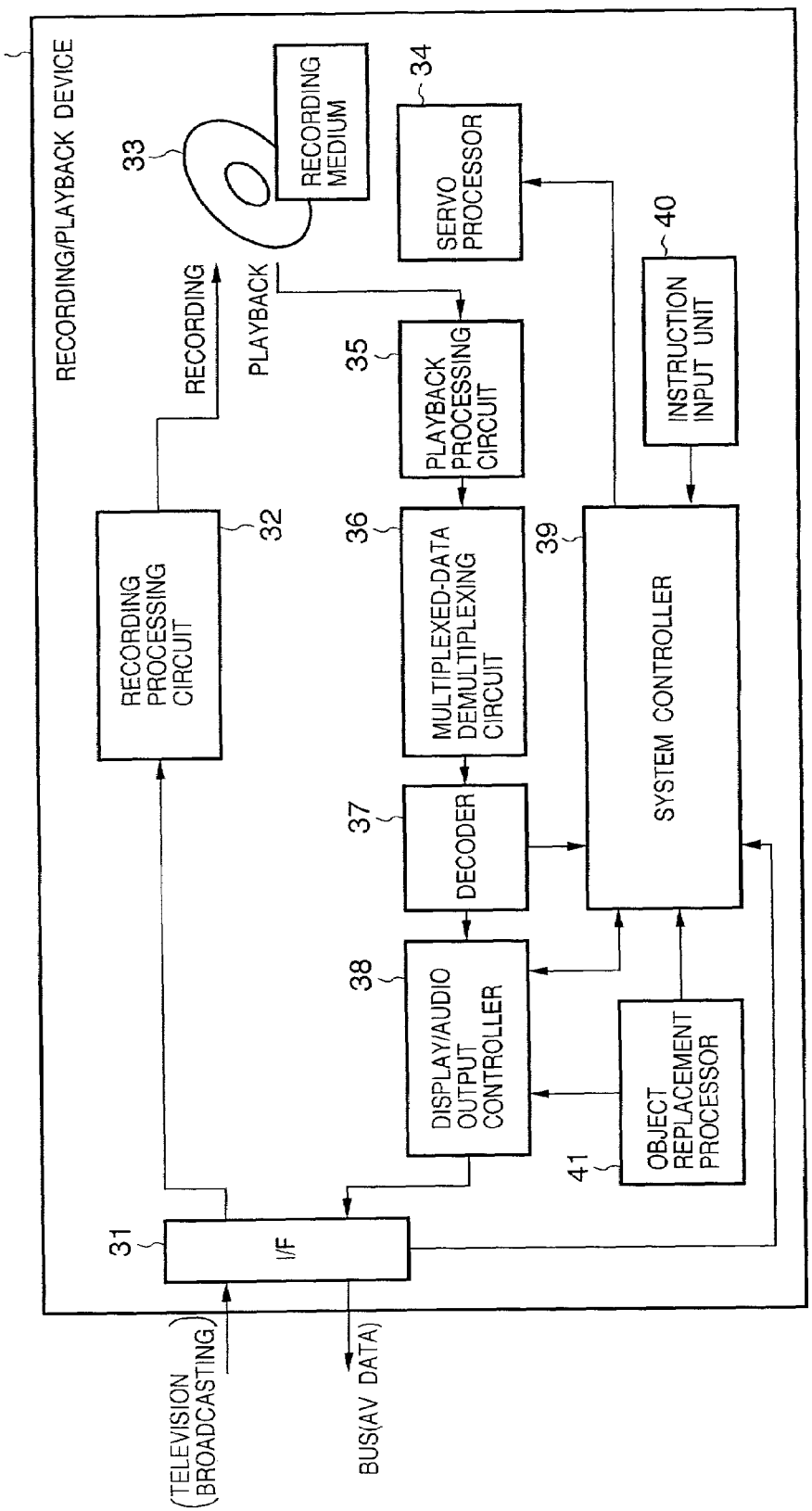
FIG. 3 is a block diagram showing the arrangement of a recording/playback device according to the first embodiment of the present invention.

FIG. 3 is a block diagram showing the detailed arrangement of the recording/playback device 12 according to the first embodiment.

Television broadcasting data and AV data are input/output via an I/F (interface) 31. The I/F 31 has compatibility which enables data communication between the television broadcasting reception device 11 and the display device 13.

In receiving and recording a television program, television data transmitted from the television broadcasting reception device 11 is input via the I/F 31, and subjected by a recording processing circuit 32 to recording processing of converting the television data into a data format suitable for a recording format and recording the converted data on a recording medium 33. The recording processing circuit 32 performs addition of additional data such as an error correction code, and if necessary, data processing such as conversion of the compression scheme (format). The television data having undergone recording processing in the recording processing circuit 32 is recorded on the recording medium 33 with a recording head (not shown).

In playing back image data recorded on the recording medium 33, video data (television data) recorded on the recording medium 33 is played back with a playback head (not shown). The played video data undergoes data reconstruction and error correction by processing reverse to recording processing.

The video data having undergone playback processing is decoded by a decoding scheme based on the MPEG4 coding scheme. The MPEG4 coding/decoding method has already been described. As the sequence, various multiplexed data are demultiplexed into image data, audio data, and another system data by a multiplexed-data demultiplexing circuit 36. Each demultiplexed data is decoded by a decoder 37, and output processing of the decoded data is controlled by a display/audio output controller 38. For each decoded object, an object replacement processor 41 executes object replacement processing as a characteristic feature of the first embodiment in which an object having a predetermined attribute such as an actual time image object (time, weather forecast, or the like) in recording the original image is not displayed, or such an object is not displayed and is replaced by current information (current time or the like) The arrangements and operations of the decoder 37, display/audio output controller 38, and object replacement processor 41, which play important roles in this processing, will be described in detail later.

An output from the display/audio output controller 38 including an output from the object replacement processor 41 is transmitted to the display device 13 via the I/F 31. A system controller 39 controls the operations of the respective units of the apparatus including a servo processor 34 for controlling rotation of a recording medium and recording/playback operation, the display/output controller 38, and the object replacement processor 41. When a command is transmitted from another device to the recording/playback device 12, the command input to the I/F 31 is transmitted to the system controller 39. The system controller 39 controls the operation in accordance with the command. A command from the user is input from an instruction input unit 40.

The structure of the bitstream of an MPEG4 digital television program will be explained.

FIG. 6 is a view showing an MPEG4 bitstream.

In FIG. 6, a data space from objects 1 to 5 (51 to 55) contains a natural image object, an audio object, and a synthesized image object such as a computer graphic (to be referred to as a CG hereinafter) though the types of objects change depending on program contents and progress. For example, for a news program, the synthesized image objects are a background object (sprite), a person's image, another natural image object, a synthesized image object such as emergency news prompt report, weather information image, or time display, and an audio object. In addition, scene description information 56 and additional data 57 are multiplexed as system data on the bitstream. The additional data 57 contains time information 58, object information 59, and another information 60. The object information 59 contains a genre code 61 representing a genre to which each of objects corresponding to objects 1 to 5 (51 to 55) belongs, an object code 62 representing details of the object, and a broadcasting station code 63 necessary for an object unique to the broadcasting station.

In the first embodiment, the attribute of each object is determined from the genre code 61, object code 62, and broadcasting station code 63 contained in the object information 59, and an object having a predetermined attribute is subjected to processing of changing the object to another object in playback.

The object information 59 will be explained with reference to the conceptual view of FIG. 7 for explaining its image.

FIG. 7 shows the image of the arrangement of the object information 59, and is a conceptual view of the arrangement of codes corresponding to respective broadcasting stations. The arrangement of the object information 59 shown in FIG. 6 is classified and displayed, as shown in FIG. 7.

The genre code 61 is information representing program contents such as "news", "professional baseball", or "extra-long show". The object code 62 is information about display targets such as a "time display object", "weather image object", "person's image object", . . . for "news". The remaining genres "professional baseball" and "extra-long show" are similarly constituted, as shown in FIG. 7. This data arrangement exists for each broadcasting station. A code representing this object information arrangement is used for each broadcasting station or commonly to stations, and various objects are listed. A device on the broadcasting station side and a device on the viewer side are set to understand the same code.

The operations of the decoder 37, display/audio output controller 38, and object replacement processor 41 described in the arrangement of the recording/playback device 12 in FIG. 3 will be described in detail, and object replacement processing will be exemplified.

Figure 5:
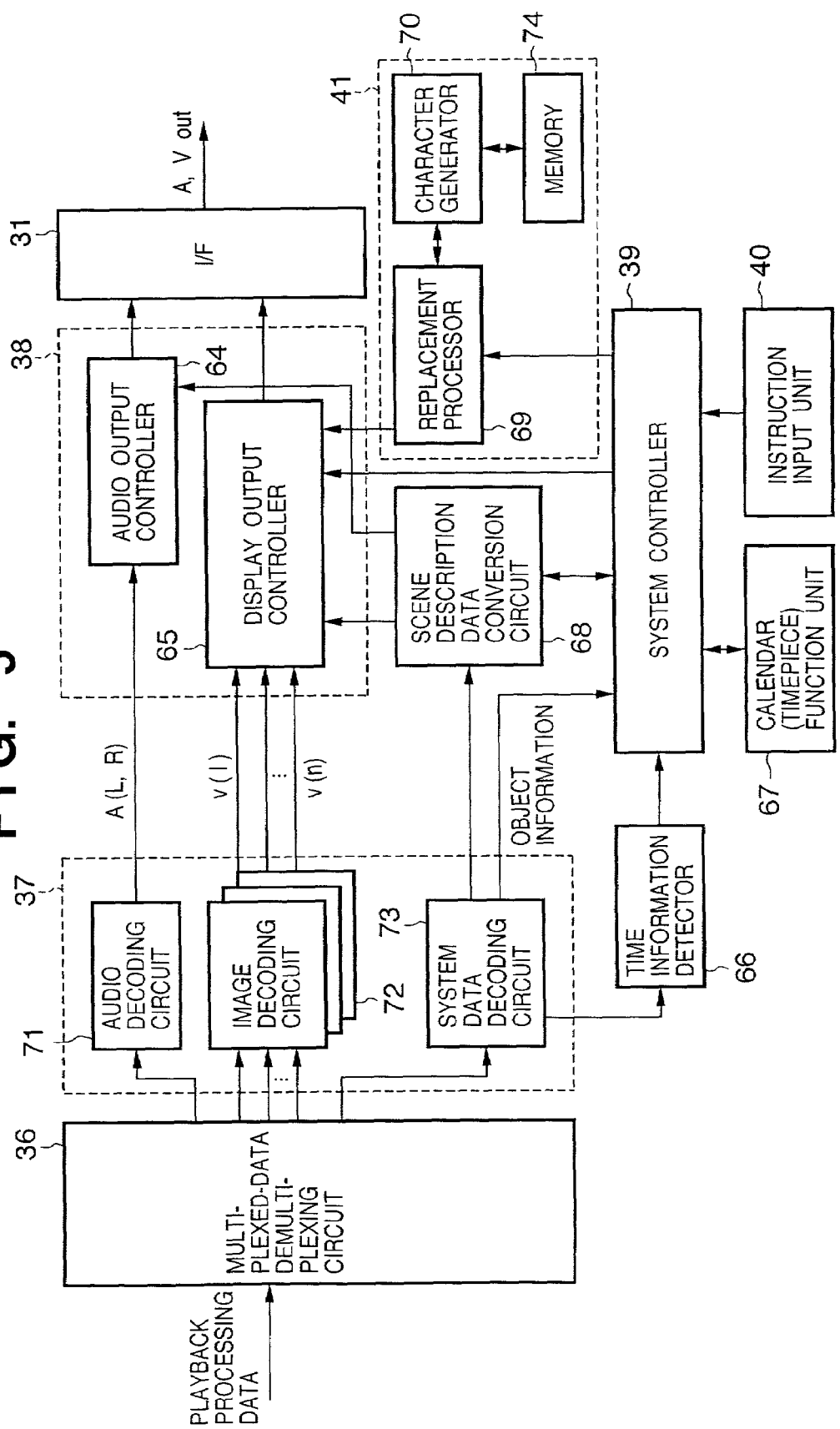
FIG. 5 is a block diagram for explaining the arrangement of the recording/playback device in FIG. 3 in more detail.

FIG. 5 is a block diagram showing the arrangement of the object replacement processor 41. The same reference numerals as in FIG. 3 denote the same parts, and a description thereof will be omitted.

In FIG. 5, video data having undergone playback processing is demultiplexed by the multiplexed-data demultiplexing circuit 36. Data are respectively decoded by an audio decoding circuit 71, image decoding circuit 72, and system data decoding circuit 73 included in the decoder 37.

Audio data is decoded by the audio decoding circuit 71, and input as stereo audio data (A(L), A(R)) to an audio output controller 64 in the display/audio output controller 38, where adjustment of the volume level and sound field localization, and compatibility to sound multiplex broadcasting using first and second sounds are executed. After audio to be output is selected, the audio data is transmitted together with image data from the I/F 31 in synchronism with it.

Image data is decoded by the image decoding circuit 72 having a plurality of identical decoding units in order to decode respective image objects in the image data. The decoded image data serves as image data (v(1) to (n)) corresponding to the number of objects. These image data are subjected to various display processing and control operations by a display output controller 65 in the display/audio output controller 38. Display output control includes output control of whether to display a predetermined object, and control of synthesizing a plurality of objects and a character-generated image and outputting the synthesized image as one output image. The display-output-controlled image data is transmitted from the I/F 31.

System data (containing scene description data and additional data) is decoded by the system data decoding circuit 73. Time information (clock data) contained in the additional data in the system data is detected using a time information detector 66 from the decoded system data. The detected time information is input to the system controller 39, and can be used as the recording time determination criterion. Of the system data decoded by the system data decoding circuit 73, scene description data is input to a scene description data conversion circuit 68. The remaining system data and additional data are input as various commands to the system controller 39, and object information is contained in these data.

An output from the scene description data conversion circuit 68 is used to output the basic form of a scene in the audio output controller 64 and display output controller 65, and is also sent to the system controller 39.

Upon playing back video data, the time detected by the time information detector 66 is the past time. At this time, non-display processing or object replacement processing is executed for an object having a predetermined attribute. The system controller 39 determines whether time information having a real-time attribute is contained, from the detection result of the time information detector 66 and object information. If a predetermined object having a real-time attribute exists, display of the predetermined object is instructed to the display output controller 65 so as not to display the predetermined object (non-display processing).

The non-display object can also be replaced by a newly generated object (character) to display the newly generated object. In this case, replacement processing is instructed to a replacement processor 69 in the object replacement processor 41 in addition to non-display processing, and replacement processing is executed using another object instead of the target object. More specifically, a "time display object" will be exemplified as a replaceable object having a real-time attribute. Using original data of a character image held in a memory (ROM) 74, a character generator 70 generates a time display character image which will replace the time display object. Current time information at this time is obtained from a calendar (timepiece) function unit 67 via the system controller 39, and a time display character image representing the obtained current time is generated. The replacement processor 69 adds information representing the display position as if the generated time display character image representing the current time was the original time display object displayed on the original image. Then, the resultant data is input to the display output controller 65 where the data is synthesized into image data and displayed.

Non-display processing of an object played back by the recording/playback device 12, and object replacement processing have been described.

Note that non-display processing of a played object is not limited to the use of the playback data time information detection means. All playback data can be recognized as past data. Thus, all predetermined objects having real-time attributes in playback can be controlled not to display them.

A case wherein time information is lost owing to any error or data is lost from the beginning can be similarly dealt with.

Object replacement processing has been explained by "time display", but the present invention can also be applied to another image object.

Needless to say, the original object of a playback image can be directly displayed. According to the first embodiment, an image object (display position: X,Y) to be displayed can be arbitrarily selected by arbitrarily switching a switch 201 between the image object (display position: X,Y) of a played-back original and a replacement image object formed from a character generated by the above-mentioned procedures. By adjusting position data, the display position of an object can be moved.

The display device 13 for displaying AV data output from the recording/playback device 12 will be explained.

Figure 4:
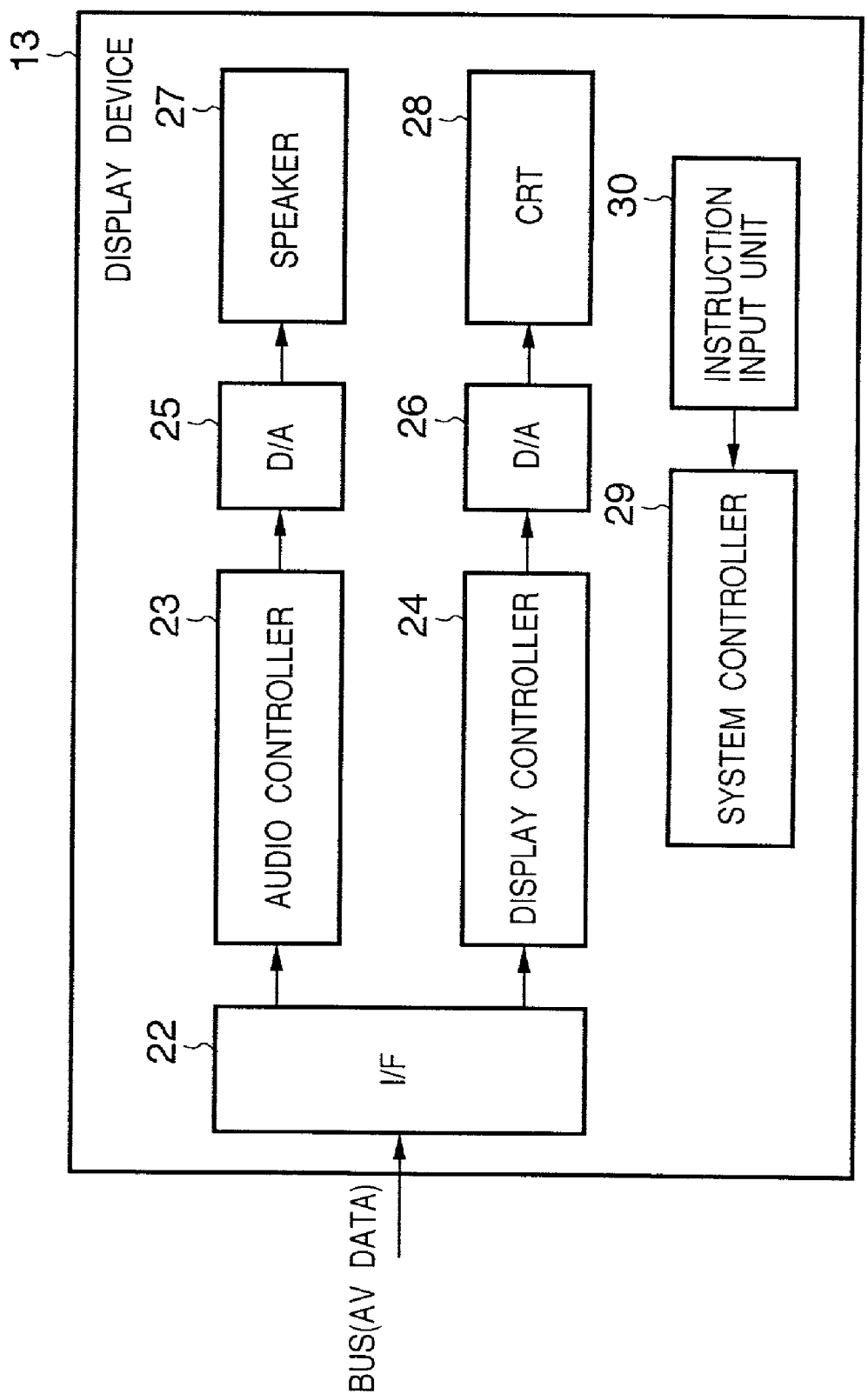
FIG. 4 is a block diagram showing the arrangement of a display device according to the first embodiment of the present invention.

FIG. 4 is a block diagram showing the detailed arrangement of the display device 13 according to the first embodiment.

The display device 13 receives AV data from an I/F (interface) 22 via a bus. Of the input AV data, audio data is output from an audio controller 23 at a timing synchronized with display of image data, and converted into an analog signal by a D/A converter 25. Then, the analog signal is output and played back from stereo speakers 27. Image data is input to a display controller 24 where the display timing and display form are adjusted. After the image data is converted into an analog signal by a D/A converter 26, the analog signal is displayed on a CRT 28. A system controller 29 controls these units. An instruction input such as a display adjustment instruction from the user is input from an instruction input unit 30, and sent to the system controller 29.

The display device 13 of the first embodiment has been described. Since the arrangement of the display device 13 does not influence the characteristic features of the present invention, the display device 13 is not limited to the form shown in FIG. 4, and may be an LCD (Liquid Crystal Display) or the like.

An example of the display form according to the first embodiment of the present invention will be explained.

Figure 9A:
FIGS. 9A and 9B are views showing display examples in the embodiment.
Figure 9B:
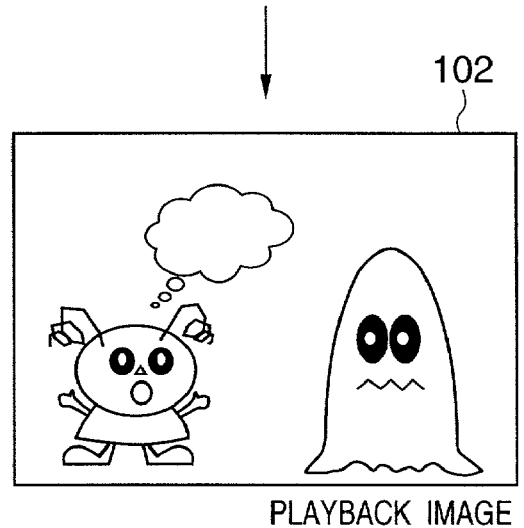

FIGS. 9A and 9B are views, respectively, showing an on-air (original) image 101 of a recorded image, and an example when a playback image 102 obtained by playing back the recorded image undergoes non-display processing.

As shown in FIG. 9A, the recorded on-air image 101 includes an "time display object (10:23)" representing the on-air time. In the playback image 102 of FIG. 9B, this "time display object" is not displayed.

Figures 10A, 10B:
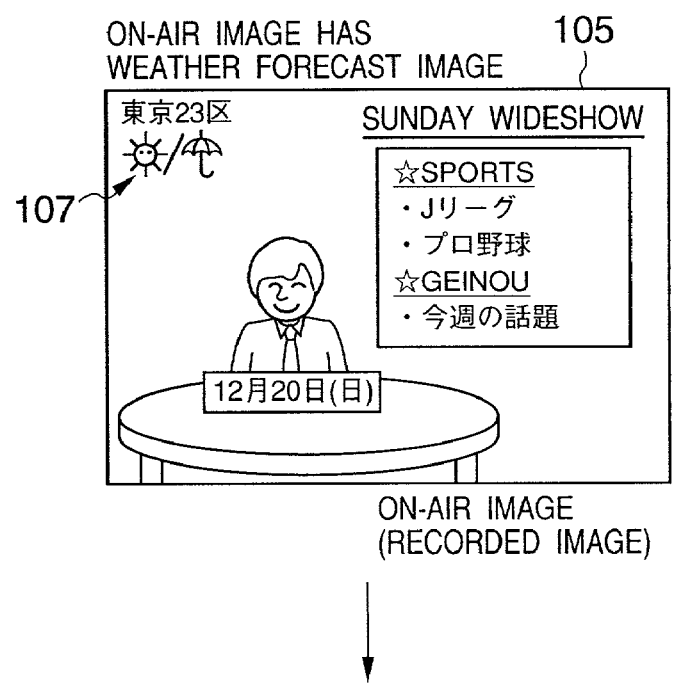
FIGS. 10A and 10B are views showing display examples in the embodiment.

FIGS. 10A and 10B are views showing an example different from "time display" in FIGS. 9A and 9B, and are views showing an example when a "weather forecast" image object is applied as information having another real-time attribute. Similar to FIGS. 9A and 9B, a "weather forecast" image object 107 included in an on-air (original) image 105 (FIG. 10A) serving as a recorded image is subjected to non-display processing, and is not displayed on a playback image 106 (FIG. 10B) obtained by playing back the image.

Figure 11A:
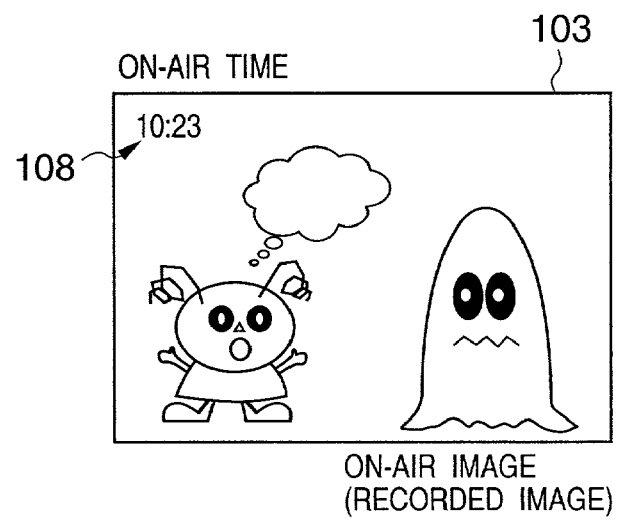
FIGS. 11A and 11B are views showing display examples in the embodiment.
Figure 11B:
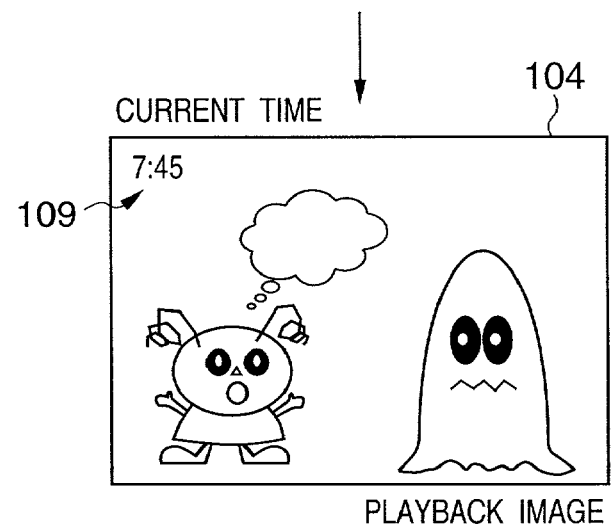

FIGS. 11A and 11B are views, respectively, showing an on-air (original) image 103 of a recorded image, and an example when a playback image 104 obtained by playing back the image undergoes object replacement processing.

The on-air image 103 recorded in the past includes a "time display object (10:23)" 108 representing the on-air time. In the current playback image 104, a "time display object (7:45)" 109 generated by a character representing the current image playback time is displayed in place of the "time display object".

Figure 12:
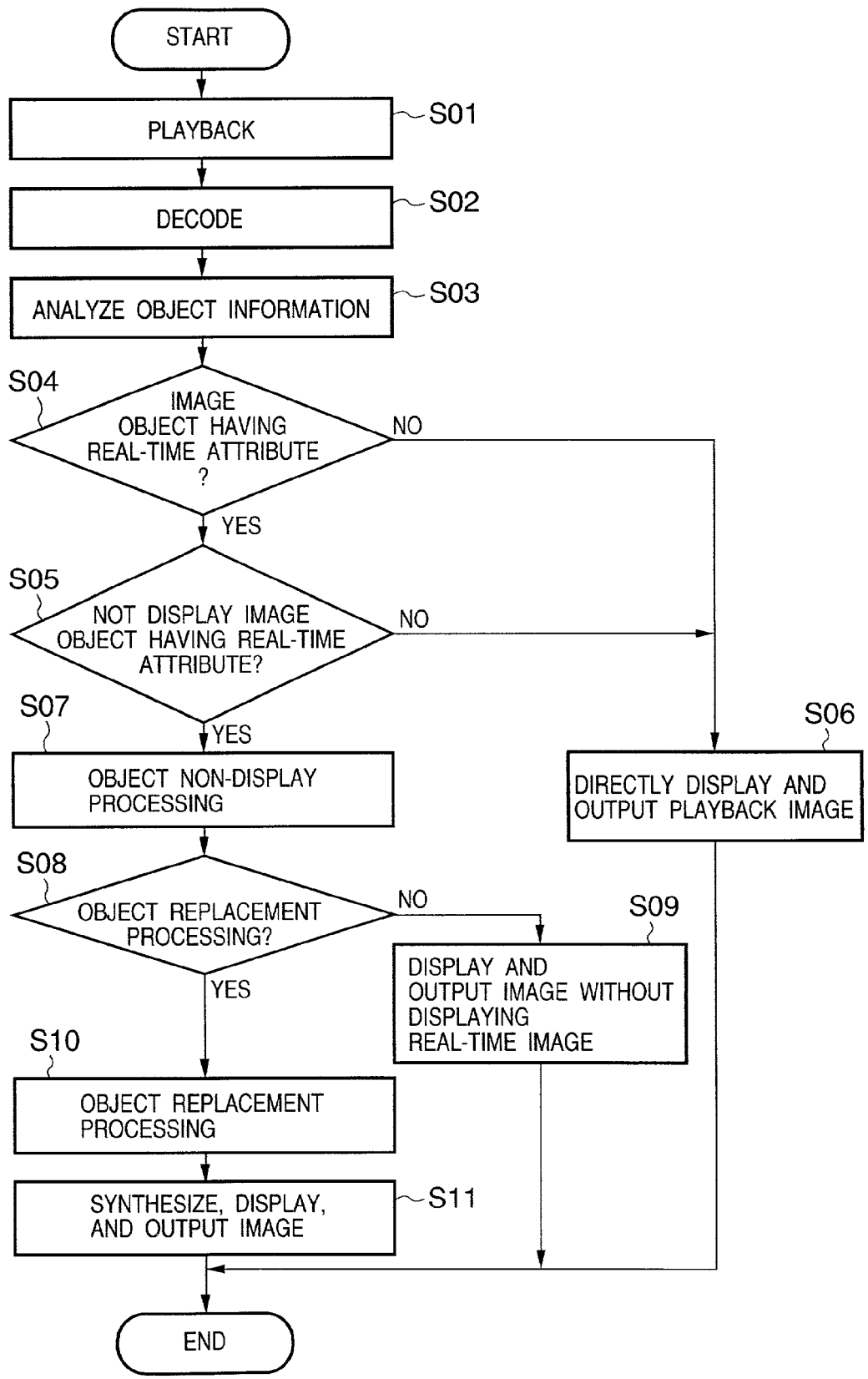
FIG. 12 is a flow chart for explaining an operation sequence according to the first embodiment of the present invention.

An operation sequence for image object non-display processing and image object replacement processing in the first embodiment of the present invention will be explained with reference to the flow chart of FIG. 12.

In step S01, the recording/playback device 12 shown in FIGS. 3 and 5 that can record/play back MPEG4 video data plays back video data from the recording medium 33 along with playback operation. The played video data is decoded in step S02, and pieces of object information of image objects constituting the video data are analyzed to check their attributes in step S03.

It is checked whether an image object having a code representing a real-time attribute exists as a result of analysis based on various codes represented by the pieces of object information (step S04). If YES in step S04, the flow shifts to step S05 to determine whether the image object having a real-time attribute is not displayed. If NO in step S04, and the image object having a real-time attribute is determined in step S05 to be displayed (NO in step S05), the flow shifts to step S06 to display and output the playback image as the are.

If YES in step S05, the flow advances to step S07 to execute object non-display processing by the above-described method. After non-display processing is executed, it is checked in step S08 whether to create a new image object (character) by the object replacement processor 41 on the basis of current information corresponding to the real-time image object, and replace the image object having the real-time attribute by the new image object. If NO in step S08, the flow advances to step S09 to display and output the playback image in a display form in which only the image object having the real-time attribute is not displayed.

If YES in step S08, the flow shifts to step S10 to execute object replacement processing by the above-described method. In object replacement processing, a character image (e.g., current time) is newly generated based on the current time, and synthesized as an image object with another playback image data (object). The resultant image is displayed and output (step S11).

In the first embodiment, the display form in video playback is controlled by analyzing object information. The present invention can be easily applied to an image object other than the above-mentioned image object having a real-time attribute.

According to the first embodiment, the apparatus and system having the above arrangements can realize more user-friendly video playback/display with a higher visual effect. More specifically, in playing back video data of a recorded television program, the apparatus and system can control not to display the on-air video display time different from the current time, or can replace the on-air video display time by time information of the video playback time and display the resultant data. This can prevent viewer's confusion in advance.

According to the first embodiment, playback output of a predetermined object can be controlled. As another effect, the number of dubbing operations can be limited for only a predetermined object, which is also effective in terms of copyrights.

[Second Embodiment]

The second embodiment of the present invention will be described. In the second embodiment, a display device comprises the non-display processing function for a predetermined object and the object replacement processing function that have been described in the first embodiment.

Figure 13:
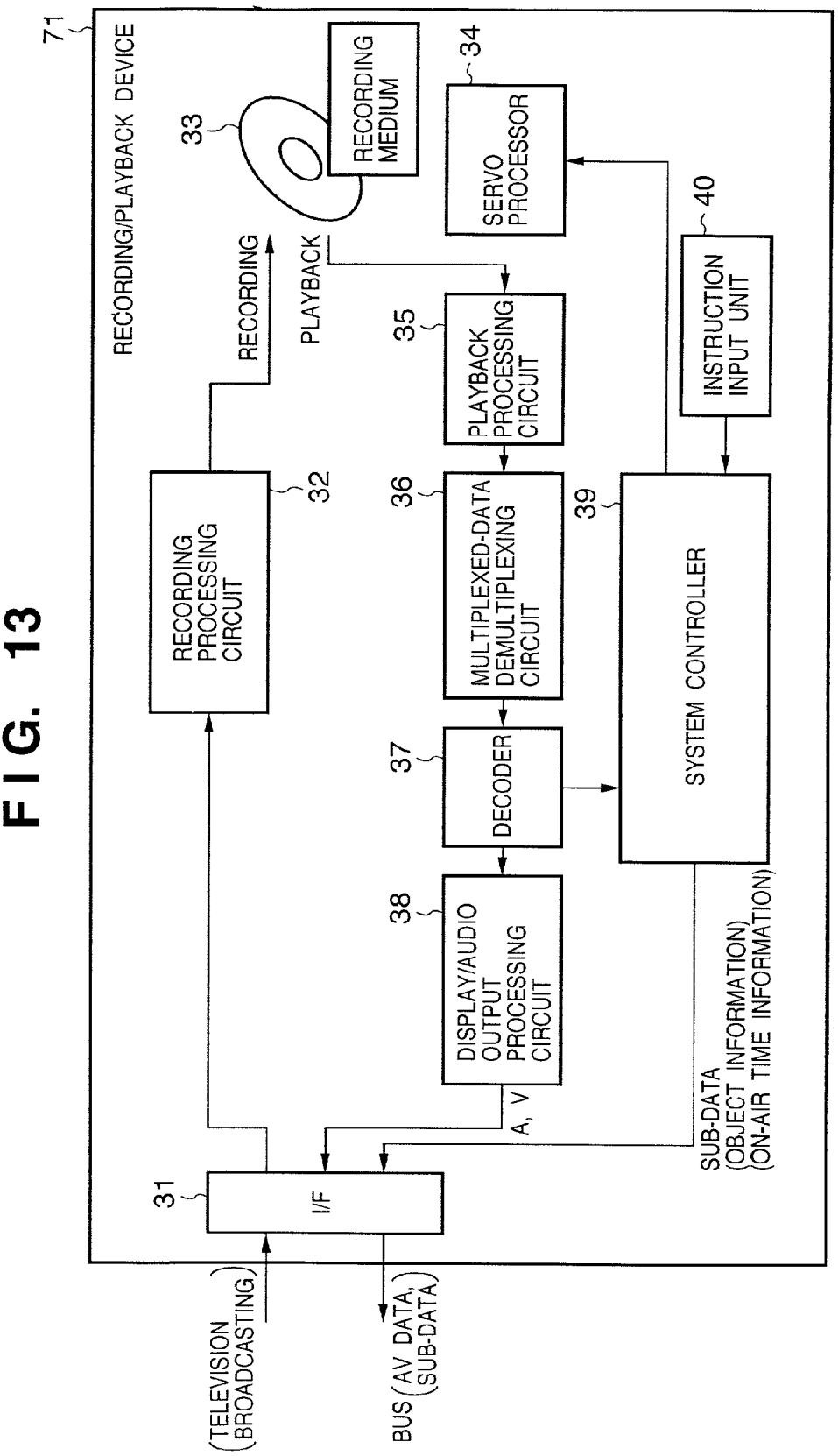
FIG. 13 is a block diagram showing the arrangement of a recording/playback device according to the second embodiment of the present invention.

FIG. 13 is a block diagram showing the arrangement of a recording/playback device 71 for recording and playing back MPEG4 video data according to the second embodiment of the present invention. The same reference numerals as in the arrangement of FIG. 3 denote the same parts, and a description thereof will be omitted. The recording/playback device 71 does not comprise the object replacement processor 41 in the recording/playback device 12 described with reference to FIG. 3.

The recording/playback device 71 outputs, from an I/F (interface) 31 to an external device via a bus, AV data obtained by decoding MPEG4 video data in playback, and sub-data containing object information detected in decoding and (on-air) time information.

Figure 14:
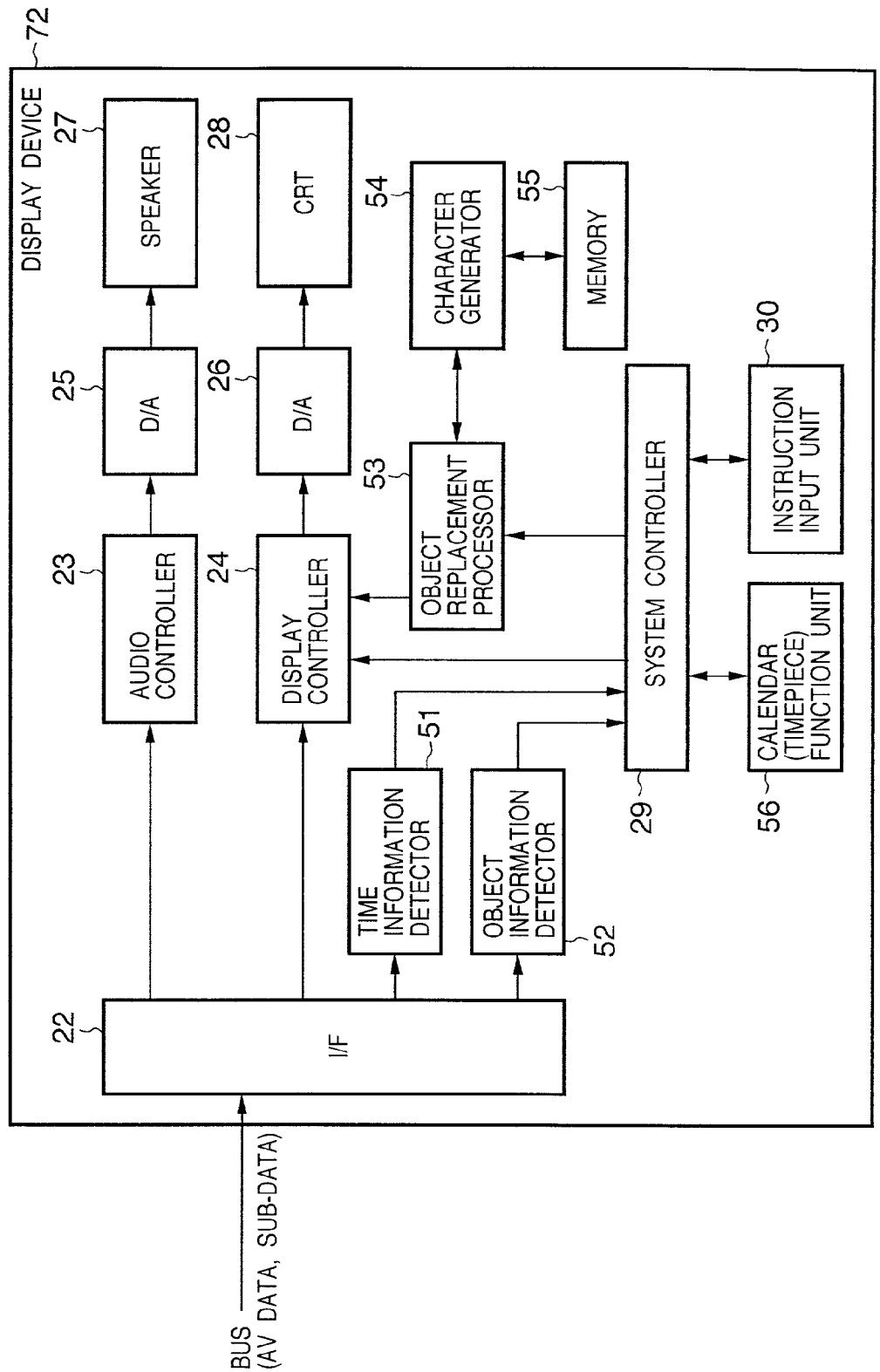
FIG. 14 is a block diagram showing the arrangement of a display device according to the second embodiment of the present invention.

FIG. 14 is a block diagram showing the arrangement of a display device 72 coping with display of an MPEG4 object image according to the second embodiment. The same reference numerals as in the arrangement of FIG. 4 denote the same parts, and a description thereof will be omitted.

The display device 72 receives, from an I/F (interface) 22, AV data and sub-data that are output and transmitted from the recording/playback device 71 in FIG. 3. From the sub-data, time information accessory to the AV data is detected by a time information detector 51, whereas object information is detected by an object information detector 52.

A system controller 29 determines the data recording time from the time information of the input AV data detected by the time information detector 51, compares the determined time with the current time from a calendar function unit 56, and if the two times are different, executes object non-display processing/replacement processing for an object having a predetermined attribute. At this time, the system controller 29 determines an object from the object information detected by the object information detector 52. If an object having a predetermined real-time attribute exists, the system controller 29 instructs a display output controller 24 capable of controlling display for each object to perform non-display processing so as not to display the predetermined object. Alternatively, the non-display object can be replaced by a newly generated object (character). In this case, in addition to non-display processing, the system controller 29 instructs an object replacement processor 53 to execute replacement display processing using another object instead of the target object.

More specifically, a "time display object" will be exemplified as a replaceable object. Using a character image held in a memory (ROM) 55, a character generator 54 generates a time display character image which will replace the target object. Current time information at this time is obtained from the calendar (timepiece) function unit 56 via the system controller 29, and a time display character image representing the obtained current time is generated. The object replacement processor 53 designates the display position or the like, and inputs the generated time display character image to the display output controller 24 so as to replace the original time display object by the generated time display character image. Then, the display output controller 24 synthesizes and displays the input image data.

Non-display processing of a predetermined object in image data of input AV data, and object replacement processing have been described.

An input image having undergone non-display processing or both non-display processing and object replacement processing in the display device according to the second embodiment is displayed in a form similar to FIGS. 9A and 9B, 10A and 10B, or 11A and 11B, as described in the first embodiment.

Object replacement processing has been explained by "time display", but the present invention can also be applied to another image object. An object included in a recorded image can be directly displayed.

Also in the second embodiment, an image object (display position: X,Y) to be displayed can be arbitrarily selected by arbitrarily switching a switch 201 between the image object (display position: X,Y) of an input original and a replacement image object formed from a character generated by the above-mentioned procedures. By adjusting position data of a display image, the display position of an object can be moved.

Figure 15:
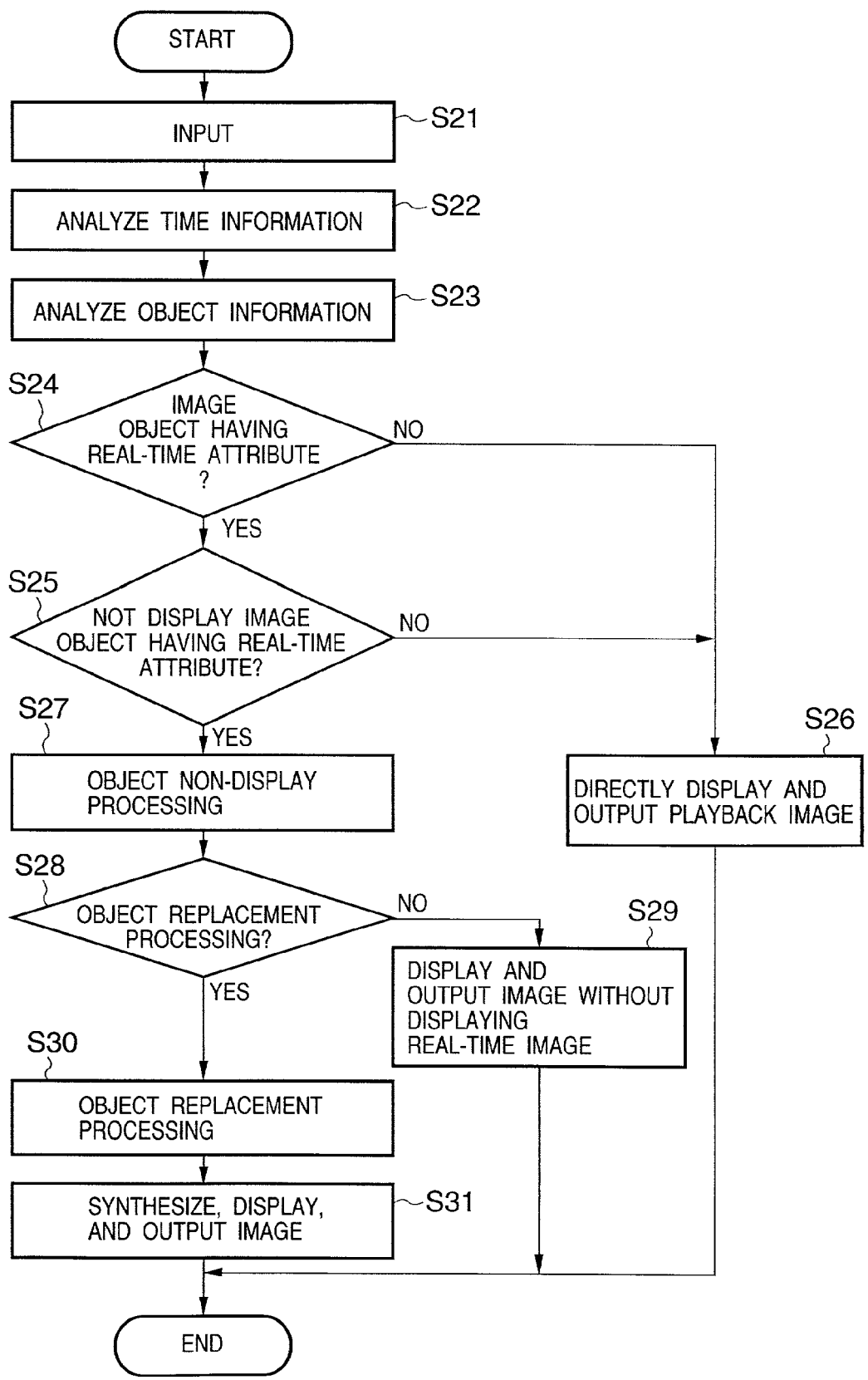
FIG. 15 is a flow chart for explaining an operation sequence according to the second embodiment of the present invention.

An operation sequence for image object non-display processing and image object replacement processing in the display device 72 according to the second embodiment of the present invention will be explained with reference to the flow chart of FIG. 15.

Upon reception of AV data and accessory sub-data (step S21), the display device 72 shown in FIG. 14 that can display MPEG4 AV data detects and analyzes time information in the sub-data (step S22), and acquires the time information representing the recording time of the AV data. Further, the display device 72 analyzes object information for image objects constituting the input image data, and checks their attributes (step S23). In step S24, it is checked whether an image object having a code representing a real-time attribute exists as a result of analysis based on various codes represented by the pieces of object information. If YES in step S24, the flow shifts to step S25 to determine whether the image object having a real-time attribute is not displayed.

If NO in step S24, and the image object having a real-time attribute is determined in step S25 to be displayed (NO in step S25), the flow shifts to step S26 to display and output the input image as they are.

If YES in step S25, the flow advances to step S27 to execute object non-display processing by the above-described method. After non-display processing is executed in step S27, it is also possible to create a new image object (character) based on current information corresponding to the real-time image object by the object replacement processor 53 and character generator 54, and replace the real-time image object by the new image object.

In this case, after object non-display processing is executed in step S27, the flow shifts to step S28 to check whether to execute object replacement processing. If NO in step S28, the flow advances to step S29 to display and output the input image in a display form in which only the real-time image object is not displayed.

If YES in step S28, the flow shifts to step S30 to execute object replacement processing by the above-described method. In object replacement processing in step S30, a character image is newly generated based on current information, synthesized as an image object with another input image data (object). The resultant image is displayed and output (step S31).

In the second embodiment of the present invention, the display form in video display is controlled by analyzing object information. The present invention can be easily applied to an image object other than the above-mentioned image object having a real-time attribute.

The display device according to the second embodiment realizes more user-friendly video display with a higher visual effect. More specifically, the display device which receives video data can control an input image having a time display object different from the current time so as not to display the time display object, or can replace the time display object by time information of the playback time and display the resultant image. This can prevent viewer's confusion in advance.

[Third Embodiment]

In the third embodiment, the attribute of each object is determined from a genre code 61, object code 62, and broadcasting station code 63 contained in object information 59, and an object having a predetermined attribute is subjected to processing of changing the object to another object in playback. As the predetermined attribute, an emergency news prompt report image (telop) object will be exemplified.

Figure 34:
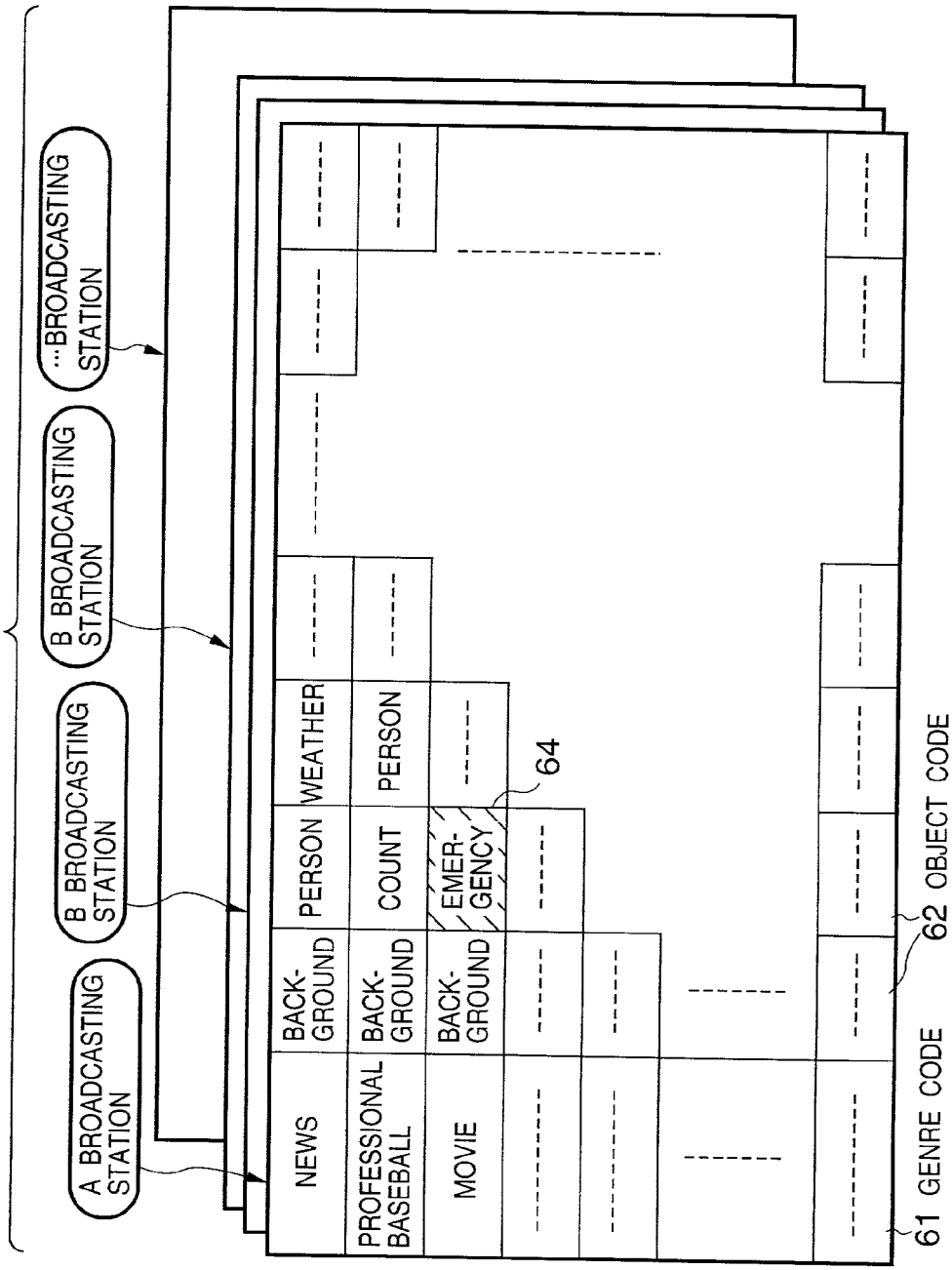
FIG. 34 is a conceptual view for explaining the arrangement of object information according to the third embodiment of the present invention.

FIG. 34 is a view for explaining each genre code 61 and a corresponding object code 62 for each broadcasting station. An image of the arrangement of each object information is illustrated, and a code arrangement corresponding to each broadcasting station is exemplified.

The genre code 61 is a code representing a program genre such as "news", "professional baseball", or "movie". For "news", the object code 62 is a "background image", "person's image", "weather forecast image", or the like. For "professional baseball", the object code 62 is a "background image", "count display image", "player image", or the like. For the genre "movie", the object code 62 is a "background", another image, or "emergency news image" 64 such as an earthquake prompt report. A combination of the genre code 61 and object codes 62 exists for each broadcasting station code 63 representing each broadcasting station.

Each broadcasting station provides a user with codes for identifying objects as pieces of object information by using a code common to respective stations or unique to a station. A device on the broadcasting station side and a device on the user side are set to understand the same code.

Figure 35:
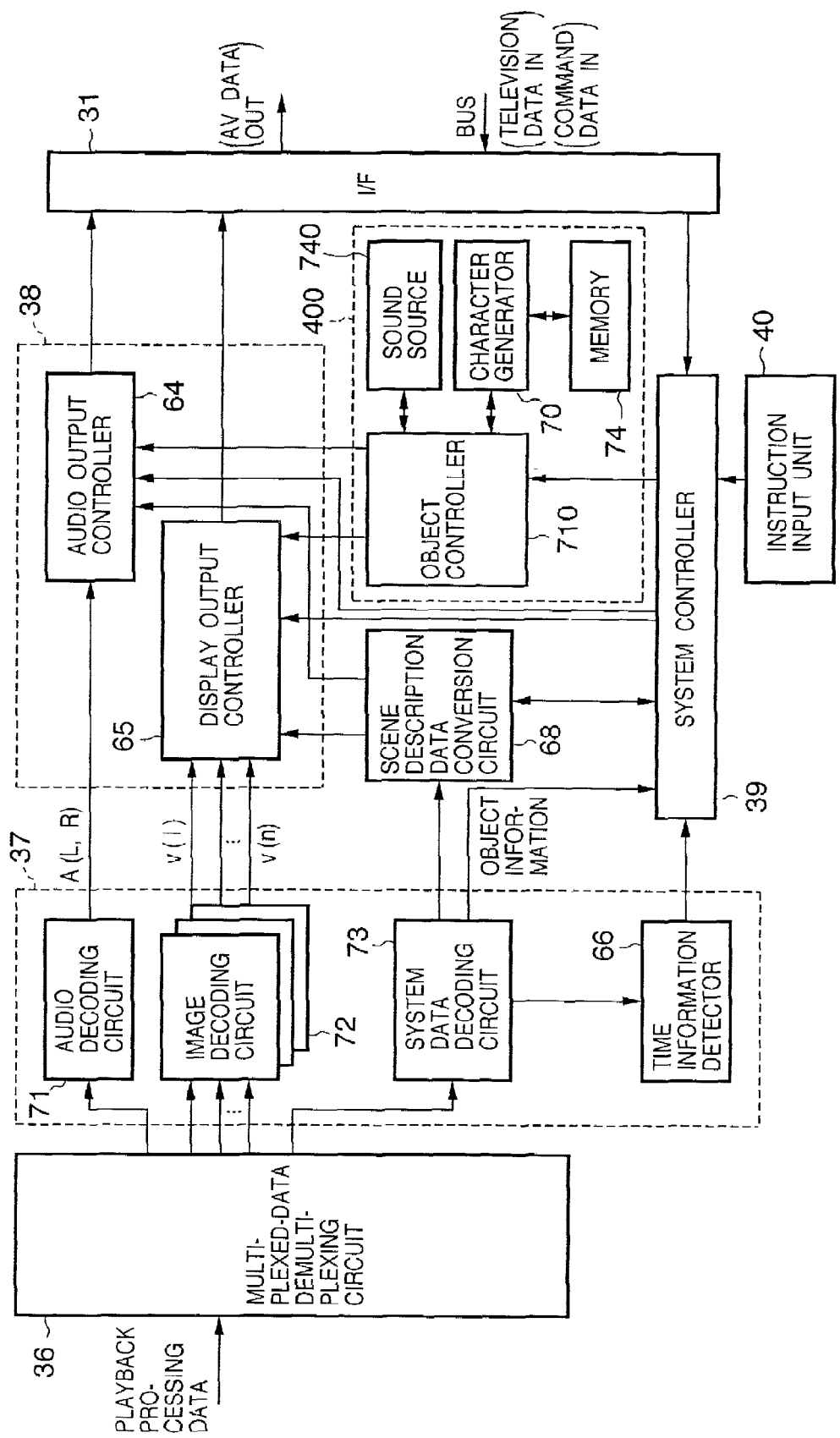
FIG. 35 is a block diagram showing the arrangement of a recording/playback device according to the third embodiment in detail.

FIG. 35 is a block diagram showing the arrangement of a portion relating to object playback/object form change processing in the arrangement of a recording/playback device 12 according to the third embodiment of the present invention. The same reference numerals as in FIG. 3 denote the same parts in FIG. 35, and a description thereof will be omitted.

In FIG. 35, video data which was played back from a recording medium 33 and processed by a playback processing circuit 35 is demultiplexed by a multiplexed-data demultiplexing circuit 36. Data are respectively decoded by an audio decoding circuit 71, image decoding circuit 72, and system data decoding circuit 73 included in a decoder 37.

Audio data is decoded by the audio decoding circuit 71, and sent as stereo audio data (A(L), A(R)) to an audio output controller 64 in a display/audio output controller 38, where adjustment of the volume level and sound field localization, compatibility to sound multiplex broadcasting using first and second sounds, and change and addition of an audio object are executed.

Image data is decoded by the image decoding circuit 72 having a plurality of identical decoding units in order to decode respective image objects in the image data. Image data corresponding to the objects decoded by the image decoding circuit 72 serve as image data (v(1) to v(n)) corresponding to the number of objects. These image data are sent to a display output controller 65 of the display/audio output controller 38, and subjected to various display processing and control operations.

An object having a predetermined attribute undergoes processing of changing the playback (reproducing) form by the respective units of the display/audio output controller 38. As a playback form change example, when an image object such as an emergency news telop as a predetermined object attribute is played back, additional processing is executed for the object by any one of following (A) to (D).
(A) The image object is replaced by an icon object using an internally generated character image.
(B) The image object of the original emergency news is played back.
(In addition to (B), recording time information is added and displayed.)
(C) Change of the playback form is indicated by a warning sound using an audio object.
(D) No display is performed.

Alternatively, a playback form can be freely selected.

The playbacked image and audio objects including the object whose playback form was changed in accordance with necessity are mixed and transmitted as AV data via an I/F (interface) 31.

System data (containing scene description data and additional data) is decoded by the system data decoding circuit 73 of the decoder 37. Time information necessary for determining the time is detected by a time information detector 66 from the decoded system data. More specifically, the time is detected from time information (clock data) contained in additional data of the system data in decoding. The detected time information is input to a system controller 39, and can be used as the recording time determination criterion.

Of the system data decoded by the system data decoding circuit 73, scene description data is input to a scene description data conversion circuit 68. The remaining system data and additional data are input as various commands to the system controller 39, and object information is contained in these data.

An output from the scene description data conversion circuit 68 is supplied to the audio output controller 64 and display output controller 65 where the output is used to output the basic form of a scene, and is also sent to the system controller 39.

An object generator/controller 400 is constituted by an object controller 710 for issuing a playback form change instruction for an object having a predetermined attribute, a sound source 740 serving as a means for generating an audio object, a character generator 70 for generating an image object such as an icon, and a memory (ROM) 74 for holding original data. The object controller 710 identifies an object having a predetermined attribute upon reception of an instruction from the system controller 39, and changes and controls the display form in accordance with the set contents. In addition, the object controller 710 controls to insert generated image and audio objects to playback data, and adjusts the playback form change timing.

As the sequence, the object controller 710 identifies an object code corresponding to "emergency news" or the like based on attribute information, on the basis of object information transmitted from the system controller 39. The object controller 710 sends an image playback form change instruction for the object to the respective units of the display/audio output controller 38 in accordance with the identification. At this time, an icon image object used in changing the playback form is generated by the character generator 70 using original data stored in the memory (ROM) 74. This icon image object is sent to the display output controller 65. An audio object used for a warning sound is obtained by sending an audio object generated by the sound source 740 to the audio output controller 64.

Processing of not displaying a played-back object is realized by control of not displaying only this object under the control of the object controller 710.

As one of functions according to the third embodiment of the present invention, when, e.g., an "emergency news" image as the display form of an original is to be played back, time display of the occurrence time can be synthesized to the playback image and displayed. In this case, a time display object is generated by the character generator 70 on the basis of recording time information obtained from an output from the decoder 37 by using original data stored in the memory 74, and inserted to playback data and synthesized as one image object.

FIG. 36 is a view for explaining the function of a selection means for changing the playback form of image data having a predetermined attribute in the object controller 710.

In FIG. 36, reference numeral 2010 denotes a selector (switch) which can select whether to directly display, e.g., "emergency news", to switch it to another icon and display the icon, or not to display "emergency news". A switch 2020 determines whether to add, e.g., a warning sound to "emergency news". A synthesizer 2030 synthesizes a picture selected by the selector 2010 and a warning sound input via the switch 2020. The functions of these units are executed by the display output controller 65 and audio output controller 64 in FIG. 35. A switching instruction to the selector 2010 and insertion of a generated object are controlled by the object controller 710.

In playback, when the object controller 710 identifies an object code corresponding to "emergency news" in playback data, it sends a playback form change instruction for the object to the respective units of the display/audio output controller 38. The playback pattern of the object at this time can be selected from three patterns: (A) an image object "icon" generated in the apparatus is displayed at a predetermined display position (X0,Y0) at the upper left corner of the screen, (B) an image object (emergency information telop) of an original is played back and displayed at the original display position (X,Y), and (C) only the object is not displayed.

When the image object of an original is to be displayed as it is, an image object representing the recording time can be generated by the character generator 70 based on current time information, superposed on the image, and additionally displayed.

As initial settings, the object controller 710 is desirably set to, when an object having a predetermined attribute is detected, display the object as an icon. The object controller 710 is more desirably constituted to arbitrarily select settings from the above-mentioned three patterns by operating the selector 2010 at a given timing in accordance with user tastes.

Moreover, an audio object as an effective warning sound can be added to warn the user that an image object was changed. In this case, an audio object generated by the sound source 740 can be synthesized to output AV data via the synthesizer 2030 by turning on the switch 2020.

An operation according to the third embodiment of the present invention, and examples of the display form will be explained with reference to FIGS. 37A to 37D and 38A to 38C.

Figure 37A:
FIGS. 37A to 37D are views for explaining display examples according to the third embodiment of the present invention.

FIG. 37A shows one frame of the on-air image of an animation which is an original television image recorded in the recording/playback device 12. An image object 1100 of a telop representing eruption of a volcano is additionally displayed as an example of "emergency news" on an on-air image 1101 of the animation.

Figure 37B:
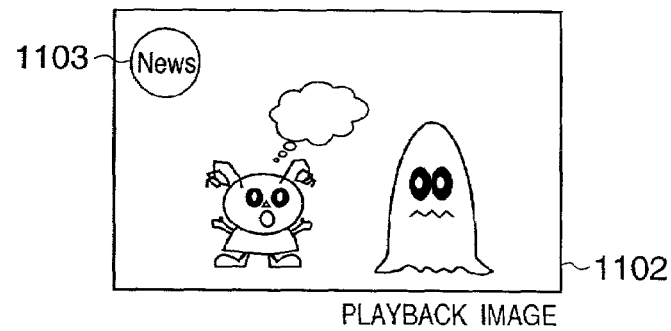

FIG. 37B shows an example of a playback image according to the third embodiment. As (A), the emergency news is displayed as an icon 1103 in playing back the recorded image of the animation shown in FIG. 37A. On a playback image 1102, the icon (image object) 1103 is displayed instead of the image object 1100 of the "emergency news" telop whose playback form is to be changed.

Figure 37C:
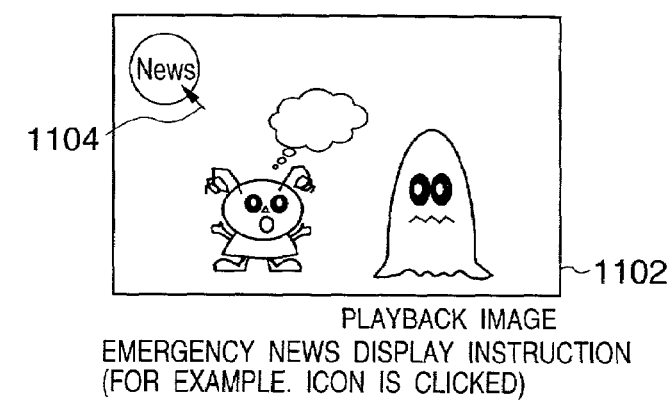

FIG. 37C is a view showing an operation of designating the icon 1103 displayed on the playback image 1102 with a mouse cursor 1104 during playback of the animation in the display form of FIG. 37B, and issuing an instruction of displaying the detailed contents of the icon (contents of the emergency news). The mouse cursor 1104 is operated with an instruction input means such as a mouse, and the icon 1103 is clicked to execute the instruction.

Figure 37D:
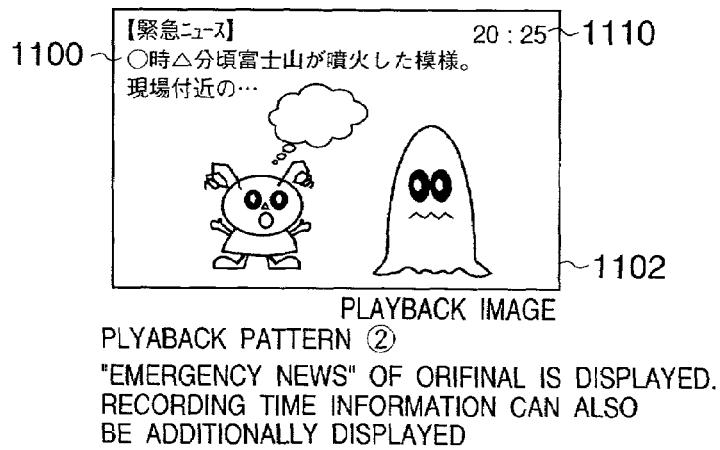

FIG. 37D shows an example when the playback form of the playback pattern is changed back to display of the original image in response to the instruction issued in FIG. 37C, as described in (B). In this case, the image object 1100 of the "emergency news" original is played back and displayed on the playback image 1102. As additional display information, a time display object 1110 representing the recording time of the original image can also be displayed.

In this manner, the playback pattern (A) in which an image object having a predetermined attribute is displayed as an icon, and the playback pattern (B) in which the image object is displayed without changing the original can be changed and instructed with a simple operation.

Figure 38A:
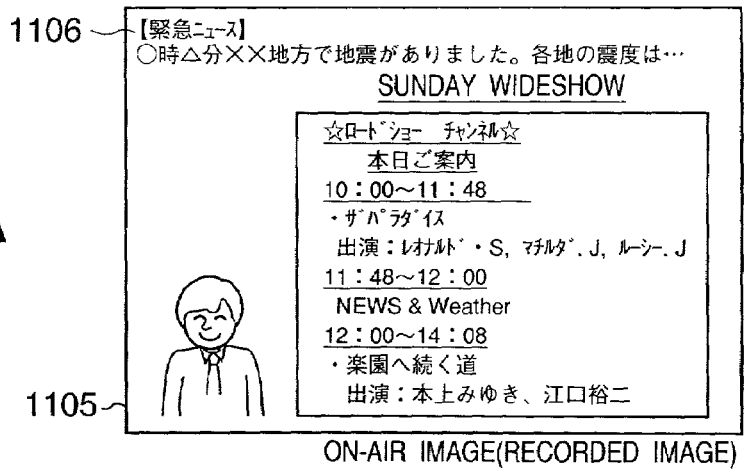
FIGS. 38A to 38C are views for explaining playback display/output examples according to the third embodiment of the present invention.

FIG. 38A is a view showing an example of a television image in which an image object 1106 of a telop representing an earthquake as "emergency news" is displayed in an on-air image 1105 during broadcasting of a movie program guide, and directly recorded in the recording/playback device 12.

Figure 38B:
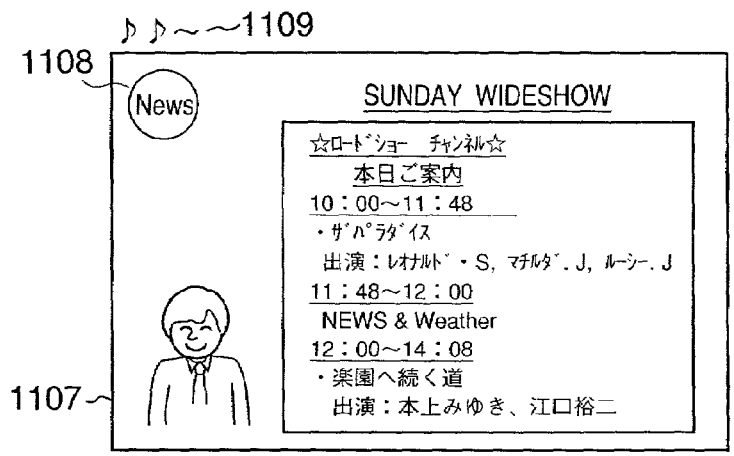

FIG. 38B is a view showing an example in which an icon 1108 is played back and displayed instead of the image object 1106 of the "emergency news" telop in correspondence with the above playback pattern (A) in a playback image 1107 in playing back the recorded image in FIG. 38A. In this case, an audio object is inserted as the playback pattern (C) in a scene in which the display form of the "emergency news" is changed to the icon 1108, and a warning sound (sound) 1109 is output to warn the user.

Figure 38C:
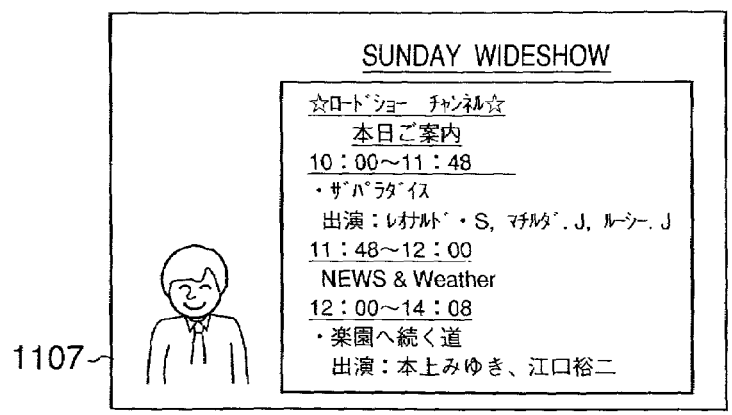

FIG. 38C is a view showing an example when the recorded image is played back without displaying either the icon or the image object of the "emergency news" telop, as the playback pattern (D).

In this fashion, the playback pattern (C) in which a warning sound is output by adding an audio object, and the playback pattern (D) in which an image object whose playback form is to be changed is not displayed completely can be freely set, similar to the playback patterns (A) and (B).

FIG. 39 is a flow chart for explaining image playback processing in the recording/playback device 12 according to the third embodiment of the present invention.

If playback operation for a recorded image is instructed in the playback mode of the recording/playback device 12 (step S101), video data played back from the recording medium 33 is decoded by the decoder 37 in step S102. In step S103, pieces of object information are analyzed for image objects constituting the video data, and their attributes are checked based on various object codes. In step S104, it is determined based on the results of analysis whether an image object having an attribute formed from an "emergency news" code exists among the image objects. This means a case wherein the "emergency news" attribute is set in advance for a target object whose playback form is to be changed.

If NO in step S104, the flow advances to step S110 to directly output playback data as AV data.

If YES in step S104, the flow advances to step S105 to read out a set value used in changing the playback form (value specifying the playback pattern). If the set value is "1", the flow shifts to step S106, the output of the "emergency news" image object is changed to a predetermined icon, and the icon is displayed (playback pattern (A)), as shown in FIG. 37B. If the set value is "0" in step S105, the flow shifts to step S107, the "emergency news" image object is played back as it is without changing the original, as shown in FIG. 37D, and a "time display" image object representing the on-air time is added and displayed in step S108 (playback pattern (B)). If the set value is "2" in step S105, the flow shifts to step S109 to inhibit display of the "emergency news" image object. At this time, even any icon is not displayed (playback pattern (D)).

By setting any one of the three set values, the "emergency news" image object is changed in its playback form, and displayed and output as AV data together with another played-back data (step S110).

In step S111, it is checked whether change of the set value is instructed with the mouse cursor 1104, as shown in FIG. 37C. If YES in step S111, the flow shifts to step S112 to change the set value to a newly set value in accordance with the setting instruction. Note that the set value may be input from, e.g., the instruction input unit 40 of the recording/playback device 12. In this way, the display/playback form of an image object having a predetermined attribute can be easily changed. After the set value is changed, whether an "emergency news" image object exists is determined again in step S104. If YES in step S104, the flow advances to step S105 to change the playback form in accordance with the newly set value.

If NO in step S111, the operation from step S101 is repetitively executed until the playback mode ends in accordance with a user instruction or system factor. If playback ends in step S113, the operation stops, and playback processing ends.

In the third embodiment, an object having a predetermined attribute has been described as a playback form change target by exemplifying an "emergency news (telop)" image object. The present invention is not limited to this, and can be applied to all objects such as various telops including a "prompt report of election returns" and "weather forecast image", or an image or audio such as a "subtitle of a movie" for which the user wants to change the playback form.

The output destination of image and audio data from the recording/playback device 12 according to the third embodiment is not limited to the display device 13, and can be another recording/playback device. In other words, the present invention can be applied to dubbing.

As described above, according to the third embodiment, the playback form of only an image object having a predetermined attribute can be changed in playing back a recorded image. The user can delete an unwanted image, or can display another image data. The third embodiment can provide a more user-friendly video playback function with a higher visual effect.

[Fourth Embodiment]

The fourth embodiment of the present invention will be described. The fourth embodiment will explain a display device 75 having a playback form change function.

Figure 40:
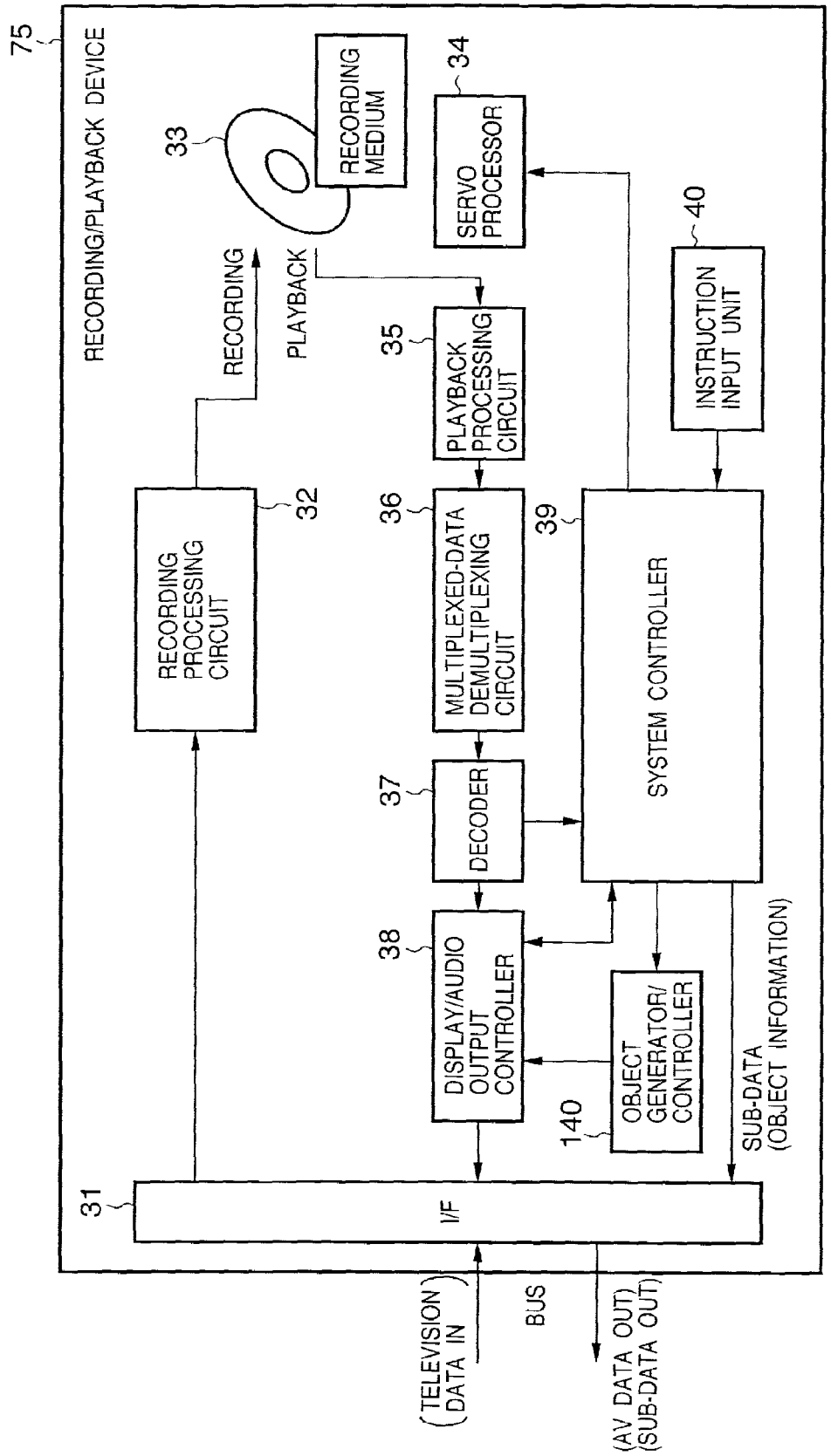
FIG. 40 is a block diagram showing the arrangement of a recording/playback device according to the fourth embodiment of the present invention.

FIG. 40 is a block diagram showing the arrangement of the display device 75 for recording and playing back MPEG4 video data according to the fourth embodiment of the present invention. The same reference numerals as in the arrangement of FIG. 3 denote the same parts in FIG. 40, and a description thereof will be omitted.

The recording/playback device 75 outputs, from an I/F (interface) 31 to an external device via a bus, AV data obtained by decoding MPEG4 video data in playback, and sub-data containing object information detected in decoding.

Figure 41:
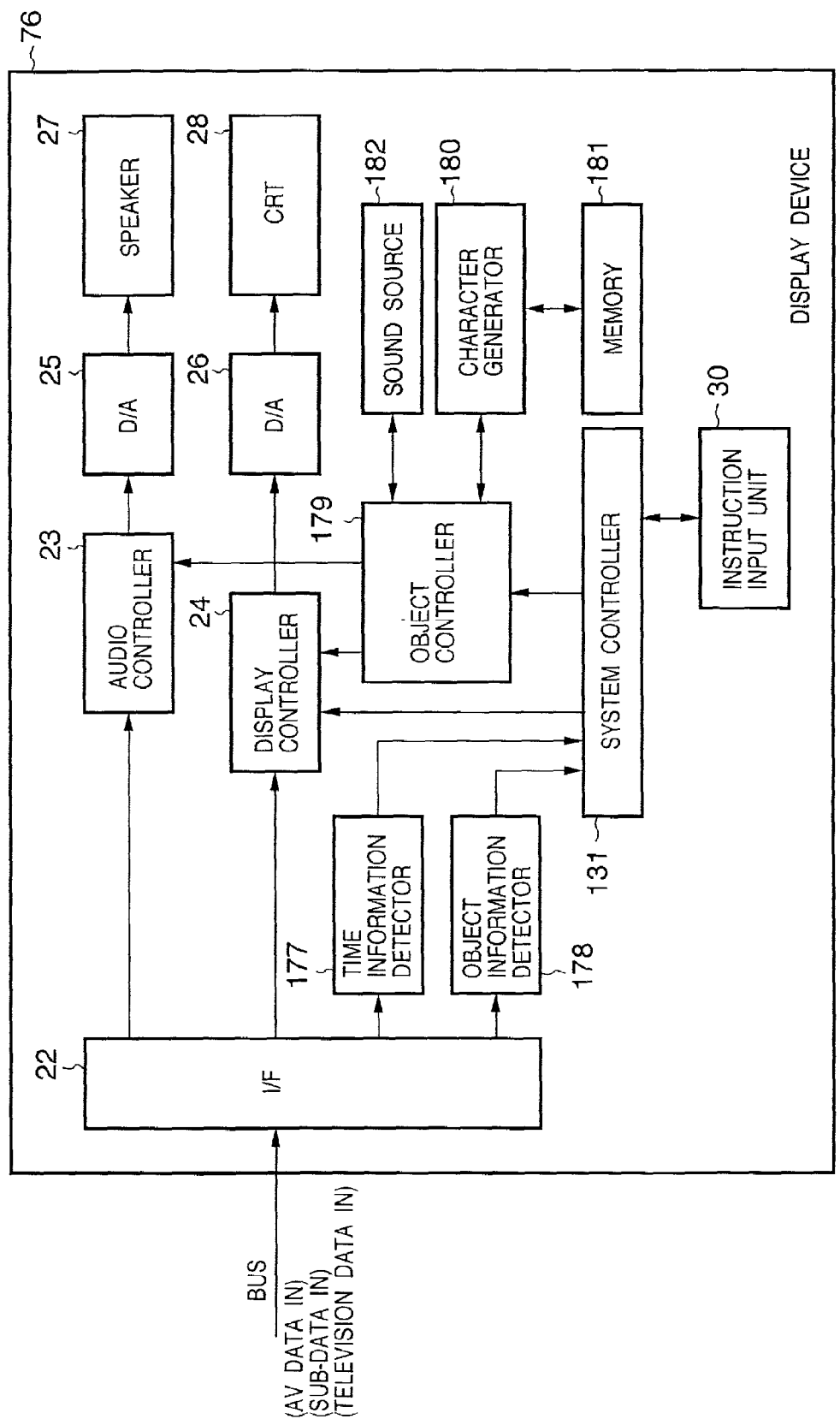
FIG. 41 is a block diagram showing the arrangement of a display device according to the fourth embodiment.

FIG. 41 is a block diagram showing the arrangement of a display device 76 which corresponds to the display device 75 according to the fourth embodiment, and copes with playback of an MPEG4 object image. The display device 76 can receive and display television data from the display device 75 in FIG. 40 or the television broadcasting reception device 11 in FIG. 2.

As the additional function of the display device 13 shown in FIG. 4, the display device 76 comprises a function of defining a display form and audio output form as a "playback form", and changing the playback form for a predetermined object. In FIG. 41, the same reference numerals as in FIG. 4 denote the same parts, and a description thereof will be omitted.

The display device 76 receives via an I/F (interface) 22 AV data and sub-data output from the display device 75 in FIG. 40 or the television broadcasting reception device 11. From the sub-data, time information accessory to the AV data is detected by a time information detector 177, whereas object information is detected by an object information detector 178. Input audio data is processed by an audio controller 23, transmitted to a D/A converter 25, and played back. Image data is processed, displayed, and controlled by a display controller 24.

Of objects constituting the input image or audio data, an object having a predetermined attribute undergoes processing of changing the playback form by the respective units of the display controller 24 and audio output controller 23. As a playback form change example, if an image object having a predetermined object attribute is received, additional processing is executed for the object by any one of following (a) to (d).

(a) The image object is replaced by an "icon" object using an internally generated character image.
(b) The object of the original is played back.
(In addition to (b), a "time display" image object is added and displayed on the basis of time information accessory to the data.)
(c) Change of the playback form is indicated by a warning sound using an audio object.
(d) No display is performed.

Alternatively, a playback form can be freely selected.

Time information necessary to determine the time is detected using the time information detector 177 from time information contained in sub-data. The detected time information is input to a system controller 131, and used to generate a "time display" image object.

An object controller 179 issues a playback (i.e., display and/or audio output) form change instruction for an object set in advance as a playback form change target. The object controller 179 comprises and controls a sound source 182 serving as a means for generating an audio object, a character generator 180 for generating an image object such as an icon, and a memory (ROM) 181 for holding original data.

The object controller 179 identifies the attribute of an object from object information, controls its display, controls to insert generated image and audio objects in playback data, and adjusts the change timing of the playback form. As the sequence, when the object controller 179 identifies an object code having a predetermined attribute whose playback form is to be changed, on the basis of object information which is detected by the object information detector 178 and transmitted from the system controller 131, the object controller 179 sends a playback form change instruction for the object to the respective units of the audio controller 23 and display controller 24.

As an icon image object used in changing the playback form, an icon generated by the character generator 180 using original data in the memory (ROM) 181 is sent to the display controller 24. As an audio object used for a warning sound, an audio object generated by the sound source 182 is sent to the audio controller 23.

Non-display processing of a played-back object is done by controlling not to display only the object.

Control of the playback form is the same as that described in the third embodiment with reference to FIGS. 38A to 38C.

When time display is to be synthesized with a playback image and displayed, a time display object is generated by the character generator 180 using original data in the memory (ROM) 181 on the basis of time information obtained from an output from the time information detector 177, and inserted and synthesized as one image object with playback data.

Image data made up of image objects including an object whose playback form was changed as needed is output to and displayed on a CRT 28. Audio data made up of audio objects is output from a loudspeaker 27.

An input image having undergone non-display processing/object replacement processing in the display device can be freely displayed as shown in FIGS. 37A to 37D and 38A to 38C, as described in the above embodiments.

Figure 42:
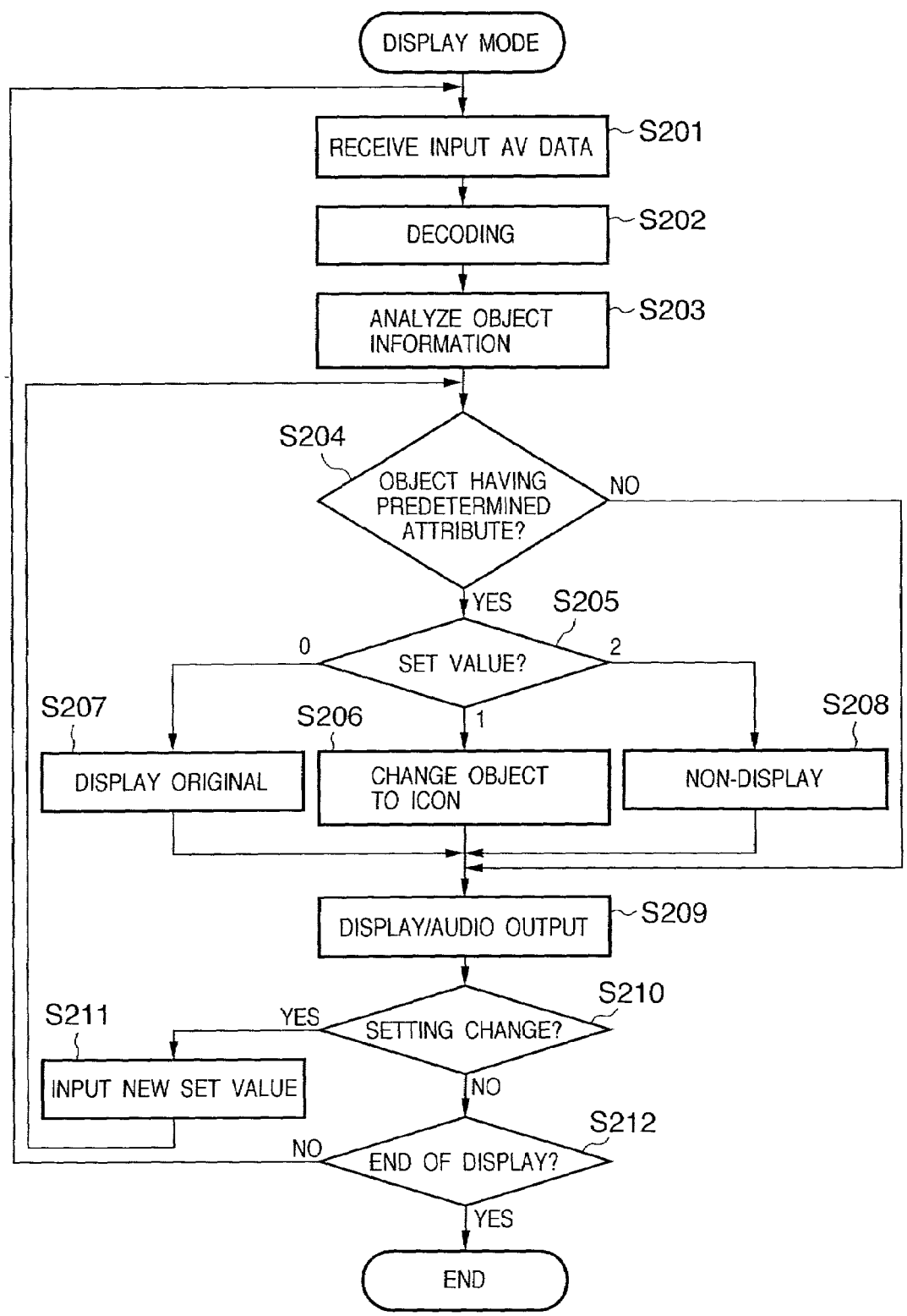
FIG. 42 is a flow chart for explaining a playback processing sequence according to the fourth embodiment of the present invention.

Control of the playback form corresponding to the display mode in the display device 76 according to the fourth embodiment of the present invention will be explained with reference to the flow chart of FIG. 42.

The display device 76 receives input AV data in the display mode in step S201, and decodes it in step S202. In step S203, pieces of object information are analyzed for image objects constituting image data, and their attributes are checked based on various object codes. In step S204, it is determined whether an image object having a predetermined attribute such as "emergency news" or "subtitle of a movie" exists in the results of analysis.

If NO in step S204, the flow advances to step S209 to directly output the image data in the original form. If YES in step S204, the flow advances to step S205 to read out a set value used in changing the playback form.

If the set value is "1", the flow shifts to step S206, the image object is changed to a generated icon, and the icon is output (playback pattern (a)). If the set value is "0", the flow shifts to step S207, and the image object is output without changing the original (playback pattern (b)). If the set value is "2" in step S205, the flow shifts to step S208 to inhibit output of the image object. At this time, even any icon is not displayed (playback pattern (d)).

With the three set values, the image object is changed in its playback form, and displayed and output together with another display data and/or audio data (step S209).

This set value can be arbitrarily changed. In step S210, similar to step S111, whether a set value change instruction is input is checked. If YES in step S210, the flow proceeds to step S211, and the set value can be easily changed by setting a new set value input from an instruction input unit 30. After the set value is changed, if an image object whose playback form is to be changed is determined in step S204, the flow shifts to step S205 to change the display form of the image object having the designated attribute on the basis of the latest changed set value.

If NO in step S210, the flow advances to step S212 to repetitively execute the operation from step S201 as far as the display mode continues. This operation is executed until the playback mode ends in step S212.

As described above, according to the fourth embodiment, the display form and audio output form in the display device 76 are defined as a playback form. Change of the playback form is set for an image object such as "emergency news" or "movie subtitle", and can be easily realized.

In the fourth embodiment, an image object such as "emergency news" or "movie subtitle" has been exemplified. The present invention is not limited to this, and can be applied to all objects such as an image or audio to which the user wants to apply change of the playback form.

Hence, only an object determined to be unnecessary can be hidden in displaying an image, which enables more user-friendly display with a higher visual effect.

<Other Embodiment>

As other embodiment, an embodiment when MPEG4 coding type video data (television data) as the premise of the above-described embodiments is implemented after being assembled in part of MPEG2 coding type video data (television data) will be described.

Figure 16:
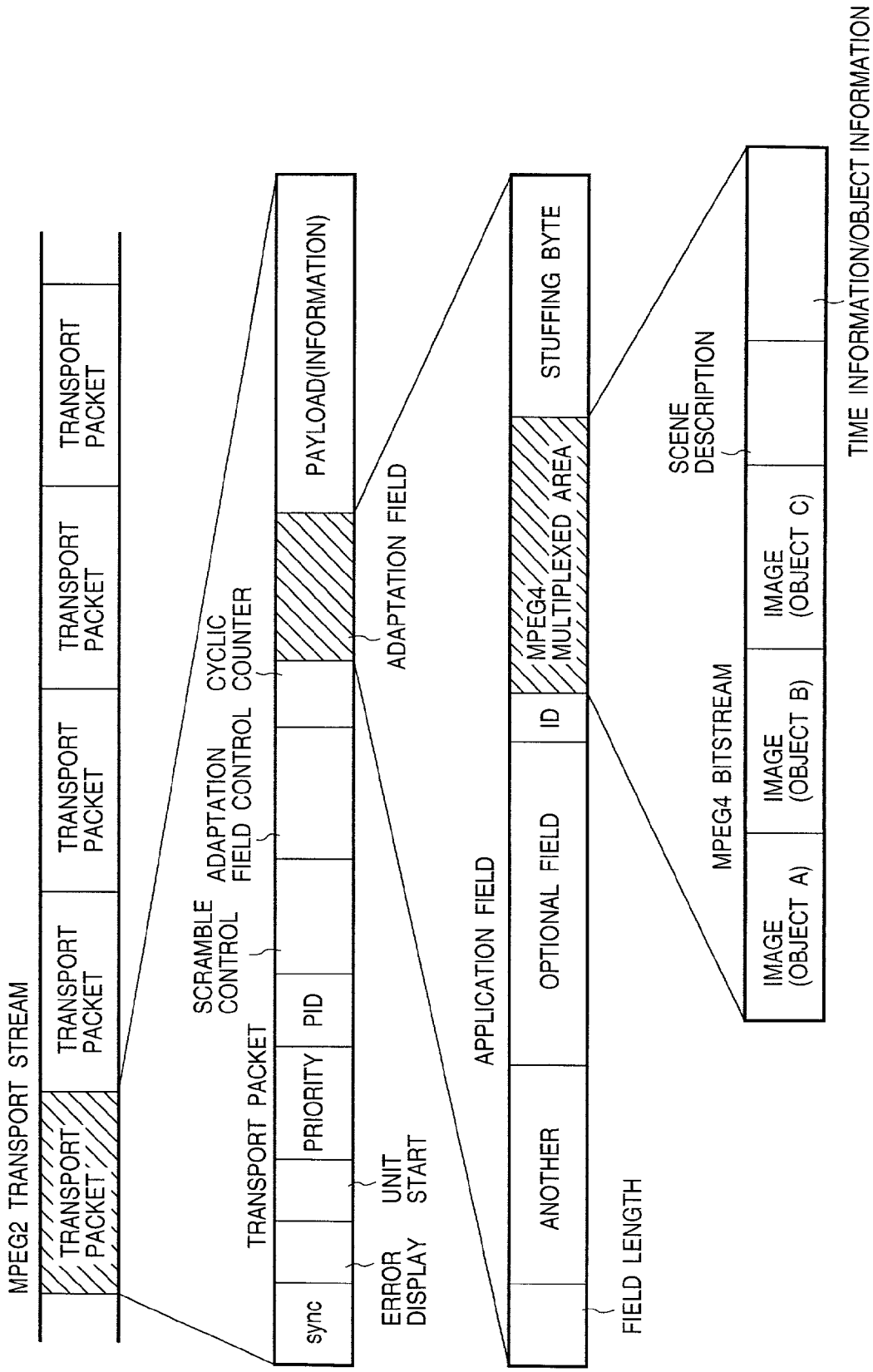
FIG. 16 is a view for explaining the transport stream structure of MPEG2 data according to another embodiment.
Figure 17:
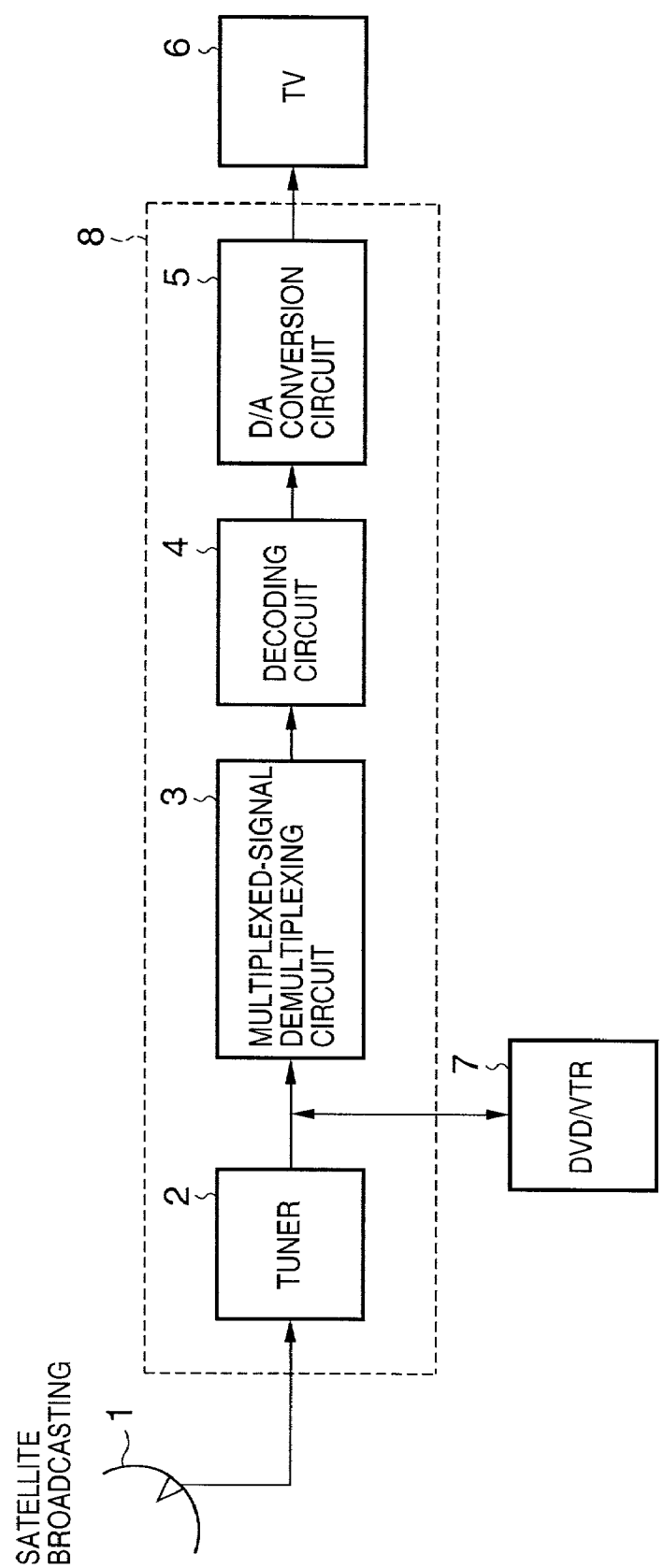
FIG. 17 is a block diagram showing the configuration of a conventional digital television broadcasting reception system.

FIG. 16 is a view showing the structure of an MPEG2 transport stream as the transmission format of an MPEG2 data stream used in MPEG2 coding type digital television broadcasting. The structure in FIG. 16 will be explained.

The MPEG2 transport stream is multiplexed/demultiplexed by a fixed-length transport packet. The data structure of the transport packet is hierarchically expressed as shown in FIG. 16, and includes items shown in FIG. 16.

The transport packet sequentially contains an 8-bit sync signal (sync), error display (error indicator) indicting the presence/absence of a bit error in the packet, unit start display representing the start of a new unit from the payload of the packet, priority (packet priority) representing the degree of significance of the packet, identification information PID (Packet Identification Data) representing the attribute of an individual stream, scramble control representing the presence/absence and type of scramble, adaptation field control representing the presence/absence of the adaptation field of the packet and the presence/absence of the payload, a cyclic counter serving as information for detecting whether a packet having the same PID was partially rejected during operation, an adaptation field capable of optionally containing additional information or a stuffing byte, and a payload (information).

The adaptation field contains a field length, various items about another individual stream, an optional field, and a stuffing byte (invalid data byte). In this embodiment, an MPEG4 bitstream is multiplexed as one of additional data in this field. The transport packet of MPEG2 television broadcasting has this structure.

Non-display processing of a predetermined object and object replacement processing according to the embodiment are realized in consideration of a case wherein a desired image object and system data such as time information or object information are assembled in an MPEG4 bitstream multiplexed as additional data in MPEG2 system data in MPEG2 television broadcasting using the above-described transport stream.

At this time, as shown in FIG. 16, image objects (objects A, B, and C in FIG. 16) formed from small data amounts of CGs (time display image, weather forecast image, and the like), scene description information (BIFS) of each object, and system data such as time information and object information for identifying an image object are multiplexed and transmitted as an MPEG4 bitstream in a predetermined area of the adaptation field in MPEG2 system data. An ID representing the presence of the MPEG4 data is added before (or before and after) the area where MPEG4 data is multiplexed. This ID is used to identify data.

Image data such as a CG assembled in part of MPEG2 data can undergo object non-display processing or object replacement processing, like MPEG4 video data described in the first and second embodiments.

In this case, if an ID representing the presence of MPEG4 data can be identified from the MPEG2 bitstream, and MPEG4 data can be individually extracted, image objects, object information, and time information can be respectively extracted from the MPEG4 data. Non-display processing of a predetermined image object in accordance with necessity, or display control by replacement processing can be easily achieved with the arrangement of the first or second embodiment. The method and operation are the same as the above-described ones.

With this arrangement, the present invention can be applied to not only an MPEG4 television program but also an MPEG2 television program or video data containing MPEG4 data.

MPEG2 data and MPEG4 data can share many coding/decoding circuits. Thus, the circuit arrangement can be effectively implemented without any complicated arrangement. Even for a software decoder, the system can be made efficient.

With this arrangement, the present invention is easily adapted to a system in which an MPEG4 object is multiplexed in an MPEG2 television program because a real-time image object such as time display or weather forecast to which non-display processing or replacement processing of the embodiment is applied is often small data.

The present invention may be applied to a system constituted by a plurality of devices (e.g., a host computer, interface device, reader, and printer) or an apparatus comprising a single device (e.g., a copying machine or facsimile apparatus).

The object of the present invention is realized even by supplying a storage medium (or recording medium) which stores software program codes for realizing the functions of the above-described embodiments to a system or apparatus, and causing the computer (or a CPU or MPU) of the system or apparatus to read out and execute the program codes stored in the storage medium. In this case, the program codes read out from the storage medium realize the functions of the above-described embodiments by themselves, and the storage medium which stores the program codes constitutes the present invention. The functions of the above-described embodiments are realized not only when the computer executes the readout program codes, but also when the operating system (OS) running on the computer performs part or all of actual processing on the basis of the instructions of the program codes.

The functions of the above-described embodiments are also realized when the program codes readout from the storage medium are written in the memory of a function expansion board inserted into the computer or that of a function expansion unit connected to the computer, and the CPU of the function expansion board or function expansion unit performs part or all of actual processing on the basis of the instructions of the program codes.

As has been described above, according to the present invention, an object having an attribute which was significant in recording (past) but is insignificant in playback, such as an object having a real-time attribute significant in recorded digital data, can be inhibited from being displayed, or can be changed in the display form in correspondence with the playback time. This is effective in adding a new function for playback of a television program.

According to the embodiments, the apparatus and system having the above arrangement enable more user-friendly video playback/display with a higher visual effect, and can improve the quality of the user interface.

According to the embodiments, playback output of an object having a predetermined attribute can be controlled. As another effect, the number of dubbing operations can be limited for only a predetermined object, which is also effective in terms of copyrights.

According to the embodiments, an MPEG4 bitstream can be assembled in an MPEG2 coding type television broadcasting system, and an existing system can be utilized.

According to the embodiments, digital television broadcasting can be easily combined with a personal computer (PC). Layout settings performed on a PC desktop at present can be customized even for a television image, so that television broadcasting and the PC are highly compatible. The effect of expanding the market is expected in the field of digital composite products.

The above embodiments have exemplified a reception/playback system constituted by a reception device, recording/playback device, and display device. The present invention is not limited to this, and can also be applied to a device such as a television receiver having a recording function that is constituted by integrating devices.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for reproducing a recorded digital data stream, comprising:
   determination means for determining whether an object having a real-time attribute exists in the recorded digital data stream;
   selection means for selecting whether or not to display the object having the real-time attribute, based on a designation of a user;
   generation means for generating a new object based on real-time information at a current time corresponding to a type of the object that is selected not to be displayed by said selection means; and
   reproducing means for reproducing the recorded digital data stream while replacing the object having the real-time attribute with the new object generated by said generation means, in a case where said selection means selects not to display the object having the real-time attribute and said determination means determines that the object having the real-time attribute exists.

2. The apparatus according to claim 1, wherein
   the digital data stream includes a data stream coded by a digital television MPEG4 scheme, and has main data and sub-data,
   the main data includes data having a plurality of objects divided in units of predetermined objects, and
   the sub-data includes attribute information of the object.

3. The apparatus according to claim 2, wherein the digital data stream includes a digital television data stream containing an object coded by an MPEG4 scheme and the sub-data multiplexed on an MPEG2 bitstream.

4. The apparatus according to claim 1, wherein the real-time attribute includes an on-air-time information attribute which is significant in recording the digital data stream.

5. The apparatus according to claim 1, further comprising timepiece means for measuring current time,
   wherein said reproducing means replaces the object with the new object based on time measurement by said timepiece means in reproducing the object having the real-time attribute.

6. A display device for receiving and displaying digital data reproduced by a reproducing device, comprising:
   determination means for determining whether an object having a real-time attribute exists in the digital data;
   selection means for selecting whether or not to display the object having the real-time attribute, based on a designation of a user;
   generation means for generating a new object based on real-time information at a current time corresponding to a type of the object that is selected not to be displayed by said selection means; and
   display control means for displaying a video image corresponding to the digital data while replacing the object having the real-time attribute with the new object generated by said generation means, in a case where said selection means selects not to display the object having the real-time attribute and said determination means determines that the object having the real-time attribute exists.

7. The device according to claim 6, wherein the real-time attribute includes an on-air time information attribute which is significant in recording the digital data.

8. The device according to claim 6, further comprising timepiece means for measuring current time,
   wherein said display control means replaces the object with the new object based on time measurement by said timepiece means in reproducing the object having the real-time attribute.

9. An image processing method of reproducing a recorded digital data stream, comprising:
   a determination step of determining whether an object having a real-time attribute exists in the recorded digital data stream;
   a selection step of selecting whether or not to display the object having the real-time attribute, based on a designation of a user;
   a generation step of generating a new object based on real-time information at a current time corresponding to a type of the object that is selected not to be displayed in said selection step; and
   a reproducing step of reproducing the recorded digital data stream while replacing the object having the real-time attribute with the new object generated in said generation step, in a case where the object having the real-time attribute is selected not to be displayed in said selection step and the object having the real-time attribute is determined to exist in said determination step.

10. The method according to claim 9, wherein
    the digital data stream includes a data stream coded by a digital television MPEG4 scheme, and has main data and sub-data,
    the main data includes data having a plurality of objects divided in units of predetermined objects, and
    the sub-data includes attribute information of the object.

11. The method according to claim 10, wherein the digital data stream includes a digital television data stream containing an object coded by an MPEG4 scheme and the sub-data multiplexed on an MPEG2 bitstream.

12. The method according to claim 9, wherein the real-time attribute includes an on-air time information attribute which is significant in recording the digital data stream.

13. The method according to claim 9, further comprising a timepiece step of measuring current time,
wherein in said reproducing step, the object is replaced with the new object based on time measurement in said timepiece step in reproducing the object having the real-time attribute.

14. An image processing apparatus for reproducing a recorded digital data stream, comprising:
determination means for determining whether an object having a super-imposed attribute exists in the recorded digital data stream;
designation means for designating a reproducing form of the object having the super-imposed attribute from a plurality of reproducing forms;
generation means for generating a predetermined icon corresponding to a type of the object having the super-imposed attribute; and
reproducing control means for reproducing the recorded digital data stream while replacing the object having the super-imposed attribute with the predetermined icon generated by said generation means, in a case where said designation means designates a predetermined reproducing form in which the object having the super-imposed attribute is not to be displayed and said determination means determines that the object having the super-imposed attribute exists.

15. The apparatus according to claim 14, wherein said generation means generates a plurality of icons corresponding to each type of the objects having the super-imposed attribute.

16. The apparatus according to claim 14, wherein the predetermined reproducing form designated by said designation means further includes reproducing by using an audio object.

17. The apparatus according to claim 14, wherein the predetermined reproducing form includes the predetermined icon and inhibits the display of the object having the super-imposed attribute.

18. The apparatus according to claim 14, wherein the predetermined reproducing form includes display of time information obtained in recording the digital data stream.

19. The apparatus according to claim 14, wherein the object having the super-imposed attribute includes an emergency news telop.

20. The apparatus according to claim 14, wherein said designation means comprises:
instruction means for instructing whether or not to display the predetermined icon on a display screen; and
changing means for changing the predetermined reproducing form to a new reproducing form to display the object having the super-imposed attribute in accordance with an instruction operation of said instruction means.

21. The apparatus according to claim 14, wherein
the digital data stream includes a data stream coded by a digital television MPEG4 scheme, and has main data and sub-data,
the main data includes data having a plurality of objects divided in units of predetermined objects, and
the sub-data includes attribute information of the object.

22. The apparatus according to claim 21, wherein the digital data stream includes a digital television data stream containing an object coded by an MPEG4 scheme and the sub-data multiplexed on an MPEG2 bitstream.

23. The apparatus according to claim 14, wherein designation by said designation means can be executed during reproducing of the object having the super-imposed attribute.

24. An image processing method in an image processing apparatus for reproducing a recorded digital data stream, comprising:
a determination step of determining whether an object having a super-imposed attribute exists in the recorded digital data stream;
a designation step of designating a reproducing form of the object having the super-imposed attribute from a plurality of reproducing forms;
a generation step of generating a predetermined icon corresponding to a type of the object having the super-imposed attribute; and
a reproducing control step of reproducing the recorded digital data stream while replacing the object having the super-imposed attribute with the predetermined icon generated in said generation step, in a case where a predetermined reproducing form in which the object having the super-imposed attribute is not to be displayed is designated in said designation step and it is determined in said determination step that the object having the super-imposed attribute exists.

25. The method according to claim 24, wherein a plurality of icons corresponding to each type of the objects having the super-imposed attribute are generated in said generation step.

26. The method according to claim 24, wherein the predetermined reproducing form further includes reproducing by using an audio object.

27. The method according to claim 24, wherein the predetermined reproducing form includes the predetermined icon and inhibits the display of the object having the super-imposed attribute.

28. The method according to claim 24, wherein the predetermined reproducing form includes display of time information obtained in recording the digital data stream.

29. The method according to claim 24, wherein the object having the super-imposed attribute includes an emergency news telop.

30. The method according to claim 24, wherein the designation step comprises:
an instruction step of instructing whether or not to display the predetermined icon on a display screen; and
a changing step of changing the predetermined reproducing form to a new reproducing form to display the object having the super-imposed attribute in accordance with an instruction operation in said instruction step.

31. The method according to claim 24, wherein
the digital data stream includes a data stream coded by a digital television MPEG4 scheme, and has main data and sub-data,
the main data includes data having a plurality of objects divided in units of predetermined objects, and
the sub-data includes attribute information of the object.

32. The method according to claim 31, wherein the digital data stream includes a digital television data stream containing an object coded by an MPEG4 scheme and the sub-data multiplexed on an MPEG2 bitstream.

33. The method according to claim 31, wherein designation in said designation step can be executed during reproducing of the object having the super-imposed attribute.

34. A computer-readable recording medium on which is stored a program for executing an image processing method of reproducing a recorded digital data stream, the program comprising:
- a determination step for determining whether an object having a real-time attribute exists in the recorded digital data stream;
- a selection step of selecting whether or not to display the object having the real-time attribute, based on a designation of a user;
- a generation step of generating a new object based on real-time information at a current time corresponding to a type of the object that is selected not to be displayed in said selection step; and
- a reproducing step of reproducing the recorded digital data stream while replacing the object having the real-time attribute with the new object generated in said generation step, in a case where the object having the real-time attribute is selected not to be displayed in said selection step and it is determined in said determination step that the object having the real-time attribute exists.

35. A computer-readable recording medium on which is stored a program for executing an image processing method of reproducing and displaying a recorded digital data stream, the program comprising:
- a determination step for determining whether an object having a super-imposed attribute exists in the recorded digital data stream;
- a designation step for designating a reproducing form of the object having the super-imposed attribute from a plurality of reproducing forms;
- a generation step for generating a predetermined icon corresponding to a type of the object having the super-imposed attribute; and
- a reproducing control step for reproducing the recorded digital data stream while replacing the object having the super-imposed attribute with the predetermined icon generated by said generation step, in a case where a predetermined reproducing form in which the object having the super-imposed attribute is not to be displayed is designated by said designation step and it is determined by said determination step that the object having the super-imposed attribute exists.

* * * * *

UNITED STATES PATENT AND TRADEMARK OFFICE
CERTIFICATE OF CORRECTION

PATENT NO. : 7,054,539 B2
APPLICATION NO. : 09/779532
DATED : May 30, 2006
INVENTOR(S) : Masamichi Ito et al.

It is certified that error appears in the above-identified patent and that said Letters Patent is hereby corrected as shown below:

TITLE PAGE:
Item (54), "IMAGE PROCESSING METHOD AND APPARATUS" should read
-- REPRODUCING A DIGITAL DATA STREAM --.

DRAWINGS:
Sheet 29, Figure 29, in reference numeral 203, "ANAYLSIS" should read
-- ANALYSIS -- and in reference numeral 208, "ENHACING" should read
-- ENHANCING --.

Sheet 36, Figure 36, "PLAYBACKED" should read -- PLAYBACK --.

Sheet 37, Figure 37B, "PLYABACK" should read -- PLAYBACK --.

Sheet 37, Figure 37D, "PLYABACK" should read -- PLAYBACK -- and "ORIFINAL" should read -- ORIGINAL --.

COLUMN 1:
Lines 1 and 2, "IMAGE PROCESSING METHOD AND APPARATUS" should read
-- REPRODUCING A DIGITAL DATA STREAM --.

COLUMN 6:
Line 7, "edit" should read -- editing --; and
Line 56, "Realty" should read -- Reality --.

COLUMN 13:
Line 67, "Mode)" should read -- Mode), --.

COLUMN 15:
Line 58, "bitstream-adopts" should read -- bitstream adopts --.

COLUMN 17:
Line 42, "like)" should read -- like). --.

COLUMN 21:
Line 20, "the" (second occurrence) should read -- they --.

COLUMN 25:
Line 13, "playbacked" should read -- playback --.

UNITED STATES PATENT AND TRADEMARK OFFICE
CERTIFICATE OF CORRECTION

PATENT NO. : 7,054,539 B2
APPLICATION NO. : 09/779532
DATED : May 30, 2006
INVENTOR(S) : Masamichi Ito et al.

It is certified that error appears in the above-identified patent and that said Letters Patent is hereby corrected as shown below:

COLUMN 32:
Line 58, "readout" should read -- read out --.

Signed and Sealed this

Twenty-fifth Day of March, 2008

JON W. DUDAS
*Director of the United States Patent and Trademark Office*